(12) United States Patent
Saltz et al.

(10) Patent No.: US 11,164,312 B2
(45) Date of Patent: Nov. 2, 2021

(54) SYSTEM AND METHOD TO QUANTIFY TUMOR-INFILTRATING LYMPHOCYTES (TILS) FOR CLINICAL PATHOLOGY ANALYSIS BASED ON PREDICTION, SPATIAL ANALYSIS, MOLECULAR CORRELATION, AND RECONSTRUCTION OF TIL INFORMATION IDENTIFIED IN DIGITIZED TISSUE IMAGES

(71) Applicants: The Research Foundation for the State University of New York, Albany, NY (US); Board of Regents, The University of Texas System, Austin, TX (US); Emory University, Atlanta, GA (US); Institute for Systems Biology, Seattle, WA (US)

(72) Inventors: Joel Haskin Saltz, Manhasset, NY (US); Tahsin Kurc, Coram, NY (US); Rajarsi Gupta, Flushing, NY (US); Tianhao Zhao, Coram, NY (US); Rebecca Batiste, Stony Brook, NY (US); Le Hou, Stony Brook, NY (US); Vu Nguyen, Stony Brook, NY (US); Dimitrios Samaras, Rocky Point, NY (US); Arvind Rao, Houston, TX (US); John Van Arnam, Houston, TX (US); Pankaj Singh, Houston, TX (US); Alexander Lazar, Houston, TX (US); Ashish Sharma, Atlanta, GA (US); Ilya Shmulevich, Seattle, WA (US); Vesteinn Thorsson, Seattle, WA (US)

(73) Assignees: The Research Foundation tor the State University of New York, Albany, NY (US); Board of Regents, The University of Texas System, Austin, TX (US); Institute for Systems Biology, Seattle, WA (US)

( * ) Notice: Subject to any disclaimer, the term of this patent is extended or adjusted under 35 U.S.C. 154(b) by 0 days.

(21) Appl. No.: 16/762,326

(22) PCT Filed: Nov. 30, 2018

(86) PCT No.: PCT/US2018/063231
§ 371 (c)(1),
(2) Date: May 7, 2020

(87) PCT Pub. No.: WO2019/108888
PCT Pub. Date: Jun. 6, 2019

(65) Prior Publication Data
US 2020/0388029 A1    Dec. 10, 2020

Related U.S. Application Data

(60) Provisional application No. 62/651,677, filed on Apr. 2, 2018, provisional application No. 62/592,931, filed on Nov. 30, 2017.

(51) Int. Cl.
*G06T 7/11* (2017.01)
*G06K 9/32* (2006.01)
(Continued)

(52) U.S. Cl.
CPC .......... *G06T 7/0012* (2013.01); *G06K 9/3233* (2013.01); *G06K 9/6256* (2013.01);
(Continued)

(58) Field of Classification Search
CPC combination set(s) only.
See application file for complete search history.

(56) References Cited

U.S. PATENT DOCUMENTS

| 2010/0088264 | A1 | 4/2010 | Teverovskiy et al. |
| 2014/0050385 | A1* | 2/2014 | Murphy ................ G16B 20/00 382/133 |

(Continued)

FOREIGN PATENT DOCUMENTS

| WO | 2016083791 A1 | 6/2016 |
| WO | 2017198790 A1 | 11/2017 |

OTHER PUBLICATIONS

Written Opinion, International Search Report dated Jan. 29, 2019 for International Application No. PCT/US18/63231.
(Continued)

*Primary Examiner* — Tsung Yin Tsai
(74) *Attorney, Agent, or Firm* — Hoffmann & Baron, LLP

(57) ABSTRACT

A system associated with quantifying a density level of tumor-infiltrating lymphocytes, based on prediction of
(Continued)

reconstructed TIL information associated with tumoral tissue image data during pathology analysis of the tissue image data is disclosed. The system receives digitized diagnostic and stained whole-slide image data related to tissue of a particular type of tumoral data. Defined are regions of interest that represents a portion of, or a full image of the whole-slide image data. The image data is encoded into segmented data portions based on convolutional autoencoding of objects associated with the collection of image data. The density of tumor-infiltrating lymphocytes is determined of bounded segmented data portions for respective classification of the regions of interest. A classification label is assigned to the regions of interest. It is determined whether an assigned classification label is above a pre-determined threshold probability value of lymphocyte infiltrated. The threshold probability value is adjusted in order to re-assign the classification label to the regions of interest based on a varied sensitivity level of density of lymphocyte infiltrated. A trained classification model is generated based on the re-assigned classification labels to the regions of interest associated with segmented data portions using the adjusted threshold probability value. An unlabeled image data set is received to iteratively classify the segmented data portions based on a lymphocyte density level associated with portions of the unlabeled image data set, using the trained classification model. Tumor-infiltrating lymphocyte representations are generated based on prediction of TIL information associated with classified segmented data portions. A refined TIL representation based on prediction of the TIL representations is generated using the adjusted threshold probability value associated with the classified segmented data portions. A corresponding method and computer-readable device are also disclosed.

32 Claims, 49 Drawing Sheets
(29 of 49 Drawing Sheet(s) Filed in Color)

(51) Int. Cl.
    *G06T 7/00*           (2017.01)
    *G06K 9/62*           (2006.01)
    *G06T 9/00*           (2006.01)
(52) U.S. Cl.
    CPC .............. *G06K 9/6267* (2013.01); *G06T 7/11* (2017.01); *G06T 9/00* (2013.01); *G06T 2207/20076* (2013.01); *G06T 2207/20081* (2013.01); *G06T 2207/20084* (2013.01); *G06T 2207/30096* (2013.01)

(56) References Cited

U.S. PATENT DOCUMENTS

| | | | |
|---|---|---|---|
| 2014/0294754 A1 | 10/2014 | Modiano et al. | |
| 2016/0042511 A1* | 2/2016 | Chukka ................. | G06T 7/0012 382/133 |
| 2018/0232883 A1* | 8/2018 | Sethi ...................... | G06K 9/628 |
| 2018/0315193 A1* | 11/2018 | Paschalakis ............. | G06N 3/08 |
| 2019/0015059 A1* | 1/2019 | Itu ........................... | A61B 6/502 |

OTHER PUBLICATIONS

Sirinukunwattana, Korsuk, et al., "Locality Sensitive Deep Learning for Detection and Classification of Nuclei in Routine Colon Cancer Histology Images," IEEE Transactions on Medical Imaging, vol. 35, No. 5, pp. 1196-1206 (2016).

Su, Hai, et al., "Robust Cell Detection and Segmentation in Histopathological Images Using Sparse Reconstruction and Stacked Denoising Autoencoders," In International Conference on Medical Image Computing and Computer-Assisted Intervention, vol. 9351, pp. 383-390. Springer, Cham, 2015.
Theano Development Team, et al., "Theano: A Python framework for fast computation of mathematical expressions," Symbolic Computation, arXiv preprint arXiv:1605.02688v1 (2016).
Thorsson, Vesteinn, et al., "The Immune Landscape of Cancer," Immunity, vol. 48, No. 4, pp. 812-830 (2018).
Wilkerson, Matthew D., et al., "Lung Squamous Cell Carcinoma mRNA Expression Subtypes are Reproducible, Clinically Important, and Correspond to Normal Cell Types," Clinical Cancer Research, vol. 16, No. 19, pp. 4864-4875 (2010).
Xie, Yuanpu, et al., "Deep Voting: A Robust Approach Toward Nucleus Localization in Microscopy Images," In International Conference on Medical Image Computing and Computer-Assisted Intervention, vol. 9351, pp. 374-382. Springer, Cham (2015).
Xie, Yuanpu, et al., "Beyond Classification: Structured Regression for Robust Cell Detection Using Convolutional Neural Network," In International Conference on Medical Image Computing and Computer-Assisted Intervention, vol. 9351, pp. 358-365, Springer, Cham (2015).
Xu, Yan, et al., "Deep Convolutional Activation Features for Large Scale Brain Tumor Histopathology Image Classification and Segmentation," In 2015 IEEE International Conference on Acoustics, Speech and Signal Processing (ICASSP), pp. 947-951, IEEE (2015).
Zhao, Tianhao, et al., "Using Machine Methods to Score Tumor-Infiltrating Lymphocytes in Lung Cancer," In Laboratory Investigation, vol. 97, pp. 403A-403A. 75 Varick St, 9th Flr, New York, NY 10013-1917 USA: Nature Publishing Group (2017).
Pathologists' Hourly Wages. http://www1.salary.com/Physician-Pathology-hourly-wages.html.
Chen, Hao, et al., "DCAN: Deep Contour-Aware Networks for Object Instance Segmentation from Histology Images," Medical Image Analysis, vol. 36, pp. 135-146 (2017).
Doersch, Carl, et al., "Unsupervised Visual Representation Learning by Context Prediction," In Proceedings of the IEEE International Conference on Computer Vision (2015).
Zhou, Naiyun, et al., "Evaluation of Nucleus Segmentation in Digital Pathology Images Through Large Scale Image Synthesis," In Medical Imaging 2017: Digital Pathology, vol. 10140, p. 101400K, International Society for Optics and Photonics (2017).
Graham, Benjamin, "Spatially-Sparse Convolutional Neural Networks," arXiv preprint arXiv:1409.6070 (2014).
Ioffe, Sergey, et al., "Batch Normalization: Accelerating Deep Network Training by Reducing Internal Covariate Shift," (Mar. 2015). arXiv:1502.03167v3.
Johnson, Rie, et al., "Semi-Supervised Convolutional Neural Networks for Text Categorization via Region Embedding," In Advances in Neural Information Processing Systems, pp. 919-927 (2015).
Maas, Andrew L., et al., "Rectifier Nonlinearities Improve Neural Network Acoustic Models," In Proc. ICML, vol. 30, No. 1, p. 3 (2013).
Makhzani, Alireza, et al., "K-Sparse Autoencoders," arXiv preprint arXiv:1312.5663 (2013).
Murdock, Calvin, et al., "Blockout: Dynamic Model Selection for Hierarchical Deep Networks," In Proceedings of the IEEE Conference on Computer Vision and Pattern Recognition, pp. 2583-2591 (2016).
Ng, Andrew, "Sparse Autoencoder," CS294A Lecture Notes 72, pp. 1-19 (2011).
Radford, Alec, et al., "Unsupervised Representation Learning With Deep Convolutional Generative Adversarial Networks," arXiv preprint arXiv:1511.06434 (2016).
Ronneberger, Olaf, et al., "U-net: Convolutional Networks for Biomedical Image Segmentation," In International Conference on Medical Image Computing and Computer-Assisted Intervention, pp. 234-241, Springer, Cham, 2015.
Russakovsky, Olga, et al., "Imagenet Large Scale Visual Recognition Challenge," International Journal of Computer Vision 115, No. 3, pp. 211-252 (2015).

(56) References Cited

OTHER PUBLICATIONS

Turkki, Riku, et al., "Antibody-Supervised Deep Learning for Quantification of Tumor-Infiltrating Immune Cells in Hematoxylin and Eosin Stained Breast Cancer Samples," Journal of Pathology Informatics, 7 (2016).
Vicente, Tomas F. Yago, et al., "Large-Scale Training of Shadow Detectors with Noisily-Annotated Shadow Examples," In European Conference on Computer Vision, pp. 816-832. Springer, Cham (2016).
Xu, Jun, et al., "Stacked Sparse Autoencoder (SSAE) for Nuclei Detection on Breast Cancer Histopathology Images," IEEE Transactions on Medical Imaging, vol. 35, No. 1, pp. 119-130 (2015).
Ball, Geoffrey H., et al., "ISODATA, A Novel Method of Data Analysis and Pattern Classification," Stanford Research Institute, Menlo Park, CA, pp. 2-50, 1965.
Banfield, Jeffrey D., et al., "Model-Based Gaussian and Non-Gaussian Clustering," Biometrics, vol. 49, pp. 803-821 (1993).
Bayramoglu, Neslihan, et al., "Transfer Learning for Cell Nuclei Classification in Histopathology Images," In European Conference on Computer Vision, pp. 532-539, Springer, Cham, 2016.
Bodenhofer, Ulrich, et al., "APCluster: An R Package for Affinity Propagation Clustering," Bioinformatics, vol. 27, No. 17 pp. 2463-2464 (2011).
Broussard, Elizabeth K., et al., "TNM Staging in Colorectal Cancer: T is for T Cell and M is for Memory," Journal of Clinical Oncology, vol. 29, No. 6, pp. 601-603 (2011).
Akbani, R., et al., "Genomic Classification of Cutaneous Melanoma," Cell Press, vol. 161, pp. 1681-1696 (2015). http://dx.doi.org/10.1016/j.cell.2015.05.044.
Cancer Genome Atlas Research Network, "Integrated Genomic Analyses of Ovarian Carcinoma," Nature, vol. 474, No. 7353, pp. 609-615 (2011).
Lazar, Alexander J., et al., "Comprehensive and Integrated Genomic Characterization of Adult Soft Tissue Sarcomas," Cell Press, vol. 171, No. 4, pp. 950-965 (2017). https://doi.org/10.1016/j.cell.2017.10.014.
Charoentong, Pornpimol, et al., "Pan-Cancer Immunogenomic Analyses Reveal Genotype-Immunophenotype Relationships and Predictors of Response to Checkpoint Blockade," Cell Reports, vol. 18, No. 1, pp. 248-262 (2017). http://dx.doi.org/10.1016/j.cellrep.2016.12.019.
Chen, Hao, et al., "DCAN: Deep Contour-Aware Networks for Object Instance Segmentation from Histology Images," Medical Image Analysis, vol. 36, pp. 135-146 (2017). http://dx.doi.org/10.1016/j.media.2016.11.004.
Cireşan, Dan C., et al., "Mitosis Detection in Breast Cancer Histology Images with Deep Neural Networks," In International Conference on Medical Image Computing and Computer-Assisted Intervention, vol. 8150, pp. 411-418. Springer, Berlin, Heidelberg, 2013.
Cooper, Lee AD, et al., "PanCancer Insights from the Cancer Genome Atlas: The Pathologist's Perspective," The Journal of Pathology, vol. 244, No. 5, pp. 512-524 (2017). http://doi.org/10.1002/path.5028.
Crowson, A. Neil, et al., "Prognosticators of Melanoma, The Melanoma Report, and the Sentinel Lymph Node," Modern Pathology, vol. 19, No. 2, pp. S71-S87(2006). https://doi.10.1038/modpathol.3800517.
FDA News Release (2017). "FDA Allows Marketing of First Whole Slide Imaging System for Digital Pathology". https://www.fda.gov/NewsEvents/Newsroom/PressAnnouncements/ucm552742.htm.
Frey, Brendan J., et al., "Clustering by Passing Messages Between Data Points," Science, vol. 315, No. 5814, pp. 972-976 (2007). https://doi.10.1126/science.1136800.
Fridman, Wolf Herman, et al., "The Immune Contexture in Human Tumours: Impact on Clinical Outcome," Nature Reviews Cancer, vol. 12, No. 4, pp. 298-306 (2012).
Galon, Jérôme, et al., "Type, Density, and Location of Immune Cells Within Human Colorectal Tumors Predict Clinical Outcome," Science, vol. 313, No. 5795, pp. 1960-1964 (2006).
Galon, Jérôme, et al., "The Continuum of Cancer Immunosurveillance: Prognostic, Predictive, and Mechanistic Signatures," Immunity, vol. 39, No. 1, pp. 11-26 (2013).
Graves, Alex, et al., "Towards End-to-End Speech Recognition with Recurrent Neural Networks," In Proceedings of the 31st International Conference on Machine Learning, Beijing, China, JMLR: W&CP, vol. 32, pp. 1764-1772 (2014).
Hendry, Shona, et al., "Assessing Tumor-Infiltrating Lymphocytes in Solid Tumors: A Practical Review for Pathologists and Proposal for a Standardized Method from the International Immuno-Oncology Biomarkers Working Group: Part 1: Assessing the Host Immune Response, TILs in Invasive Breast Carcinoma and Ductal Carcinoma in Situ, Metastatic Tumor Deposits and Areas for Further Research," Advances in Anatomic Pathology, vol. 24, No. 5, pp. 235-251 (2017).
Hendry, Shona, et al., "Assessing Tumor-Infiltrating Lymphocytes in Solid Tumors: A Practical Review for Pathologists and Proposal for a Standardized Method from the International Immuno-Oncology Biomarkers Working Group: Part 2: TILs in Melanoma, Gastrointestinal Tract Carcinomas, Non-Small Cell Lung Carcinoma and Mesothelioma, Endometrial and Ovarian Carcinomas, Squamous Cell Carcinoma of the Head and Neck, Genitourinary Carcinomas, and Primary Brain Tumors," Advances in Anatomic Pathology, vol. 24, No. 6, pp. 311-335 (2017).
Hou, Le, et al., "Patch-Based Convolutional Neural Network for Whole Slide Tissue Image Classification," In Proceedings of the IEEE Conference on Computer Vision and Pattern Recognition, pp. 2424-2433 (2016). (ArXiv:1504.07947v5).
Hou, Le, et al., "Automatic Histopathology Image Analysis with CNNs," In 2016 New York Scientific Data Summit (NYSDS), pp. 1-6, IEEE (2016).
Hou, Le, et al., "Sparse Autoencoder for Unsupervised Nucleus Detection and Representation in Histopathology Images," Computer Vision and Pattern Recognition, vol. 86, pp. 188-200 (2017) (arXiv:1704.00406v2.
Huang, Gao, et al., "Densely Connected Convolutional Networks," In Proceedings of the IEEE Conference on Computer Vision and Pattern Recognition, pp. 4700-4708 (2017). arXiv:1608.06993v5.
Iglesia, Michael D., et al., "Prognostic B-Cell Signatures Using mRNA-seq in Patients with Subtype-Specific Breast and Ovarian Cancer," Clinical Cancer Research, vol. 20, No. 14, pp. 3818-3829 (2014).
Iglesia, Michael D., et al., "Genomic Analysis of Immune Cell Infiltrates Across 11 Tumor Types," JNCI: Journal of the National Cancer Institute, vol. 108, No. 11 (2016).
Kardos, Jordan, et al., "Claudin-Low Bladder Tumors are Immune Infiltrated and Actively Immune Suppressed," JCI Insight, vol. 1, No. 3 (2016).
Kokkinos, Iasonas, "Ubernet: Training a Universal Convolutional Neural Network for Low-, Mid-, and High-Level Vision Using Diverse Datasets and Limited Memory," In Proceedings of the IEEE Conference on Computer Vision and Pattern Recognition, pp. 6129-6138 (2017). arXiv:1609.021132v1.
Li, Bo, et al., "Comprehensive Analyses of Tumor Immunity: Implications for Cancer Immunotherapy," Genome Biology, vol. 17:174 (2016). DOI 10.1186/s13059-016-1028-7.
Masci, Jonathan, et al., "Stacked Convolutional Auto-Encoders for Hierarchical Feature Extraction," In International Conference on Artificial Neural Networks and Machine Learning, pp. 52-59. Springer, Berlin, Heidelberg, 2011.
Mlecnik, Bernhard, et al., "Tumor Immunosurveillance in Human Cancers," Cancer and Metastasis Reviews, vol. 30, No. 1, pp. 5-12 (2011).
Mlecnik, Bernhard, et al., "Histopathologic-Based Prognostic Factors of Colorectal Cancers are Associated with the State of the Local Immune Reaction," Journal of Clinical Oncology, vol. 29, No. 6, pp. 610-618 (2011).
Murthy, Veda, et al., "Center-Focusing Multi-Task CNN with Injected Features for Classification of Glioma Nuclear Images," In 2017 IEEE Winter Conference on Applications of Computer Vision (WACV), pp. 834-841. IEEE (2017). (DOI:10.1109/WACV.2017.98). (arXiv:1612.06825v2).

(56) References Cited

OTHER PUBLICATIONS

Newman, Aaron M., et al., "Robust Enumeration of Cell Subsets from Tissue Expression Profiles," Nature Methods, vol. 12, No. 5, pp. 453-457 (2015).

Noh, Hyeonwoo, et al., "Learning Deconvolution Network for Semantic Segmentation," In Proceedings of the IEEE International Conference on Computer Vision, pp. 1520-1528 (2015).

Ranzato, M. et al., "Efficient Learning of Sparse Representations with an Energy-Based Model," Advances in Neural Information Processing Systems, vol. 19, pp. 1137-1144 (2006).

Redmon, Joseph, et al., "You Only Look Once: Unified, Real-Time Object Detection," In Proceedings of the IEEE Conference on Computer Vision and Pattern Recognition, pp. 779-788 (2016). arXiv:1506.02640v5.

Ren, Shaoqing, et al., "Faster R-CNN: Towards Real-Time Object Detection with Region Proposal Networks," In Advances in Neural Information Processing Systems, pp. 91-99 (2015). arXiv:1506.01497v3.

Rooney, Michael S., et al., "Molecular and Genetic Properties of Tumors Associated with Local Immune Cytolytic Activity," Cell, vol. 160, No. 1-2 pp. 48-61 (2015).

Rutledge, W. Caleb, et al., "Tumor-Infiltrating Lymphocytes in Glioblastoma are Associated with Specific Genomic Alterations and Related to Transcriptional Class," Clinical Cancer Research, vol. 19, No. 18, pp. 4951-4960 (2013).

Salgado, Roberto, et al., "The Evaluation of Tumor-Infiltrating Lymphocytes (TILs) in Breast Cancer: Recommendations by an International TILs Working Group 2014," Annals of Oncology, vol. 26, No. 2, pp. 259-271 (2015).

Saltz, Joel, et al., "A Containerized Software System for Generation, Management, and Exploration of Features from Whole Slide Tissue Images," Cancer Research, vol. 77, No. 21, pp. e79-e82 (2017).

Saltz, Joel, et al., "Spatial Organization and Molecular Correlation of Tumor-Infiltrating Lymphocytes Using Deep Learning on Pathology Images," Cell Reports, vol. 23, pp. 181-200 (2018).

Scott, Allen J., et al., "Clustering Methods Based on Likelihood Ratio Criteria," Biometrics, vol. 27, pp. 387-397 (1971).

Simonyan, Karen, et al, "Very Deep Convolutional Networks for Large-Scale Image Recognition," Computer Vision and Pattern Recognition, arXiv preprint arXiv:1409.1556 (2014).

* cited by examiner

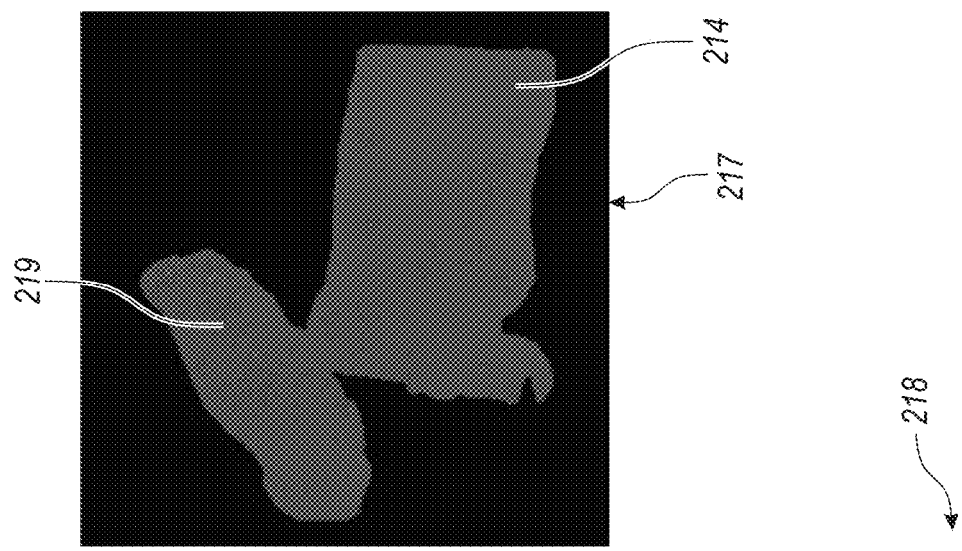
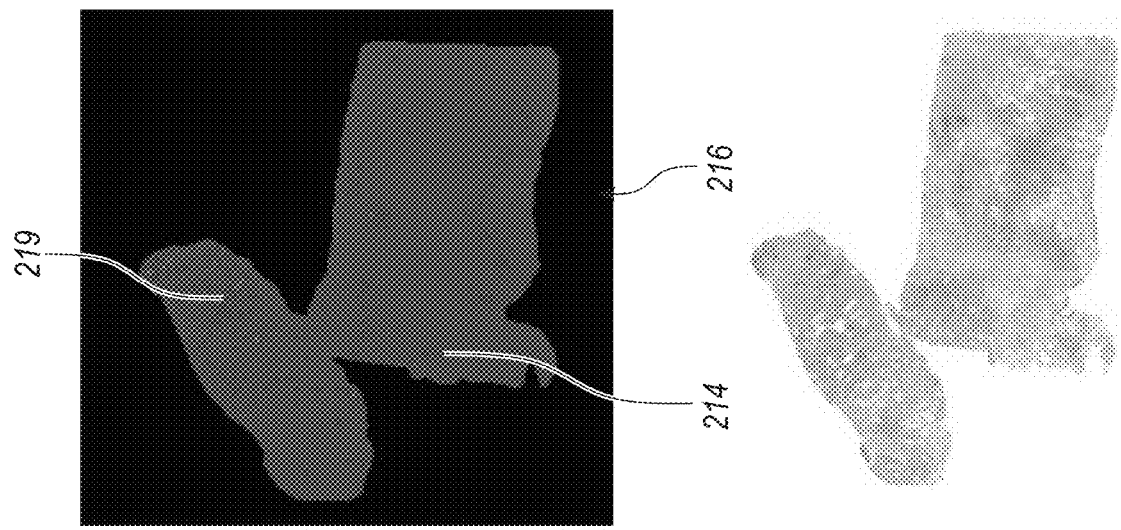
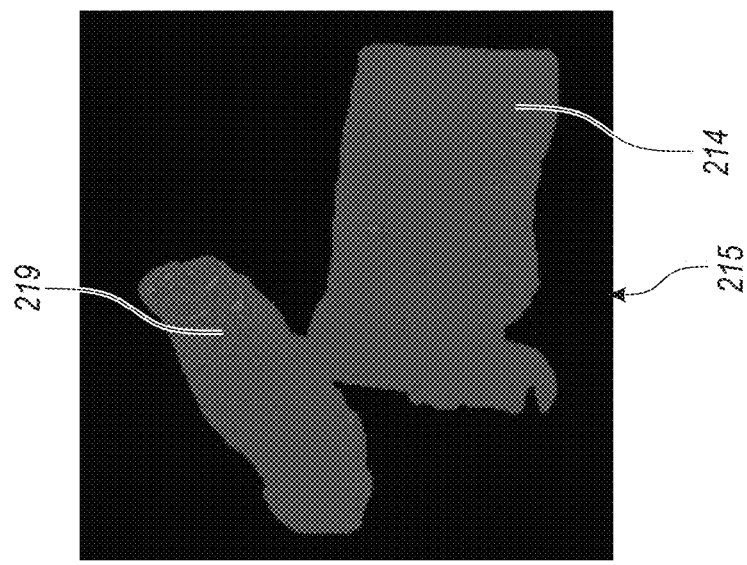
FIG. 6C

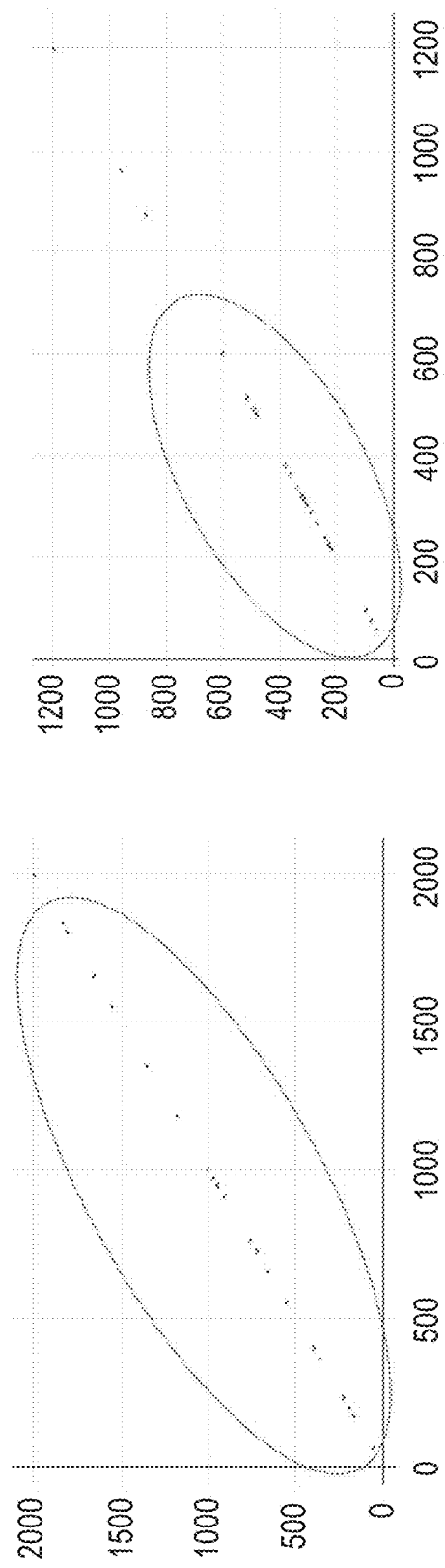
FIG. 8D

Nuclei Features

Shape: Nuclei Area, Nuclei Perimeter, Eccentricity, Circularity, Major Axis, Minor Axis, Extent Ratio

Intensity Information: Avg Inty, Std Inty, Max Inty, Min Inty

Texture Information: Energy, Entropy, Kurtosis, Skewness

Gradient Statistics: Avg GM, Std GM, Entropy GM, Skewness GM, Energy GM, Kurtosis GM, Edge Pixel Summation, Edge Pixel Percentage

FIG. 8E

Relationship Between Image and Features

Step 1: Choose a case from the TCGA atlas (case #20)

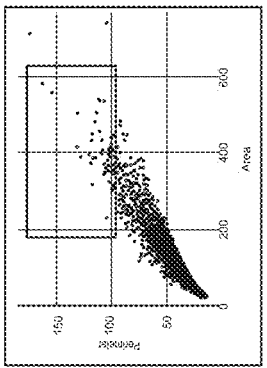

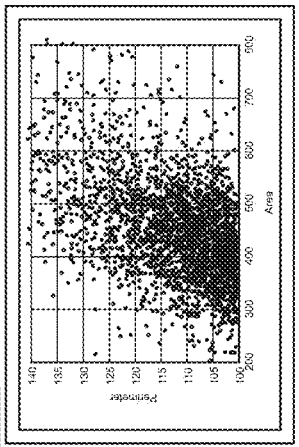

Step 2: Select two features or interest; X axis (area), Y axis (perimeter)

Step 3: Zoom in on region of interest

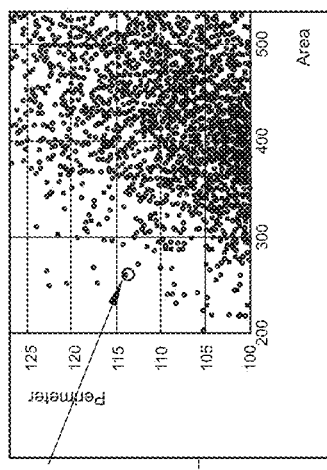

Step 4: Pick a specific nucleus of interest. Each dot represents a single nucleus

Step 5: Evaluate the features selected in the context of the specific nucleus and where this nucleus is located within the whole slide image

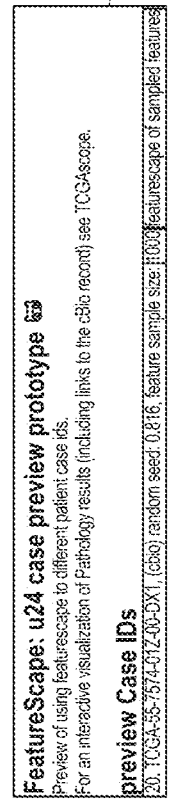

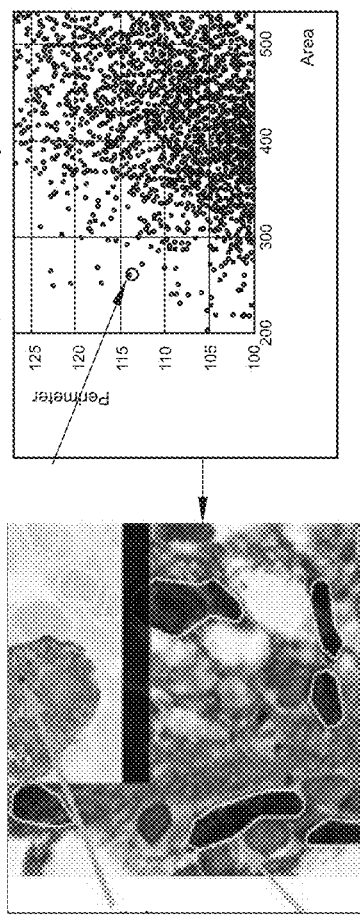

Selected nucleus geolocated within whole slide image

Detects elongated nucleus

The tool provides visual context for feature evaluation. This technique maps both intuitive features (i.e. size, shape, color) and non-intuitive features (i.e. wavelets, texture) to the ground truth of source images through an interactive web-based user interface.

FIG. 8G

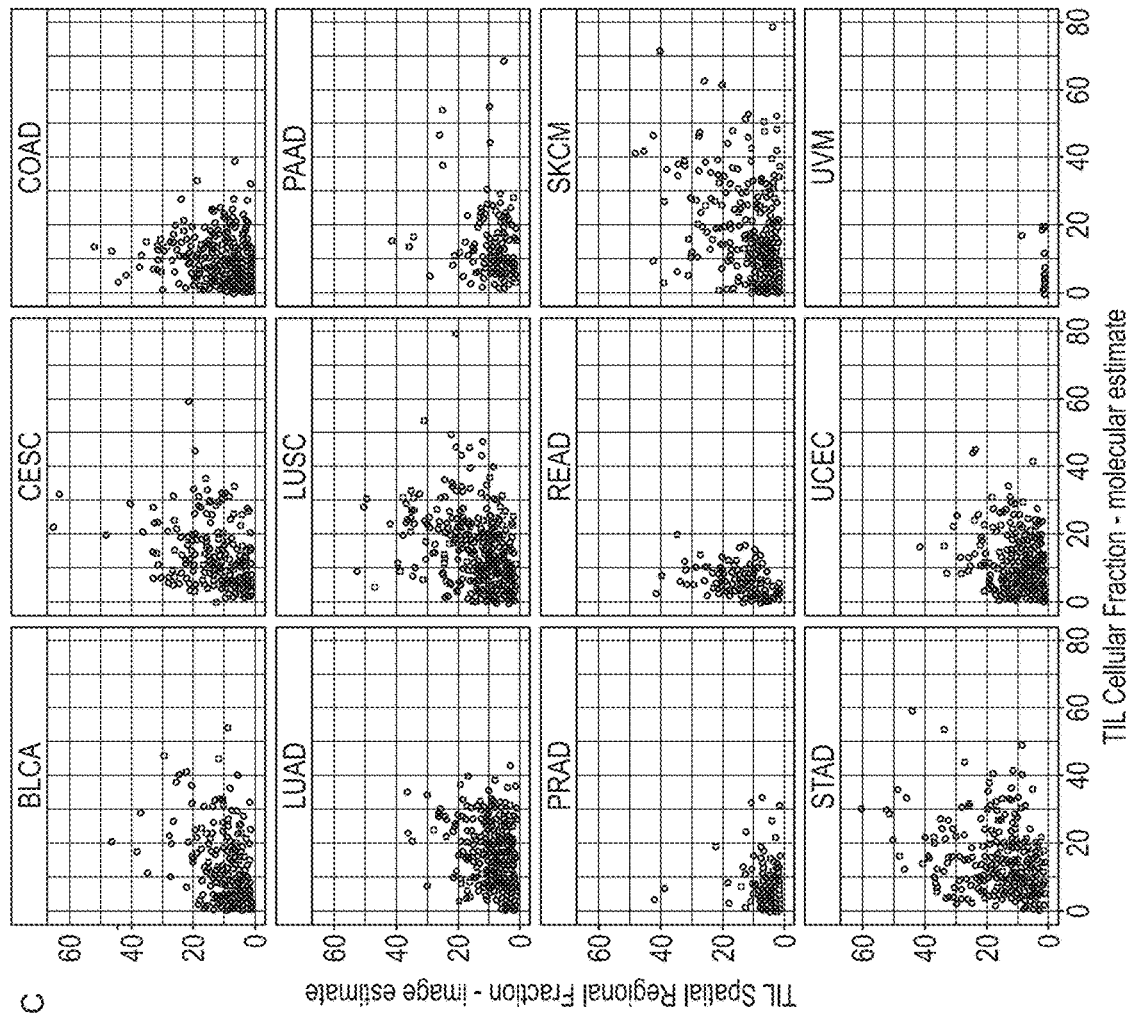
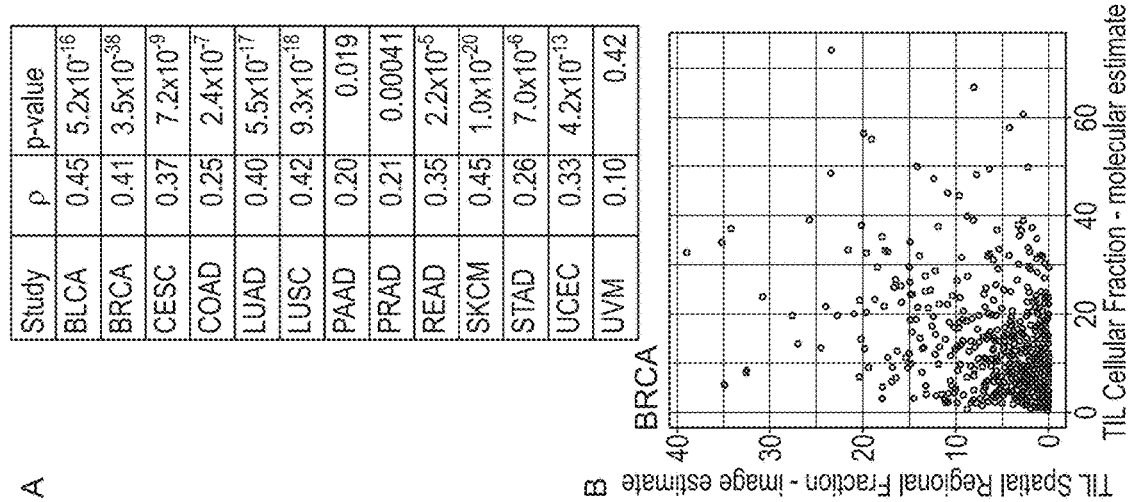
FIG. 11A

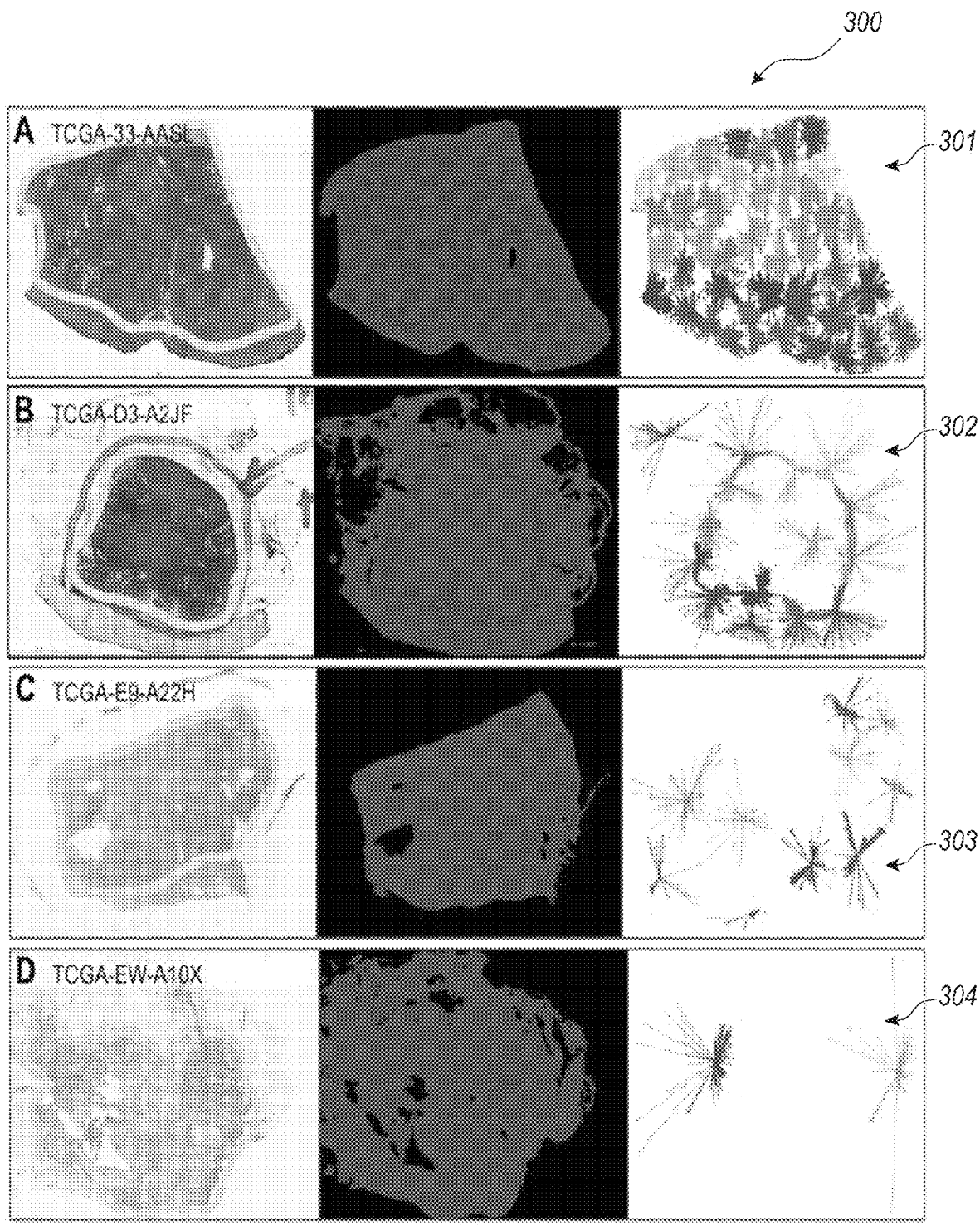
FIG. 12A-D

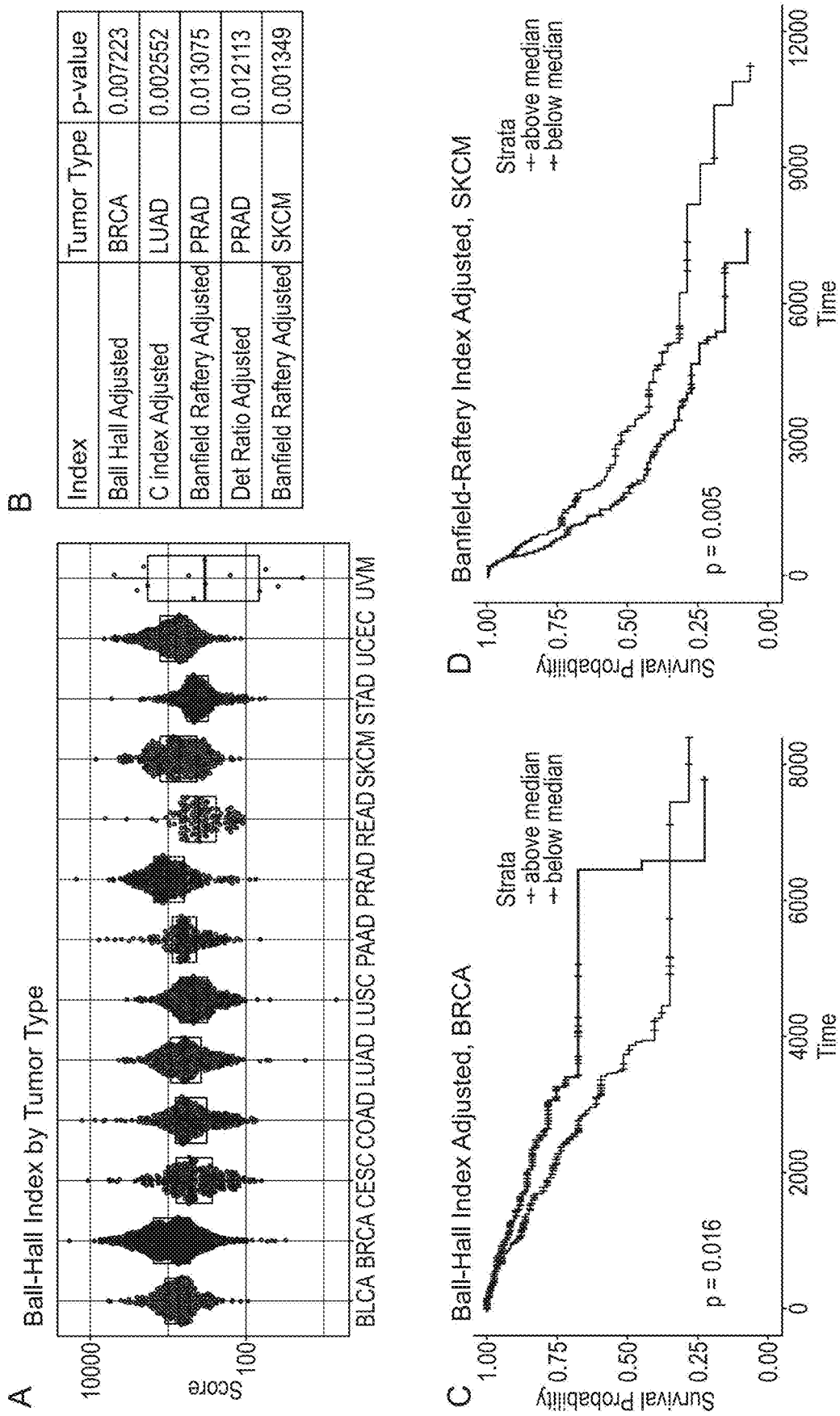
FIG. 13A-D

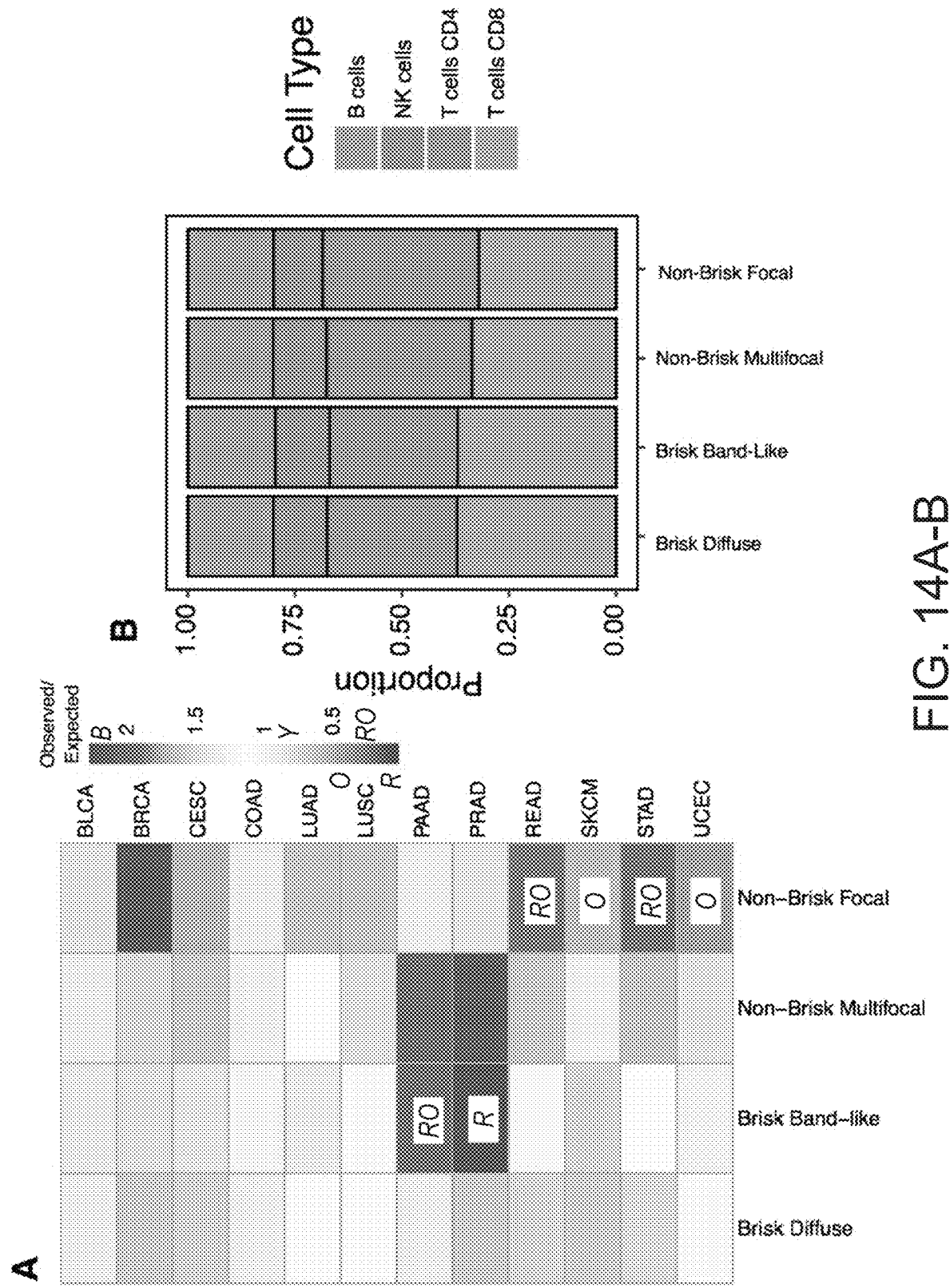
FIG. 14A-B

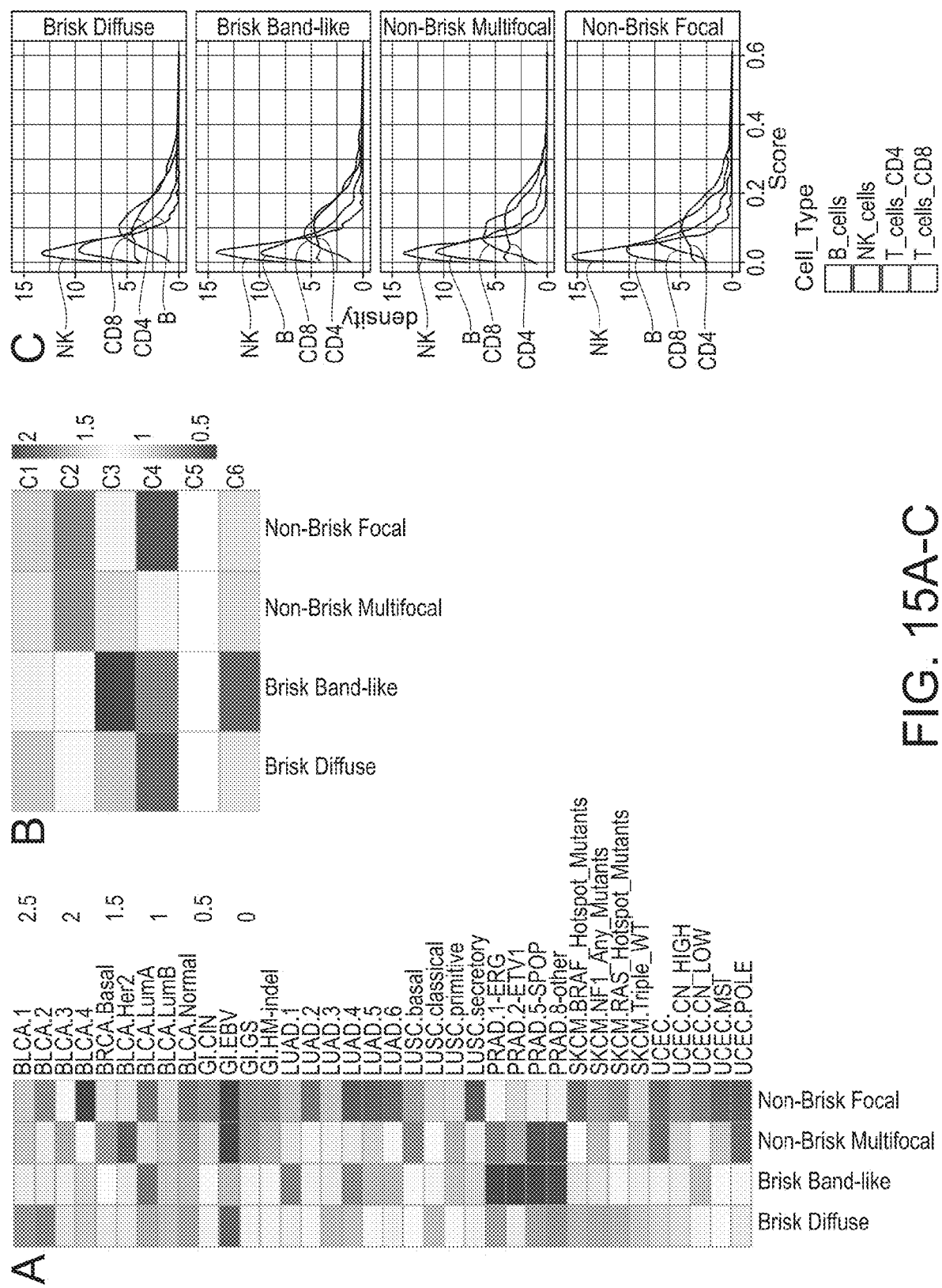
FIG. 15A-C

SYSTEM AND METHOD TO QUANTIFY TUMOR-INFILTRATING LYMPHOCYTES (TILS) FOR CLINICAL PATHOLOGY ANALYSIS BASED ON PREDICTION, SPATIAL ANALYSIS, MOLECULAR CORRELATION, AND RECONSTRUCTION OF TIL INFORMATION IDENTIFIED IN DIGITIZED TISSUE IMAGES

CROSS-REFERENCE TO RELATED APPLICATION(S)

The present application is the U.S. National Phase of, and claims priority of International Patent Application No. PCT/US2018/063231, filed on Nov. 30, 2018, which claims the benefit of both U.S. Provisional Application No. 62/592,931, filed on Nov. 30, 2017, and U.S. Provisional Application No. 62/651,677 filed on Apr. 2, 2018, the specifications of which are each incorporated by reference herein, in their entirety for all purposes.

STATEMENT OF GOVERNMENT LICENSE RIGHTS

This invention was made with government support under CA180924, CA143835, CA016672, CA199461, and HHSN261200800001E awarded by the National Institutes of Health. The government has certain rights in the invention.

FIELD OF THE DISCLOSURE

The present disclosure relates to a system and method associated with clinically processing, analyzing, and analyzing tumor-infiltrating lymphocytes (TILs) based on prediction, spatial analysis, molecular correlation, and reconstruction of TIL information associated with copious digitized pathology tissue images. Even more particularly, the present invention relates to a novel system and method that trains a classification model in order to predict the respective labeling of TILs associated with computationally stained and digitized whole slide images of stained (for example, with Hematoxylin and Eosin (H&E)) pathology specimens obtained from biopsied tissue, and spatially characterizing TIL Maps that are generated by the system and method. Such disclosed system and method may be implemented to further refine respective tumoral classification and prognosis of tumoral tissue samples.

BACKGROUND

Recent advances in digital histopathology image analysis and other applications implementing image analysis have resulted in the development of numerous detection, classification, and segmentation methods for nuclei and other micro-anatomic features and structures. Reliability and performance of such micro-anatomic structure detection, classification and segmentation system and methods vary from specimen to specimen with performance depending on various factors including tissue preparation, staining and imaging. A robust error assessment stage can play a role in assessing quality of micro-anatomic structure detection, classification and segmentation, and essentially facilitating an end-to-end process for whole slide image analysis, quality control, and increased value in quantification of information determined in such image analysis process.

Complex segmentation of nuclei in whole slide tissue images, is considered a common methodology in pathology image analysis and quality control of such algorithms are being implemented to improve segmentation results. Most segmentation algorithms are sensitive to input algorithm parameters and the characteristics of input images (tissue morphology, staining, etc.). Since there can be large variability in the color, texture, and morphology of tissues within and across cancer types (for example, heterogeneity can exist even within a tissue specimen such that the quality or state of the specimen manifests as non-uniform and/or diverse in character or content), it is likely that a set of input parameters will not perform well across multiple images. It is, therefore, vital and necessary in some cases, to carry out a quality control process of any digital pathology systems that require any such segmentation results.

As image scanning technologies advance, large volumes of whole-slide tissue images will be available for research and clinical use. Hence, efficient approaches for the quality, and robustness of output from computerized image analysis workflows, and respective diagnostic applications, will become increasingly critical to extracting useful quantitative information from tissue images. The disclosed embodiments demonstrate the feasibility of machine-learning-based semi-automated techniques to assist researchers and algorithm developers in such processes.

Whole-slide tissue specimens have long been used to examine how the disease manifests itself at the subcellular level and modifies tissue morphology. By examining glass tissue slides under high-power microscopes, pathologists evaluate changes in tissue morphology and can render diagnosis about a patient's state. Advances in digital pathology imaging have made it feasible to capture high-resolution whole-slide tissue images rapidly. Coupled with decreasing storage and computation costs, digital slides have enabled new opportunities for research. Research groups have developed techniques for quantitative analysis of histopathology images and demonstrated the application of tissue imaging in disease research.

Nucleus/cell detection and segmentation are common methodologies in tissue image analysis. Over the past decade, researchers have developed a variety of nucleus segmentation methods. Nucleus segmentation pipelines process images to detect the locations of nuclei and extract their boundaries. Once the boundaries of nuclei are determined, imaging features (such as size, intensity, shape, and texture features) can be computed for each segmented nucleus and used in downstream analyses for mining and classification and even other respective analysis. Achieving accurate and robust segmentation results is desirable in cancer diagnostics because of image noise, such as image acquisition artifacts, differences in staining, and variability in nuclear morphology within and across tissue specimens. It is not uncommon that a segmentation pipeline optimized for a tissue type will produce bad segmentations in images from other tissue types, and even in different regions of the same image. So, implementation of accurate segmentation methods is desirable in cancer diagnostics.

Further to this layer of digital pathology analysis that employs quality control of segmentation methods, the effectiveness of cancer diagnostics and/or predicting the effectiveness of therapies, as well as population studies that quantify incidence and mortality, further hinge upon accurate, reproducible and nuanced pathology characterizations, even beyond the implementation of accurate segmentation methods. In many scenarios, biopsied tissue samples are commonly stained with Hematoxylin and Eosin (H&E), and the resulting slides are prepared for patients and examined by a pathologist. However, human review of diagnostic tissue is qualitative, and is therefore proven to be prone to high amounts of inter-observer and/or intra-observer variability and hence, varied valuations rendering such review deficient in generating targeted and useful diagnostic assessments and/or refined classifications of cancer cells.

Hence, digital pathology, or the review of digitized pathology slides, is gaining more traction, because quantitative measurements on digitized whole slide images, lead to reproducible and significantly nuanced observations that can generate improved diagnostic classifications and/or assessments associated with a range of detected cancer cell types. The recent FDA approval of whole slide imaging for primary diagnostic use is leading to the adoption of digital whole slide imaging. It is expected that within 5-10 years, the majority of new pathology slides will be digitized and hence, analysis will be based on such digitized slides. Being able to reliably quantitate with reproducibility is significant not only for correlative or prognostic studies, but also for gaining a deeper mechanistic understanding of the role of intra-tumoral immunity in cancer progression, more refined level of classification, diagnosis and/or treatment.

Although studies in humans have shown that chronic inflammation promotes tumorigenesis, the host immune system is equally capable of controlling tumor growth through the activation of adaptive and innate immune mechanisms. Such intra-tumoral processes, referred to collectively as immunoediting, can nonetheless lead to selection of tumor cells that escape immune surveillance and, ultimately, to tumor progression. At the same time, many observations suggest that high densities of tumor-infiltrating lymphocytes (TILs) correlate with favorable clinical outcomes, such as longer disease-free survival or improved overall survival (OS) in multiple cancer types. Recent studies further suggest that the spatial context and the nature of cellular heterogeneity of the tumor microenvironment, in terms of the immune infiltrate into the tumor center and/or invasive margin, are important and correlate with cancer prognosis. Prognostic factors, most notably the Immunoscore, that quantify such spatial TIL densities in different tumor regions have been shown to have improved and more useful prognostic value that can significantly supplement and even supersede the standard TNM classification and staging.

However, while TILs and spatial characterizations of TILs have shown significant value in diagnostic and prognostic settings, the ability to quantify TILs from diagnostic tissue has proven to be challenging, expensive, hard to scale, and is often subjective too.

The surge of digital pathology and impasse created from the proliferation of digitized whole slide diagnostic tissue images has necessarily resulted in datasets that are generally copious and burdensome to analyze in terms of differences and/or anomalies among such images of datasets. Therefore, the useful analysis thereof and deduction of information such as quantification of useful values for classification and/or diagnosis of tumor cells has proven challenging. As a result, there is a desire to apply novel machine learning and deep learning techniques in a related system and method that creates a Computational Stain, that permits efficient identification of image features, more accurate quantification of image features, and formulation of higher-order relationships that go beyond mere simple densities (e.g. of TILs).

Hence, it is desirable to implement a system and method that identifies and analyzes more effectively, TIL proximities (for example, distances) to regions containing tumor cells. Such computations help generate distributions of distances, the parameters of which are believed to have prognostic value. Computational stains are also amenable to integration with genomic data and have been shown to have proven diagnostic and prognostic value. Finally, the methodology of computational staining is scalable, cost effective, and deployable in clinical settings well beyond prior methods. Prior work in diagnostic imaging have either utilized multiple MC (ImmunoHistoChemical) stains or requires significant effort in tuning the algorithm. Neither approach is generalizable or scalable, as the disclosed system and method and thus such prior methods are unlikely to be adopted in clinical care.

Hence, it is further desirable to implement a novel, scalable and cost-effective methodology for computational staining to extract and characterize lymphocytes and lymphocytic infiltrates in intra-tumoral, peri-tumoral, and/or adjacent stromal regions.

It is further desirable to implement a novel system and method to extract, quantify, characterize and correlate TIL Maps using digitized H&E stained diagnostic tissue slides that are routinely obtained as part of cancer diagnosis. This novel approach combines novel deep learning algorithms, as well as methodological optimizations that also incorporates and automates implementation of the intelligence and expert feedback from pathologists, without being overly disruptive or burdensome, and yet, is proven to be effective and useful in more refined cancer classifications and/or diagnosis.

It is further desirable to implement a novel TIL quantification system and method that determines distributions of distances such as TIL proximities to regions of tissue containing tumor cells using computation stains methods and CNN lymphocyte prediction algorithms that are used to iteratively predict and be used to determine useful prognostic values for more refined and accurate diagnosis and/or more accurate classification of tumor cells.

It is yet further desirable to implement a novel system and method, in which deep learning models (for example lymphocyte infiltration classification CNN and a necrosis segmentation algorithm) are implemented to carry out unsupervised, simultaneous nucleus detection and feature extraction in histopathology tissue images. The system detect and encodes nuclei in image patches into feature maps that encode both the location and appearance of nuclei.

It is yet further desirable to implement a novel system and method, in which deep classification learning models (for example, lymphocyte infiltration classification CNN and a necrosis segmentation algorithm) are implemented to generate tumor infiltrating lymphocyte maps that are useful in generating prognostic values in diagnosis and/or related classification.

In yet further disclosed embodiments, a classifier is then trained with the features and the labels assigned by the pathologist. At the end of this process, a classification model is generated, trained and even further re-trained. The classification step applies the classification model to unlabeled test images. Each test image is partitioned into patches. The classification model is then applied to each patch to predict the patch's label with respect to identified TILs and respective threshold levels.

It is yet further desirable to implement a system and method associated with novel machine learning and deep learning techniques to create a computational stain on whole slide tissue images, that allows expert practitioners to identify and quantify image features and formulate higher-order relationships that go beyond simple densities (e.g. of TILs), such as TIL proximities (distances) to regions containing tumor cells. Such computations are useful in generating distributions of distances, the parameters of which are found to have prognostic value. Computational stains are also amenable to integration with genomic data and have been shown to have strong diagnostic and prognostic value.

It is yet further desirable to implement a novel, scalable and cost-effective methodology for computational staining to extract and characterize lymphocytes and lymphocytic infiltrates in intra-tumoral, peri-tumoral, and adjacent stromal regions. The methodology of computational staining is scalable, cost effective, and deployable in clinical settings.

SUMMARY OF THE INVENTION

In accordance with an embodiment or aspect, the present technology is directed to a system and method associated with quantifying a density level of tumor-infiltrating lymphocytes, based on prediction of reconstructed TIL information associated with tumoral tissue image data during pathology analysis of the tissue image data. The system comprises a TIL Map engine that includes a processing device.

In accordance with an embodiment or aspect, disclosed is the system and method that includes the processing device perform operations that include receiving digitized diagnostic and stained whole-slide image data related to tissue of a particular type of tumoral data. The system and method further includes defining regions of interest that represents a portion of, or a full image of the whole-slide image data. The system and method further includes encoding the image data into segmented data portions based on convolutional autoencoding of objects associated with the collection of image data. The system and method yet further includes determining the density of tumor-infiltrating lymphocytes of bounded segmented data portions for respective classification of the regions of interest. The system and method yet further includes assigning a classification label to the regions of interest. The system and method yet further includes determining whether an assigned classification label is above a pre-determined threshold probability value of lymphocyte infiltrated. The system and method yet further includes adjusting the threshold probability value in order to re-assign the classification label to the regions of interest based on a varied sensitivity level of density of lymphocyte infiltrated. The system and method yet further includes generating a trained classification model based on the re-assigned classification labels to the regions of interest associated with segmented data portions using the adjusted threshold probability value. The system and method yet further includes receiving unlabeled image data set to iteratively classify the segmented data portions based on a lymphocyte density level associated with portions of the unlabeled image data set, using the trained classification model. The system and method yet further includes generating tumor-infiltrating lymphocyte representations based on prediction of TIL information associated with classified segmented data portions. Yet further included is generating a refined TIL representation based on prediction of the TIL representations using the adjusted threshold probability value associated with the classified segmented data portions.

In yet a further disclosed embodiment, the system and method further includes assigning the classification label to the regions of interest, which further comprises analysis of one or more of: different tissue types, textures, lymphocyte infiltration patterns individual lymphocytes, aggregated lymphocytes, intensity values, texture information, nuclei features, and gradient statistics associated with the segmented data portions. The system and method includes additional embodiments which are provided herein below respectively. The system and method further includes that generating the refined TIL representation further comprises spatial analysis of the TIL information. The system and method further includes that generating the refined TIL representation further comprises molecular correlation analysis associated with the classified segmented data portions. The system and method yet further includes that generating the refined TIL representation further comprises spatial analysis of the TIL information. The system and method yet further includes that generating the refined TIL representation further comprises molecular correlation analysis associated with the classified segmented data portions. The system and method yet further includes the trained classification model is based on a lymphocyte CNN. The system and method yet further comprises adjusting the predetermined threshold value to achieve a further refined TIL prediction level. The system and method yet further comprises the predetermined threshold value being adjusted in the range of a 0.0 and 1.0, using lymphocyte prediction scores. The system and method yet further includes the trained classification model is based on a necrosis CNN. The system and method yet further comprises adjusting the predetermined threshold value to achieve a further refined TIL prediction level. The system and method yet further comprises comprises the predetermined threshold value being adjusted in the range of a 0.0 and 1.0, using necrosis prediction scores. The system and method yet further comprises a lymphocyte CNN and necrosis CNN being used to assign prediction values for each segmented data region as one of: TIL positive, TIL negative and the likehood of TIL value. The system and method yet further comprises that any stain comprises hematoxylin and eosin (H&E) or Immunohostochemical Stain. The system and method yet further includes that generating a refined TIL representation further comprises a single CNN predicting the TIL representations to generate a final TIL representation.

In accordance with yet another disclosed embodiment, a computer readable device is disclosed storing instructions that, when executed by a processing device, performs various operations. The operations include receiving a collection of digitized diagnostic and stained whole-slide image data related to tissue of a particular type of tumoral data. Further disclosed operations include defining regions of interest that represents a portion of, or a full image of the whole-slide image data. Yet further disclosed operations include encoding the image data into segmented data portions based on convolutional autoencoding of objects associated with the collection of image data. Yet further disclosed operations include determining the density of tumor-infiltrating lymphocytes of bounded segmented data portions for respective classification of the regions of interest. Yet further disclosed operations include assigning a classification label to the regions of interest. Yet further disclosed operations include determining whether an assigned classification label is above a pre-determined threshold probability value of lymphocyte infiltrated. Yet further disclosed operations include adjusting the threshold probability value in order to re-assign the classification label to the regions of interest based on a varied sensitivity level of density of lymphocyte infiltrated. Yet further disclosed operations include generating a trained classification model based on the re-assigned classification labels to the regions of interest associated with segmented data portions using the adjusted threshold probability value. Yet further disclosed operations include receiving unlabeled image data set to iteratively classify the segmented data portions based on a lymphocyte density level associated with portions of the unlabeled image data set, using the trained classification model. Yet further disclosed operations include generating tumor-infiltrating lymphocyte representations based on prediction of TIL information associated with classified segmented data portions. Yet further disclosed operations include generating a refined TIL representation based on prediction of the TIL representations using the adjusted threshold probability value associated with the classified segmented data portions.

In yet another disclosed embodiment, the computer readable device performs additional operations that include that any stain comprises hematoxylin and eosin (H&E) or Immunohostochemical stain. Yet other disclosed operations include that generating a refined TIL representation further comprises a single CNN predicting the TIL representations to generate a final TIL representation. Yet other disclosed operations include that the trained classification model is based on one or more of: a lymphocyte CNN and a necrosis CNN.

These and other purposes, goals and advantages of the present application will become apparent from the following detailed description read in connection with the accompanying drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

Some embodiments or aspects are illustrated by way of example and not limitation in the figures of the accompanying drawings in which:

FIG. 6C are exemplary TIL maps that are generated and further edited based on selected threshold values (as also described in FIG. 3A), in accordance with an embodiment of the disclosed system and method.

FIG. 8D provides an overview of example tissue sample image slides from the same patient at the same magnification, and respective graphical representations of cancer nuclei of smaller and larger size ranges, in accordance with an embodiment of the disclosed system and method.

FIG. 8E provides an overview of exemplary nuclear and cell morphometry features that are analyzed including intensity information, texture information and gradient statistics, in accordance with an embodiment of the disclosed system and method.

FIG. 8G provides a screenshot of an overview of the relationship between images and features, the mapping of both intuitive features and non-intuitive features, and the evaluation of features selected from tissue patch sample(s), in accordance with an embodiment of the disclosed system and method.

FIG. 11A provides a graphical representation comparison of TIL proportion from imaging and molecular estimates, in accordance with an embodiment of the disclosed system and method.

FIGS. 12A-D provide examples of TIL Map Structural Patterns, in accordance with an embodiment of the disclosed system and method.

FIGS. 13A-D provide the associations of TIL Local Spatial Structure with Cancer Type and Survival in various graphical representations, in accordance with an embodiment of the disclosed system and method.

FIGS. 14A-B provides a graphical representation of the association of spatial structural patterns with tumor type and cell fractions, in accordance with an embodiment of the disclosed system and method.

FIGS. 15A-C provide a graphical representation of enrichment of TIL Structural Patterns, in particular the enrichment of structural patterns among TCGA tumor molecular subtypes in FIG. 15A and among immune subtypes shown in FIG. 15B, in accordance with an embodiment of the disclosed system and method (as also related to FIGS. 14A-C).

Figure 1A:
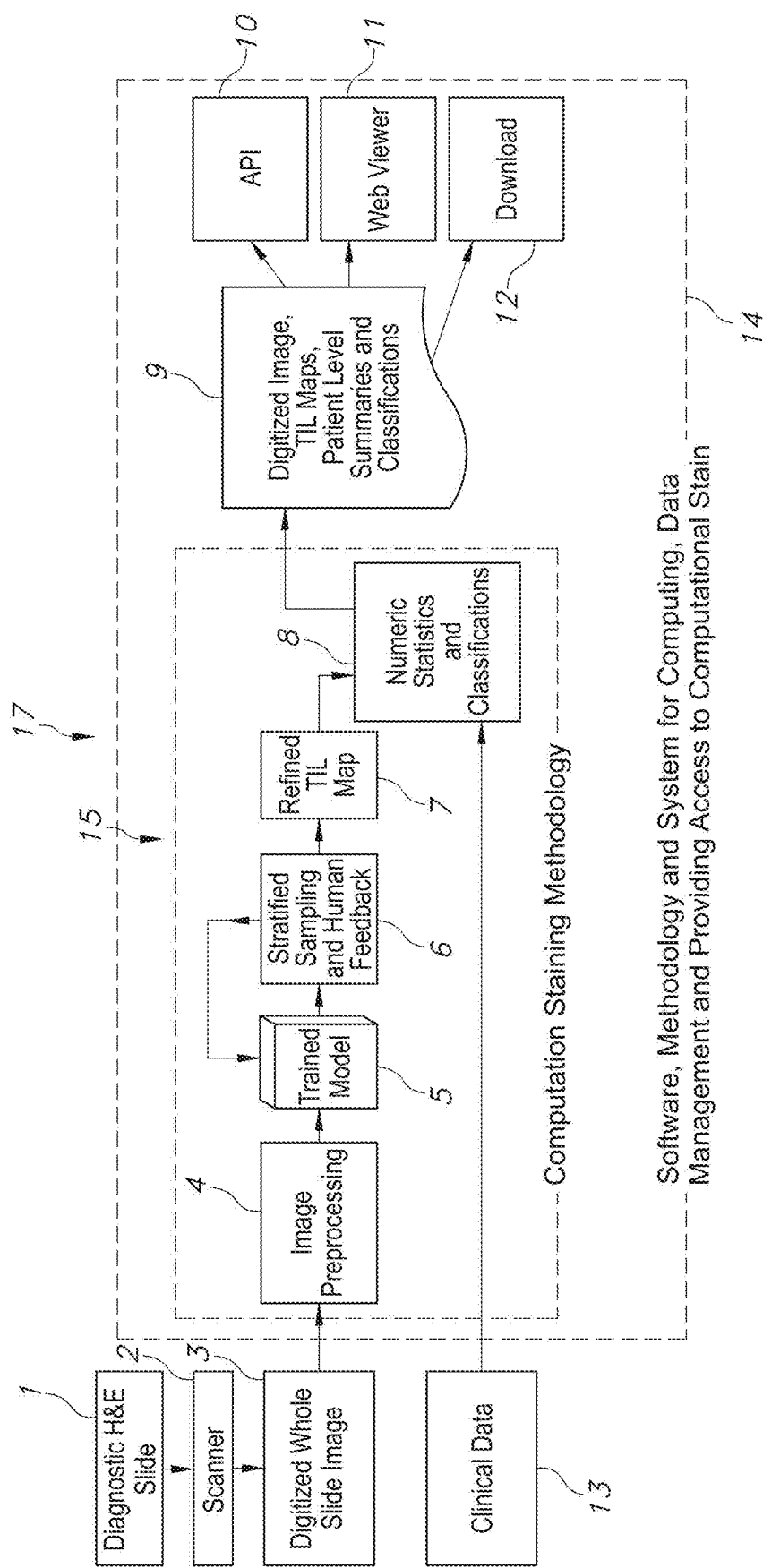
FIG. 1A illustrates an example system overview of using Computational Staining method in determining refined TIL information, generating and disseminating TIL Maps using standard digitized diagnostic tissue image dataset, in accordance with an embodiment of the disclosed system and method.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The present disclosure relates to a system and method associated with clinically processing, analyzing, and quantifying tumor-infiltrating lymphocytes (TILs) based on prediction, spatial analysis, molecular correlation, and reconstruction of TIL information associated with copious digital pathology images. Even more particularly, the present invention relates to a novel system and method that trains a classification model in order to predict the respective labeling of TILs associated with computationally stained and digitized whole slide images of Hematoxylin and Eosin (H&E) stained pathology specimens obtained from biopsied tissue, and spatially characterizing TIL Maps that are generated by the system and method. Such disclosed system and method may be implemented to further refine respective tumoral classification and prognosis of tumoral tissue samples.

Historically, histopathology images are crucial to the study of complex diseases such as cancer. The histologic characteristics of nuclei play a key role in disease diagnosis, prognosis and analysis. In accordance with an embodiment, disclosed is a Convolutional Autoencoder (CAE) for fully unsupervised, simultaneous nucleus detection and feature extraction in histopathology tissue images that is proven useful for the pipeline of digital image pathology analysis, including the quantification of TILs used in the classification and prognosis of cancer cells.

In accordance with an embodiment, the CAE detects and encodes nuclei in image patches in tissue images into sparse feature maps that encode both the location and appearance of nuclei. The CAE is the first unsupervised detection network for computer vision applications. The pre-trained nucleus detection and feature extraction modules in the CAE can be fine-tuned for supervised learning in an end-to-end fashion. The method was evaluated on four datasets and the CAE reduced errors of state-of-the-art methods up to 42%. The CAE system was able to achieve comparable performance with only 5% of the fully-supervised annotation cost.

Pathologists routinely examine glass tissue slides for disease diagnosis in healthcare settings. Nuclear characteristics, such as size, shape and chromatin pattern, are important factors in distinguishing different types of cells and diagnosing disease stage. Manual examination of glass slides, however, is not feasible in large scale research studies which may involve thousands of slides. For example, automated analysis of nuclei can provide quantitative measures and new insights to disease mechanisms that cannot be gleaned from manual, qualitative evaluations of tissue specimens.

Collecting a large-scale supervised dataset is a labor intensive and challenging process since it requires the involvement of expert pathologists whose time is a very limited and expensive resource. Thus, in accordance with an embodiment, existing state-of-the-art nucleus analysis methods are semi-supervised, so disclosed is an unsupervised representation method that employs the following steps: 1). Pre-train an autoencoder for unsupervised representation learning; 2). Construct a CNN from the pretrained autoencoder; and 3). Fine-tune the constructed CNN for supervised nucleus classification. In order to better capture the visual variance of nuclei, one usually trains the unsupervised autoencoder on image patches with nuclei in the center. This requires a separate nucleus detection step which in most cases, requires further fine-tuning to optimize the final classification performance.

An alternative to fine-tuning the detection and classification modules separately, certain systems trained end-to-end CNNs to perform these tasks in a more unified pipeline. Prior works have developed and employed supervised networks. In order to utilize unlabeled data for unsupervised pre-training, a network that can be trained end-to-end must perform unsupervised nucleus detection. Such unsupervised detection networks do not exist in any visual application domains, despite the success of unsupervised learning in other tasks. As discussed in greater detail hereinbelow with respect to at least FIGS. 1B and 2A-2C, respective embodiments of the fully unsupervised autoencoder are shown and described.

Furthermore, beyond sample curation and basic pathologic characterization, digitized hematoxylin and eosin stained (H&E-stained) images of The Cancer Genome Atlas (TCGA) samples, remain underutilized.

In accordance with an embodiment, tumor-infiltrating lymphocytes (TILs) are identified from standard pathology cancer images by a deep-learning-derived "computational stain". The disclosed system and method processed 5,202 digital images from 13 cancer types. Resulting TIL maps that were generated by the system, were correlated with TCGA molecular data, relating TIL content to survival, tumor subtypes, and immune profiles.

More particularly, disclosed is a system and method associated with deep learning based computational stain for staining tumor-infiltrating lymphocytes (TILs). In an example implementation using the system, TIL patterns were generated from 4,759 TCGA subjects (5,202 H&E slides), with 13 cancer types. Computationally stained TILs are essentially correlated with pathologist eye and molecular estimates. TIL patterns linked to tumor and immune molecular features, cancer type, and outcome are identified using the example system and method.

More particularly, in order to illustrate an exemplary implementation that reveals the significance of identifying and generating such TIL patterns, disclosed is a system and method associated with generating mappings of tumor-infiltrating lymphocytes (TILs) based on H&E images from 13 TCGA tumor types. These TIL maps are derived through computational staining using a convolutional neural network trained to classify patches of images. In accordance with an embodiment, affinity propagation revealed local spatial structure in TIL patterns and correlation with overall survival. TIL map structural patterns were grouped using standard histopathological parameters. These patterns are enriched in particular T cell subpopulations derived from molecular measures. TIL densities and spatial structure were differentially enriched among tumor types, immune subtypes, and tumor molecular subtypes, implying that spatial infiltrate state could reflect particular tumor cell aberration states. Obtaining spatial lymphocytic patterns linked to the rich genomic characterization of TCGA samples demonstrates one example implementation of significance for the TCGA image archives that render profound insights into the tumor-immune microenvironment.

Although studies in humans have shown that chronic inflammation can promote tumorigenesis, the host immune system is equally capable of controlling tumor growth through the activation of adaptive and innate immune mechanisms. Such intra-tumoral processes are often referred to collectively as immunoediting, wherein this selective pressure can result in the emergence of tumor cells that escape immune surveillance and, ultimately, leads to tumor progression. At the same time, many observations suggest that high densities of tumor-infiltrating lymphocytes (TILs) correlate with favorable clinical outcomes such as longer disease-free survival or improved overall survival (OS) in multiple cancer types. Recent studies further suggest that the importance of spatial context and the nature of cellular heterogeneity of the tumor microenvironment, in terms of the immune infiltrate involving the tumor center and/or invasive margin, can also correlate with cancer prognosis. Prognostic factors, most notably the Immunoscore, that quantify such spatial TIL densities in different tumor regions have high prognostic value that can significantly supplement and sometimes even supersede the standard TNM classification and staging in certain settings. Given this and the central role of immunotherapy treatments in contemporary cancer care, these assessments of tumor-associated lymphocytes are increasingly important both in the clinical assessment of pathology slides, as well as in translational research into the role of these lymphocytic populations.

Tissue diagnostic studies are carried out and interpreted by pathologists for virtually all cancer patients, and the overwhelming majority of these are stained with hematoxylin and eosin (H&E). The TCGA Pan Cancer Atlas dataset includes representative H&E diagnostic whole-slide images (WSIs) that enable spatial quantification and analysis of TILs and association with the wealth of molecular characterization conducted through the TCGA. Previously, this rich trove of imaging data has primarily been used solely to qualify samples for TCGA analysis and gleaning of some limited histopathologic parameters by expert pathologists. Using digital pathology and digitized whole-slide diagnostic tissue images, machine learning and deep learning approaches can create a "Computational Stain." It is noted that the stained images contemplated in this disclosure, contemplates that other forms of stains that may currently be considered more expensive but potentially, less expensive in the future, are contemplated, hence H&E computational staining and other types of staining with other type(s) of chemicals or compounds is contemplated herein. The computational stain allows identification and quantification of image features to formulate higher-order relationships that go beyond simple densities (e.g., of TILs) to explore quantitative assessments of lymphocyte clustering patterns, as well as characterization of the interrelationships between TILs and tumor regions. Such TIL information is applied to the TCGA samples in a broad multi-cancer fashion. Historically, only a few TCGA tumor types have been explored for TIL content based on feature extraction from histologic H&E images and in a more limited fashion.

Over the past 12 years, The Cancer Genome Atlas (TCGA) has profoundly illuminated the genomic landscape of human malignancy. More recently, the TCGA has recognized that genomic data derived from bulk tumor samples, which include the tumor stromal, vascular, and immune compartments, as well as tumor cells, can provide detailed information about the tumor immune microenvironment. Molecular subtypes of ovarian, melanoma, and pancreatic cancer have been defined based on measures of immune infiltration (Cancer Genome Atlas Research Network, 2011; Cancer Genome Atlas Network, 2015; Bailey et al., 2016), and a number of other tumors show variation in immune gene expression by molecular subtype (Iglesia et al., 2014, 2016; Kardos et al., 2016). Recent publications (Charoentong et al., 2017; Li et al., 2016; Rooney et al., 2015) have presented comprehensive analyses of TCGA data on the basis of immune content response. A recent study (Thors son et al., 2018) reports on a series of immunogenomic characterizations that include assessments such as total lymphocytic infiltrate, immune cell type fractions, immune gene expression signatures, HLA type and expression, neoantigen prediction, T cell and B cell repertoire, and viral RNA expression. From these base-level results, integrative analyses were performed to derive six immune subtypes, spanning tumor types and subtypes. The comprehensive pairing of clinical, sample, molecular tumor, and immune characterizations with H&E WSIs in the TCGA is a unique resource (Cooper et al., 2017) that offers the possibility of identifying relationships between computational staining of whole-slide images and other measures of immune response that may in turn provide well-informed research into immunooncological therapy.

Accordingly, disclosed is an embodiment of the spatial organization and molecular correlation of TILs using computational stains and deep learning CNN algorithms, that determines and analyzes spatial patterns of TILs. The quantification of such TILs can also be determined. Further disclosed, is a system and method that identifies relationships between TIL patterns and immune subtypes, tumor types, immune cell fractions, and patient survival, illustrating the potential of this kind of analysis, and further, the additional questions that can be further explored and/or analyzed with respect thereto. For example, through integration of spatial patterns with molecular TIL characterization using the disclosed system and method, these patterns are shown to be enriched in particular T cell populations.

Using an embodiment of the disclosed system and method, tumor-infiltrating lymphocytes (TILs) were identified from standard pathology cancer images by a deep-learning derived "computational stain" that was developed. The disclosed system and method processed 5,202 digital images from 13 cancer types. Resulting TIL maps were correlated with TCGA molecular data, relating TIL content to survival, tumor subtypes, and immune profiles.

This study represents a significant milestone in the use of digital-pathology-based quantification using TILS. Using the disclosed system and method, results were determined relating spatial and molecular tumor immune characterizations for roughly 5,000 patients with 13 cancer types. TILs and spatial characterizations of TILs have shown to manifest significant value in diagnostic and prognostic settings, and the ability to quantify TILs from diagnostic tissue has proven to be demanding, expensive, challenging to scale, and beleaguered by subjectivity.

Human review of diagnostic tissue is highly effective for traditional diagnosis, but is qualitative, and thus is prone to both inter-observer and/or intra-observer variability, particularly when attempting to quantify or reproducibly characterize feature-rich phenomena such as tumor-associated lymphocytic infiltrates. The spatial characterizations that are identified by an example embodiment of the disclosed system and method are high resolution, with TIL infiltration assessed in whole-slide images at a 50-micron resolution. All TIL maps are available to the scientific community for further exploration. The recent FDA approval (FDA News Release, 2017) of whole-slide imaging for primary diagnostic use is leading to even more widespread adoption of digital whole-slide imaging. It is widely expected that, within 5-10 years, the great majority of new pathology slides will be digitized, thus enabling the development and clinical adoption of various digital-pathology-based diagnostic and prognostic biomarkers that will likely provide decision support for traditional pathologic interpretation in the clinical setting.

In accordance with an embodiment, disclosed is a system and method associated with Generating Maps of Tumor-Infiltrating Lymphocytes using Convolutional Neural Networks. In order to accurately generate maps of tumor-infiltrating lymphocytes (TIL Maps) from digitized H&E stained tissue specimens, a comprehensive methodology and accompanying range of interactive tools that implement specific modules and/or algorithms, are implemented and disclosed. This methodology is termed Computational Staining and employs deep learning systems and methods to analyze images and tools to incorporate expert feedback into the deep learning models. Such iterative feedback results in the improvement of the overall accuracy of TIL Maps. Many of the highlights and the validation strategy for the system and method associated with Computational Staining are disclosed hereinbelow.

In accordance with an embodiment of the disclosed system and method associated with Computational Staining, the system uses convolutional neural networks (CNNs) to identify lymphocyte-infiltrated regions in digitized H&E stained tissue specimens. The CNN is a supervised deep learning method that has been successfully applied in a large number of image analysis problems. The CNN first uses a set of training data to learn a classification (or predictive) model in the training phase. The resulting trained model is then used to classify new data elements in a prediction phase. However, deep-learning-based automated analysis methods generally require large annotated datasets. Many state-of-the-art methods employ semi-supervised training strategies to boost trained model performance using unlabeled data. TUsch methods (1) pre-train an autoencoder for unsupervised representation learning; 2) construct a CNN from the pre-trained autoencoder; and 3) fine-tune the constructed CNN for supervised classification.

Such systems can train the unsupervised autoencoder on image patches with the object to be classified (e.g., nucleus) in the center of each patch, in order to capture the visual variance of the object more accurately. This method, however, requires a separate object detection step. Instead of tuning the detection and classification modules separately, recent studies have developed CNNs to perform these tasks in a unified but fully supervised pipeline.

In accordance with an embodiment, the disclosed system and method uses two CNNs: a lymphocyte infiltration classification CNN (lymphocyte CNN) and a necrosis segmentation CNN (necrosis CNN), as shown and described further hereinbelow in connection with at least FIG. 1B. The lymphocyte CNN categorizes tiny patches of an input image into those with lymphocyte infiltration and those without. In such system, a semi-supervised CNN is implemented, and initialized by an unsupervised convolutional autoencoder (CAE). The necrosis CNN segments the regions of necrosis and is designed to eliminate false positives from necrotic regions where nuclei may have characteristics similar to those in lymphocyte-infiltrated regions. Further details about the two CNNs are shown and further described hereinbelow in connection with at least FIG. 1C.

An example system shown in FIG. 1A, provides an overview of the components of computational staining to determine refined TIL information, generate and disseminate refined TIL Maps, using standard digitized diagnostic tissue image datasets.

In accordance with the embodiment shown in FIG. 1A, disclosed is a novel approach to extract, quantify, characterize and correlate TIL Maps using digitized H&E stained diagnostic tissue slides that are routinely obtained as part of cancer diagnosis. This approach combines novel deep learning algorithms, as well as methodological optimizations that incorporate expert feedback from pathologists, without being overly disruptive or burdensome. The system in an example implementation, uses and validates these deep learning algorithms by using ~5000 diagnostic quality images, spread over 13 different cancer types, using publically available data from the Cancer Genome Atlas. This is the first approach, that is generalizable, scalable and works using the routine and inexpensive H&E stain. Prior work has either utilized multiple MC (ImmunoHistoChemical) stains or requires significant effort in tuning the algorithm. Neither approach is considered generalizable or scalable, and thus unlikely to be adopted in clinical care.

An overview of the overall implementation of computational staining in an example embodiment is shown in FIG. 1A. Once a diagnostic H&E stained slide 1 is prepared and scanned 2, the resulting digitized whole slide image 3 is transmitted to the system 17. First this digitized image 3 undergoes preprocessing in step 4, where it is checked for quality. Once the image preprocessing phase 4 is completed and the image is determined to be of good quality, it undergoes color normalization as well. This color normalization step ensures that artifacts due to over-staining or under-staining, as well as any operator or scanner errors are accounted for, highlighted and/or resolved, if possible. Next, the image is transmitted into a CNN trained model as shown in step 5.

The system implements CNN which is a state-of-the-art deep learning technique that is popular in many image analysis applications. A novel Convolutional Neural Network (CNN) model is disclosed in order to specifically identify lymphocyte-infiltrated regions in whole slide tissue images (WSIs) of Hematoxylin and Eosin (H&E) stained tissue specimens. The CNN is a supervised classification method which has been successfully applied in a large number of image classification problems. The CNN learns a classification (or predictive) model in a training phase. The model is then used to classify new data elements during a later prediction phase.

In particular, during step 5, the system produces a probability map of TILs using an embodiment of a Convolutional Neural Network (CNN) model, that specifically identifies lymphocyte-infiltrated regions in whole slide tissue images (WSIs) of Hematoxylin and Eosin (H&E) stained tissue specimens. Next, this probability map of TILs undergoes further review through a stratified sampling and/or possibly human feedback. In alternate embodiment(s), this step 6 is fully automated through predictive and deep learning CNN models that automate any potential human feedback once learned by the CNN model. This step 6 next results in generating a refinement of the probability map in step 7, hence a refined and/or tumoral targeted TIL Map is generated in step 7.

In certain embodiments, the trained model 5 of FIG. 1A also incorporates human feedback and improves its learning as it undergoes further implementations, so that it becomes fully automated and/or partially relies on human feedback in certain embodiments. The system next in step 8 incorporates clinical data 13 and any molecular data, in a further integrated and refined TIL Map to produce prognostic caliber numerical statistics and patient level summaries in step 9. These statistics and summaries have been shown to possess diagnostic and prognostic value and may include digitized images, TIL Maps, patient level summaries and/or more targeted classifications of relevant regions of tumoral tissue samples in step 9. Finally, these statistics, patient level summaries, TIL Maps and the original scanned image are available via a variety of interfaces such as APIs 10 (Programmatic Interfaces), Web Viewers 11 and Secure Downloads 12 as shown in steps 10-12. Further described hereinbelow with respect to at least FIGS. 1B-3A, are the individual stages described in greater detail, as well as the methodology for initially training the model and training the model to incorporate new or different cancer types.

Figure 1B:
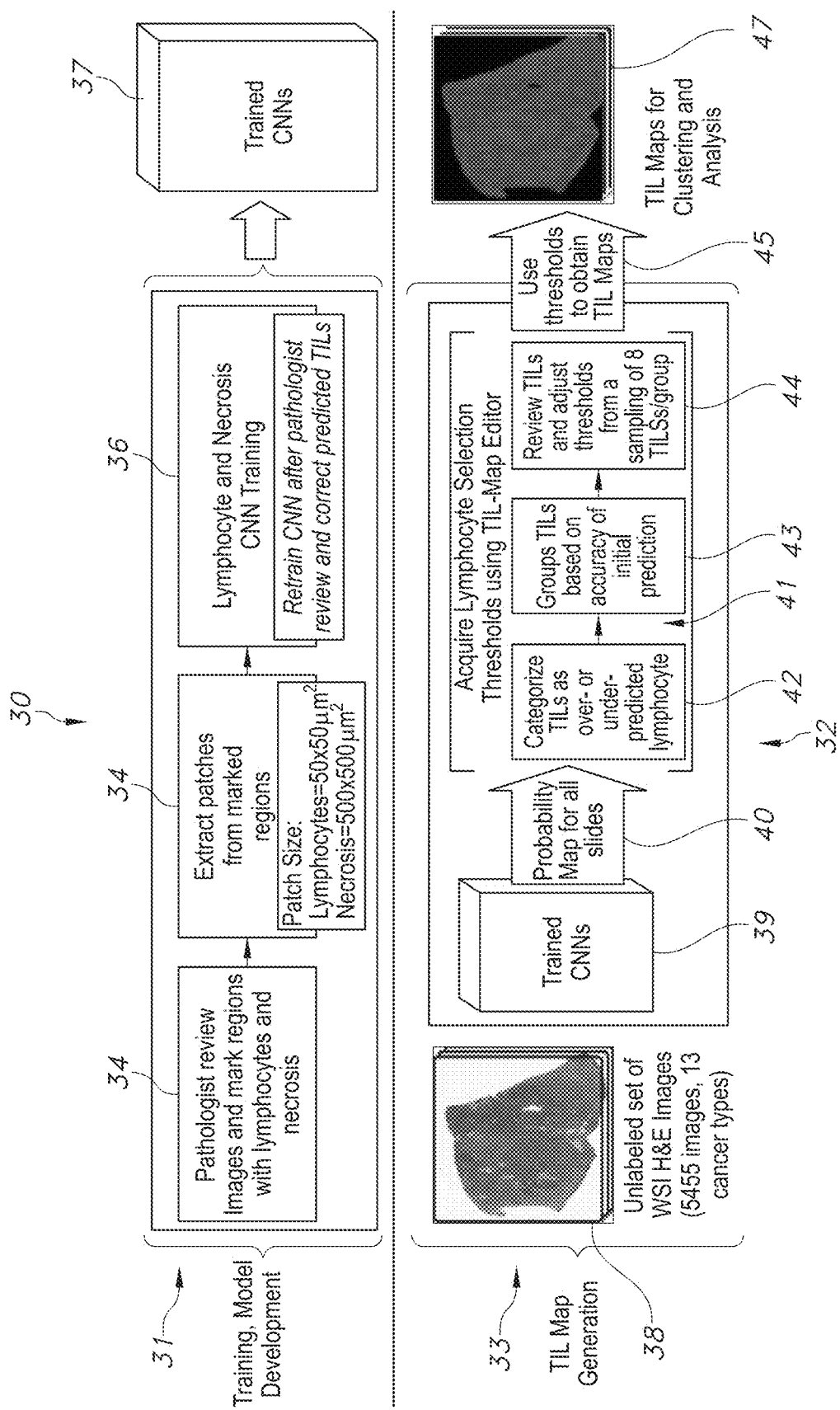
FIG. 1B illustrates an example system overview of training a CNN, developing a model and generating TIL maps for clustering and analysis, in accordance with an embodiment of the disclosed system and method.

FIG. 1B illustrates a workflow outlining the training, CNN model development and the generating of TIL maps. In particular, FIG. 1B illustrates both the training and model development phases shown in phase 31 (top half of the figure) and the use of the trained model to generate TIL Mapsin phase 33 (bottom half of the figure). The CNN training and model development phase 31 begins with an expert pathologist(s) reviewing a set of images and marking regions of lymphocytes and necrosis in step 34. In alternative embodiments, the system is already trained to perform such expert review in step 34. In step 34, the lymphocyte and necrosis regions are identified and next subdivided into tiny patches to create the initial training dataset. Training with patches in step 35 rather than with individual regions and cells, is done for increased computational efficiency in the example embodiment.

In an example implementation, the lymphocyte CNN is trained with 50×50 μm2 patches (equivalent to 100×100 square pixel patches in tissue images acquired at 20× magnification level) from WSIs. The necrosis CNN is trained with larger patches of size 500×500 μm2, as more contextual information results in superior prediction of patches being necrotic.

Figure 7B:
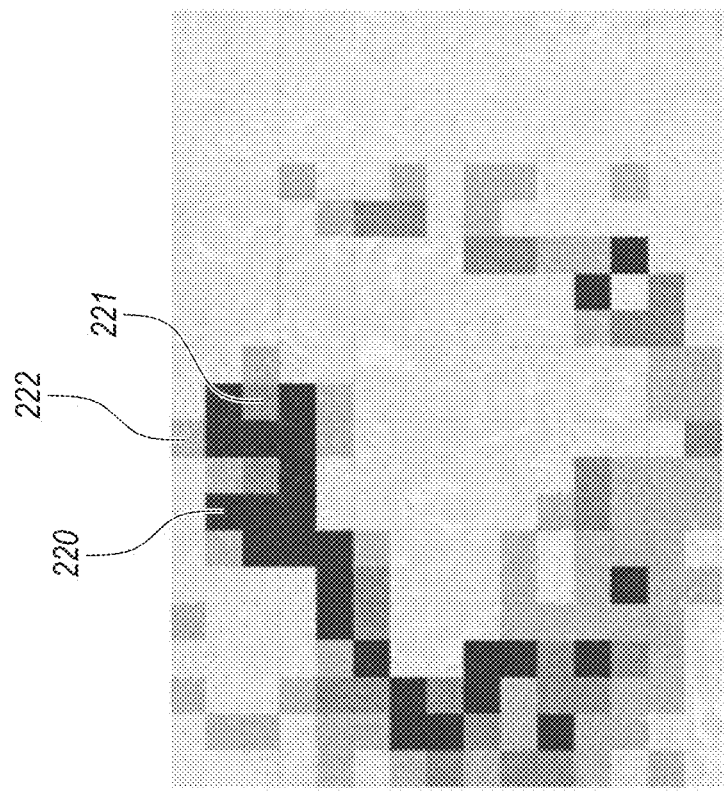
FIG. 7B illustrates a lymphocyte classification heat map with various gradients of color scale indicating representative regions of lymphocyte density associated with a tissue sample, in accordance with an embodiment of the disclosed system and method.

The initial training steps 34-35 are followed by an iterative cycle of review and refinement steps in step 36 in order to improve the prediction accuracy of the lymphocyte CNN. This prediction step 36 generates a probability value of lymphocyte infiltration for each patch in the images set. The patch-level predictions for an image are combined and represented to pathologists as a heatmap (for example, as shown in FIG. 7B further described hereinbelow) for review and visual editing for example, using a TIL-Map editor tool. The pathologists refine the CNN predictions for an image in step 36 by first adjusting the probability value threshold (which globally updates the labels of the patches in the image). If the probability value of a patch exceeds the adjusted threshold, the patch is labeled a TIL patch). Next the system edits the heatmap to correct any identified prediction errors for individual or groups of patches. At the end of the editing step, the updated heatmaps are processed to augment the training dataset. The lymphocyte CNN is re-trained with the updated training dataset. This iterative process continues until adequate prediction accuracy is achieved, as determined by the pathologist feedback (or alternatively automated feedback by the system once trained), whether automated or manual. In an example implementation, the necrosis CNN was retrained only once in this study, because it achieved sufficient prediction accuracy. The training and re-training steps of both CNNs involve cross-validation to assess prediction performance and avoid overfitting. A detailed description of this training phase 31 process is further shown and described hereinbelow in connection with at least FIG. 1C.

The trained CNN models generated in step 37 are next used on test datasets in TIL Map Generation phase 33 (as shown in bottom half of FIG. 1B). During the TIL Map generation phase 33, the trained CNNs are used on the full set of 5,455 images from 13 cancer types to generate TIL maps. During TIL map generation 33, a probability map for TILs is generated from each image. More specifically an unlabeled set of WSI H&E stained images is used in step 38 (for example, a representative H&E diagnostic whole-slide images (WSIs) that enable spatial quantification and analysis of TILs and association with the wealth of molecular characterization conducted through the TCGA). The trained CNNS as shown in step 39, are used to iteratively generate a probability map for each stained image slide as shown in step 40. Next, the system iteratively analyzes each of the probability maps during phase 41, wherein the goal is to acquire lymphocyte selection thresholds using a TIL-map editor. During phase 41 the system categorizes the TILs as either over-predicted or under predicted lymphocytes in step 42. The system next groups TILs based on the accuracy of the initial prediction in step 43. Next, the system reviews the TILs and adjusts threshold values from a sampling of 8 TILs per group in step 44. In particular, the probabilities are reviewed and lymphocyte selection thresholds are established using a selection sampling strategy as shown in step 44. The thresholds are then used to generate and provide the final TIL maps (referring also to FIG. 1C and Tables 1-2, as described in greater detail hereinbelow).

Figure 11B:
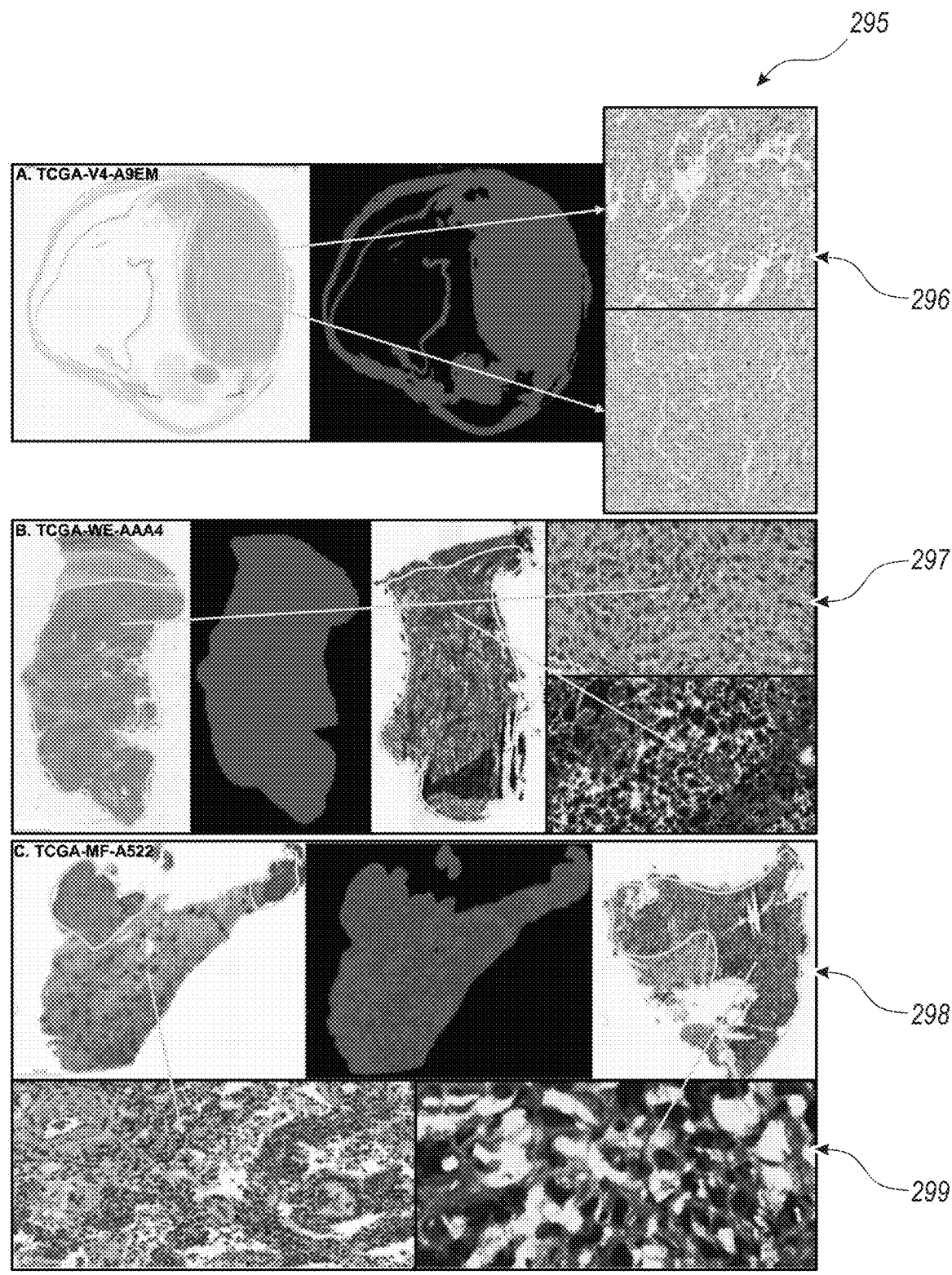
FIG. 11B provides micrographs of tissue images and TIL maps representative of examples of the Negative Control and Discordant Results between Molecular and Image-derived Analyses for TIL estimates, in accordance with an embodiment of the disclosed system and method.

In an example implementation of the embodiment of FIG. 1B workflow, the system applied such process to 5,455 diagnostic H&E WSIs from 13 TCGA tumor types in which lymphocytes are known to be present. Included were uveal melanoma (UVM) as one of the 13 cancer types essentially as a type of negative control (as shown in FIG. 11B, element 296), since it has the fewest immune cells among TCGA tumors. In the example implementation, tumor types were selected to represent a range of known positive involvement of lymphocytes and immunogenicity from literature and from molecular estimates of lymphocyte content. Each image was partitioned into patches of 50×50 μm2 and each patch was classified by the CNNs. TIL maps were successfully generated (see for example, FIG. 1E and TABLE 2 described further hereinbelow) for 5,202 TCGA tumor images from 4,759 individual participants in the 13 tumor types. 253 images (4.6%) did not yield TIL maps because of low image quality or low prediction accuracy or because the images were duplicates (for example, referring to FIG. 1E, as described further hereinbelow).

The overall methodology for training convolutional neural networks for TIL MAPs, consists of two CNNs: 1) a lymphocyte-infiltrated classification CNN (lymphocyte CNN); and 2) a necrosis segmentation CNN. In addition, in certain embodiments there are mechanisms for capturing and incorporating feedback from pathologists, to evaluate and refine a generated Tumor-Infiltrating Lymphocyte (TIL) Map.

Figure 1C:
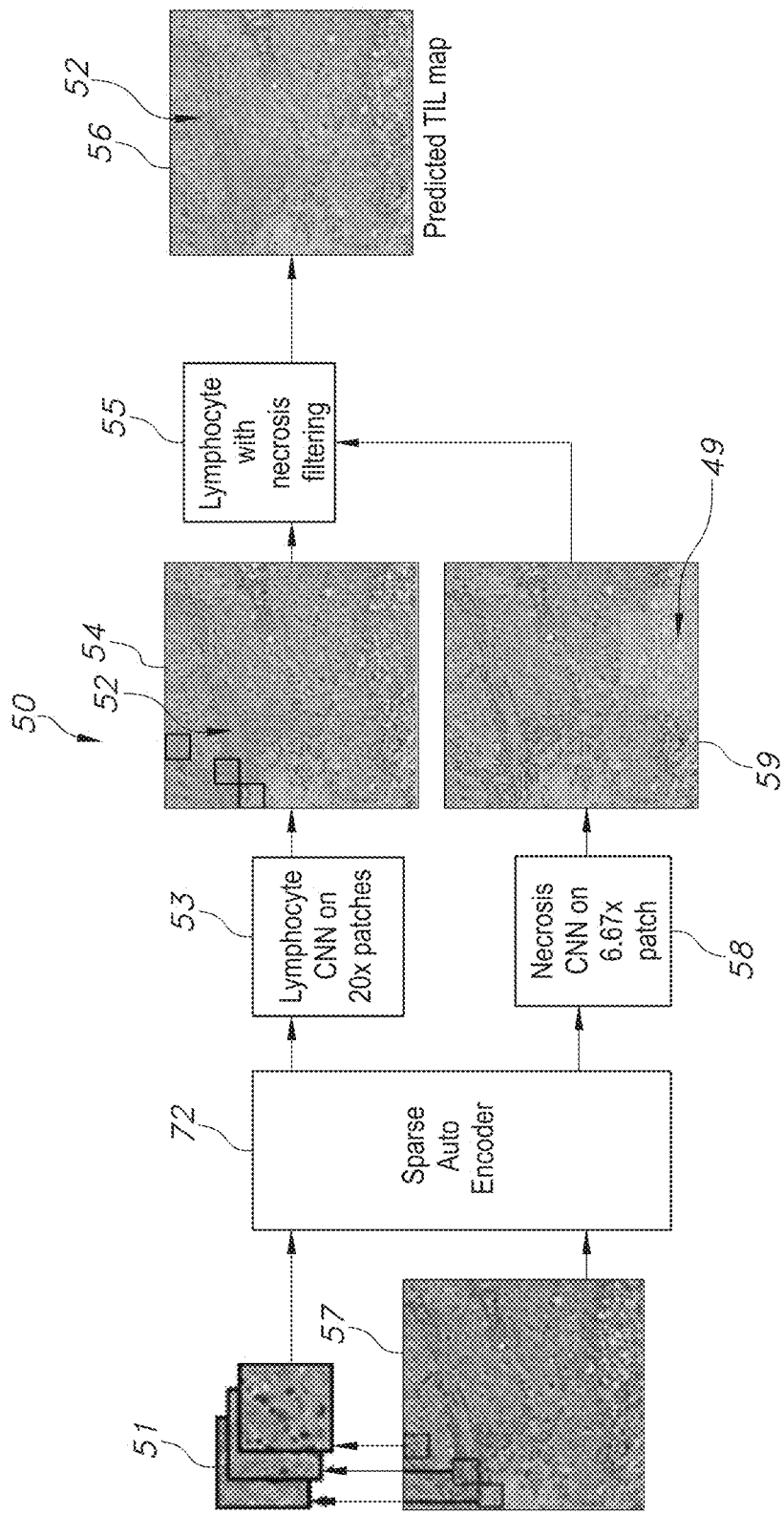
FIG. 1C shows an overview of a convolutional neural network (CNN) and the fusion of lymphocyte and necrosis CNN including microphotographs of sample patch images slides (using representative H&E diagnostic whole-slide images (WSIs)) with results being combined for the final TIL prediction, in accordance with an embodiment of the disclosed system and method.

The lymphocyte CNN 36 classifies image patches (for example, as shown in element 36; FIG. 1B and element 53; FIG. 1C). In an exemplary embodiment, only foreground patches are processed and classified. In order to determine if a patch is a foreground patch (for example, as shown in row 138, FIG. 4A), the TIL system analysis engine or processor determines if the patch has enough tissue using the variance in Red, Green and Blue channels of the patch. A patch is labeled background (for example row 139, FIG. 4A) and discarded if $(\sigma(Red)+\sigma(Green)+\sigma(Blue))/3<18$.

The values of the Red, Green, and Blue channels range from 0 to 255. The threshold value of 18 is selected in the example implementation, by adjusting it across several slides. The percent TIL values are computed using the equation 1A listed below. Further, the percent TIL values are determined using only the foreground patches (i.e., patches with tissue). It is further noted that the set of patches with tissue includes TIL patches.

TIL %=(Number of TIL Patches)/(Number of Patches with Tissue)         Equation (1A)

The lymphocyte CNN in the example implementation is a semi-supervised CNN, initialized by an unsupervised Convolutional Autoencoder (CAE). The CNN and the CAE are designed to have relatively high resolution input such that one can recognize individual lymphocytes. Unsupervised CAE pre-training is implemented in the example embodiment, because many studies have shown that it boosts the performance of the CNN (Hou et al., 2017). Using the lung adenocarcinoma (LUAD) patches, it is empirically shown that the CNN without pre-training achieved significantly lower area under the curve (AUC). The CAE encodes (compresses) an input image patch of 50×50 µm2 (100×100 square pixels, corresponding to 20× magnification) into several vectors of length 100, and then reconstructs the input image patch using these encoding vectors.

The CAE is trained in an unsupervised fashion, to minimize the pixel-wise image patch reconstruction error, with limited number of encoding vectors. By implementing as such, the CAE implicitly learns to encode the position, appearance and morphology etc. of nuclei, in the encoding vectors. The guideline of designing the architecture of the CAE is that, each encoding vector, in an ideal example implementation, is capable of encoding one and only one nucleus. As a result, the CAE has 13 encoding layers and 3 pooling layers. The lymphocyte CNN is built based on the trained CAE. The system discards the decoding (reconstruction) part of the CAE, and adds several more layers on the encoding vectors. Therefore, the resulting lymphocyte CNN is an 18-layer network with 14 convolutional layers, 3 pooling layers, and 1 fully connected layer.

The system implements two different CNNs for classification of necrosis regions and TILs, because evaluation results showed necrosis regions and lymphocytes are better recognized and classified at different image scales. The necrosis CNN model 58 performs better with larger input tissue regions, whereas the lymphocyte CNN model 53 achieves the better targeted results with local, high-resolution image patches (referring to example shown in FIG. 1C). The necrosis segmentation CNN is used to eliminate false positives from the lymphocyte CNN in necrotic regions. In these regions, nuclei may have characteristics similar to those in lymphocyte infiltrated regions.

Because recognizing a region of 50×50 µm2 may require contextual information in a larger region, the system models this as a segmentation problem with larger input patches at a relatively lower resolution: 500×500 µm2 patches are extracted from the image and downsampled 3 times. The resulting patch is 333×333 pixels at 20× magnification. The necrosis segmentation CNN outputs pixel-wise segmentation results. An example module to implement this task is DeconvNet because it is designed to predict pixel-wise class labels and handle structures and objects at multiple scales (which is more suitable for segmentation than patch-level classification). A necrosis segmentation CNN has been shown to achieve high prediction accuracy with several benchmark image datasets. Further the system trains a necrosis segmentation CNN to classify each pixel as inside or outside a necrosis region. The output of the necrosis segmentation CNN is re-sized to match the output resolution of the lymphocyte CNN. If over half of a 50×50 patch intersects with a necrotic region, the patch is classified as non-lymphocyte-infiltrated.

FIG. 1C shows an overview of a convolutional neural network (CNN) and the fusion of lymphocyte and necrosis CNN with microphotographs of sample patch images slides (using representative H&E diagnostic whole-slide images (WSIs)) shown and results being combined for the final TIL prediction, in accordance with an embodiment of the disclosed system and method. In an example embodiment, the lymphocyte CNN takes of 50×50 microns at 20× magnification and predicts if the patches are lymphocyte-infiltrated. The necrosis CNN takes a larger region with more contextual information to predict if patches are necrotic. The two results are combined for the final tumor infiltration lymphocyte prediction. Essentially the convolutional neural network (CNN) involves the fusion of lymphocyte and necrosis CNN.

In accordance with the embodiment of FIG. 1C, the approach implements deep learning models. The outputs of the two CNNs are combined to predict TILs and generate a probability map of TIL positive and TIL negative patches (TIL Maps). Next the lym-CNN and necrosis-CNN are used to first assign prediction values for each patch (100×100 pixels in 20×) in representative whole slide images from the training data. Additionally, computed is the color variance for each patch to eliminate white, non-tissue background. Expert pathologists examine the TIL Maps predictions or alternatively, an expert system is trained to automate such review of TIL Maps predictions. If the expert pathologists or system are satisfied with the quality of the predictions (by adjusting the lymphocyte sensitivity and necrosis specificity, referring to example shown in FIGS. 7D-7F) then the model is considered trained and is saved to TIL-ModelDB.

If the expert pathologists (or alternatively, the expert system deems the quality unsatisfactory) are not satisfied with the predictions, then additional training data is collected for this cancer type, and the CNNs are re-trained until the expert pathologists are satisfied with the prediction quality. Once deemed satisfactory, then the CNN model is considered trained and is saved to TIL-ModelDB.

Once the CAE, Lym-CNN, and/or the Necrosis-CNN have been trained on a new cancer type, the training data is then used to evaluate the models against the training data. The results are reviewed by an expert pathologist or alternatively, expert pathology system or processor. If performance is deemed to be satisfactory, then the models are versioned and saved to TIL-ModelDB. TIL-ModelDB is a version controlled model management system that is used to store and manage the various machine learning models. Such system also stores the provenance of the cancer type, information about the training and testing set, and the models themselves.

More specifically, the methodology in the example embodiment of FIG. 1C implements two CNNs: a lymphocyte infiltration classification CNN (lymphocyte CNN) 53 and a necrosis segmentation CNN (necrosis CNN) 58. The lymphocyte CNN 53 categorizes tiny or smaller patches 51 of an original input image 57 into those with lymphocyte infiltration and those without lymphocyte infiltration. The embodiment implements a semi-supervised CNN, initialized by an unsupervised convolutional autoencoder (CAE) 72. The Convolutional Autoencoder (CAE) (as described further hereinbelow in connection with FIGS. 2A and 2B) is designed to carry out unsupervised, simultaneous nucleus detection and feature extraction in histopathology tissue images. The CAE 72 detects and encodes nuclei in image patches in tissue images into sparse feature maps that encode both the location and appearance of nuclei.

The CNN 53 and the CAE 72 are designed to have relatively high resolution input such that one can recognize individual lymphocytes. The CAE 72 encodes an input image patch of 50×50 microns (100×100 square pixels) into vectors of length 100, and then reconstructs the input image patch using these encoding vectors. The system trains the CAE in an unsupervised fashion, to minimize the pixel-wise image patch reconstruction error, with limited number of encoding vectors. By doing this, the CAE 72 implicitly learns to encode the position, appearance and morphology, etc. of nuclei, in the encoding vectors in an iterative fashion. The basic process the architecture of the CAE 72 is that each encoding vector, in an example ideal case, should be capable of encoding one and only one nucleus. As a result, the CAE in the example embodiment, has 13 encoding layers and 3 pooling layers. The lymphocyte CNN 53 is configured and created based on the trained CAE 72. Hence, the system discards the decoding (reconstruction) part of the CAE 72 and adds several more layers on the encoding vectors. Therefore, the lymphocyte CNN is a 18-layer network with 14 convolutional layers, 3 pooling layers, and 1 fully connected layer in the example embodiment.

The necrosis CNN 58 shown in FIG. 1C also segments the regions of necrosis and is designed to eliminate false positives from necrotic regions where nuclei may have characteristics similar to those in lymphocyte-infiltrated regions. During necrosis segmentation CNN 58, because recognizing a mitotic region of 50×50 square microns needs contextual information in a larger region, the process is implemented similar to a segmentation problem with larger input regions at a relatively lower resolution (for example, 500×500 square microns in 333×333 pixels). The system may implement for example, DeconvNet because it is designed to predict pixel-wise class labels and handle structures and objects at multiple scales (which is more suitable for segmentation than patch-level classification) and it has been shown to achieve high prediction accuracy with several benchmark image datasets. DeconvNet is trained to classify each pixel as inside or outside a necrosis region. The output of the necrosis segmentation CNN is resized to match the output resolution of the lymphocyte CNN. If over half of a 50×50 patch intersects with a necrotic region, the patch is classified as non-lymphocyte-infiltrated regardless of the prediction of the lymphocyte CNN.

More particularly, during slide processing as shown in FIG. 1C, the fusion of Lymphocyte 53 and Necrosis CNN 58 occurs. A large input H&E patch 57 is processed to yield a TIL map, which is shown as final predicted TIL map 56. A sparse auto encoder as shown in 72 processes encoding of the input image patch 57 and smaller patches 51. The lymphocyte CNN 53 first processes received smaller patches of 50×50 microns 51 within the large patch 57 at 20× magnification and predicts if those patches 51 are lymphocyte-infiltrated. Next the system displays predictions as a "heatmap" (for example as shown in FIG. 6C; FIG. 7B; FIG. 9B), superimposed on the H&E image (upper middle, TIL positive patches 54 shown in dark orange or darker shaded areas 52). The necrosis CNN 58 (lower left and lower middle) takes the larger region with more contextual information 59 to predict if patches are mostly necrotic (shown in light orange or lighter shaded areas of grey 49). The two results are then combined in step 55 as lymphocyte with necrosis filtering to generate the predicted TIL map 56 (shown as upper right predicted TIL map 56) for the final tumor infiltration lymphocyte prediction (TIL-positive patches 56 shown in dark orange or dark shaded areas 52).

Referring further to FIG. 1C (and also as described in connection with FIGS. 3B-3C hereinbelow), the system implements an iterative workflow in order to train the CNN models. Iterative model training and respective data labeling is performed in the example embodiment. In an example embodiment, first, an unsupervised image analysis of WSIs is executed to initialize a CNN model. This model is refined in an iterative process in which CNN predictions are reviewed, corrected and refined by expert pathologists. The CNN model is re-trained with the updated data in order to improve its classification performance. After a training phase, the CNN model is applied to patches in the test set. For each test patch, the lymphocyte CNN produces a probability of the patch being a lymphocyte-infiltrated patch. The label of the patch is decided by simple thresholding as shown for example, in FIG. 3C and FIGS. 5A-5B workflows. If the probability value is above a predefined threshold, the patch is classified as lymphocyte-infiltrated, as shown for example in FIG. 1C and FIG. 3D workflows.

Training a fully supervised CNN requires a large number of training instances with ground truth labels. For example, Masci et al. (Masci et al., 2011) have shown that utilizing unlabeled instances can boost the performance of a CNN. Hence, in an example embodiment the system trains an unsupervised Convolutional Auto-Encoder (CAE) to learn the representation of nuclei and lymphocytes in histopathology images and initialize the lymphocyte CNN. In this way, the initial lymphocyte CNN model captures the appearance of histopathology images without supervised training. Then the system initializes the weights of the necrosis segmentation CNN randomly following the DeconvNet approach. Next, the system trains the CNNs with labeled images. The training phases of the CNNs involve a cross-validation step to assess prediction performance and avoid overfitting (for example as shown in FIGS. 1C and 3D.

Figure 1D:
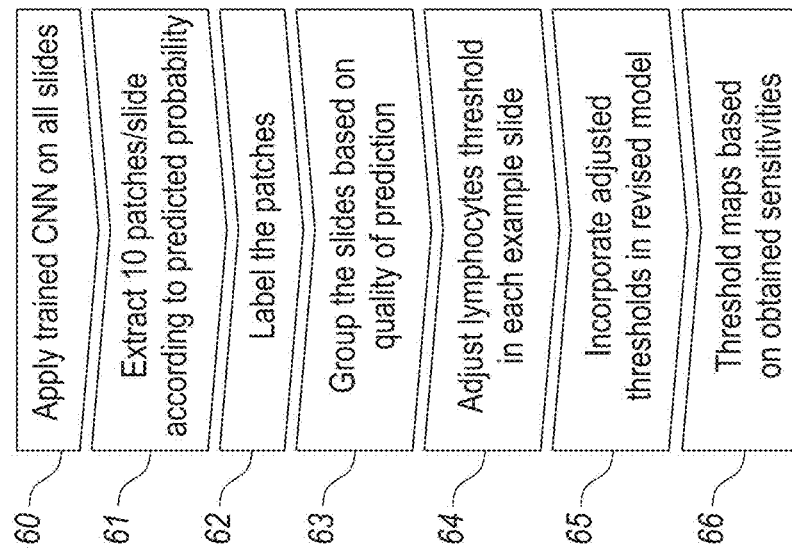
FIG. 1D illustrates a workflow of the determination of lymphocyte selection thresholds, in accordance with an embodiment of the disclosed system and method.

FIG. 1D illustrates a workflow of the determination of lymphocyte selection thresholds, in accordance with an embodiment of the disclosed system and method. In particular, during the determination of Lymphocyte Selection Thresholds, a quality control process selects slides that have significantly over-predicted or under-predicted lymphocytes and adjusts the lymphocyte sensitivities and necrosis specificities for these slides. The process begins with step 60 in which the system applies trained CNN on all the image slides. The system next extracts 10 patches per slide in accordance with the predicted probability in step 61. The system next groups the slides based on the actual quality of the respective predictions in step 63. Next, the system adjusts the lymphocyte threshold in each sample slide in step 64. The system then incorporates adjusted thresholds in revised mode during step 64. The threshold maps based on the obtained sensitivities are generated in step 66. Hence, lymphocyte selection thresholds are determined during such embodiment.

Figure 1E:
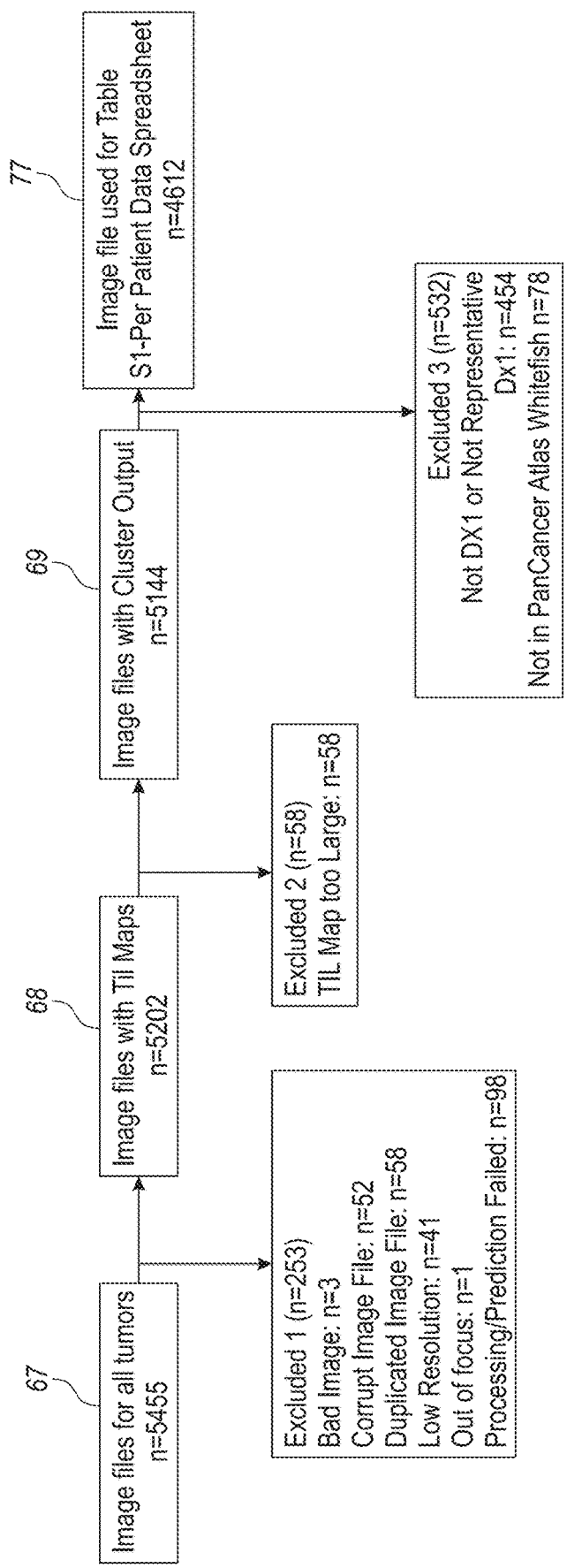
FIG. 1E illustrates a flowchart of an exemplary method of tissue sample slide image processing, in accordance with an embodiment of the disclosed system and method.

Referring to FIG. 1E, shown is a flowchart of slide image processing, in accordance with an embodiment. At each step, a set of slides is excluded from further processing, as follows in step 67 the set is excluded for various reasons such as: 1) no TIL Map was generated Corrupt Image File: either the image file is corrupted, unable to be read, or the image only contains a small portion of the whole slide; 2) Low Resolution: The image does not have enough high resolution (of at least 20×) to be processed by the CNN model; 3) Out of focus: The image is out of focus; 4) Bad Image File: The image is either captured with bad quality, or marked by markers; 5) Processing/Prediction Failed: Either the pipeline failed processing those slides because of malfunctions such as process being terminated or ended in the middle of the process, or the lymphocyte predictions are not good (i.e., a visual inspection of the images showed too many incorrectly labeled patches—results for some of the images, for example, had a high false positive rate due to the cytology of the tumor cells that closely resembled lymphocytes); or 6) Duplicated Image File: there is another image file corresponding to the same diagnostic slide barcode. In step 68 image files with TIL maps are excluded for another set of reasons: no Cluster File was Generated—in clustering indices process, some of the slides have too many TIL patches. As a result, either the clustering indices algorithm cannot fit them into memory to process or it may take too long to finish clustering those slides. Those slides do not yield cluster file results.

During step 69 of FIG. 1E, image files including cluster output may be excluded for other reasons as follows: exclusions to Create Final List of Single Slide per Participant. For each participant a single slide is selected where multiple slides are available as follows—only the slide containing label DX1 is selected (not labels DX2, DX3, . . . ). In 15 cases there were two DX1 slides for each patient, and one was slide chosen by random sampling. Finally, only slides from TCGA participants with data included in the PanCancer Atlas cohort (the PanCancer Atlas whitelist) are retained for final integrative analysis work in the example embodiment.

Figure 2A:
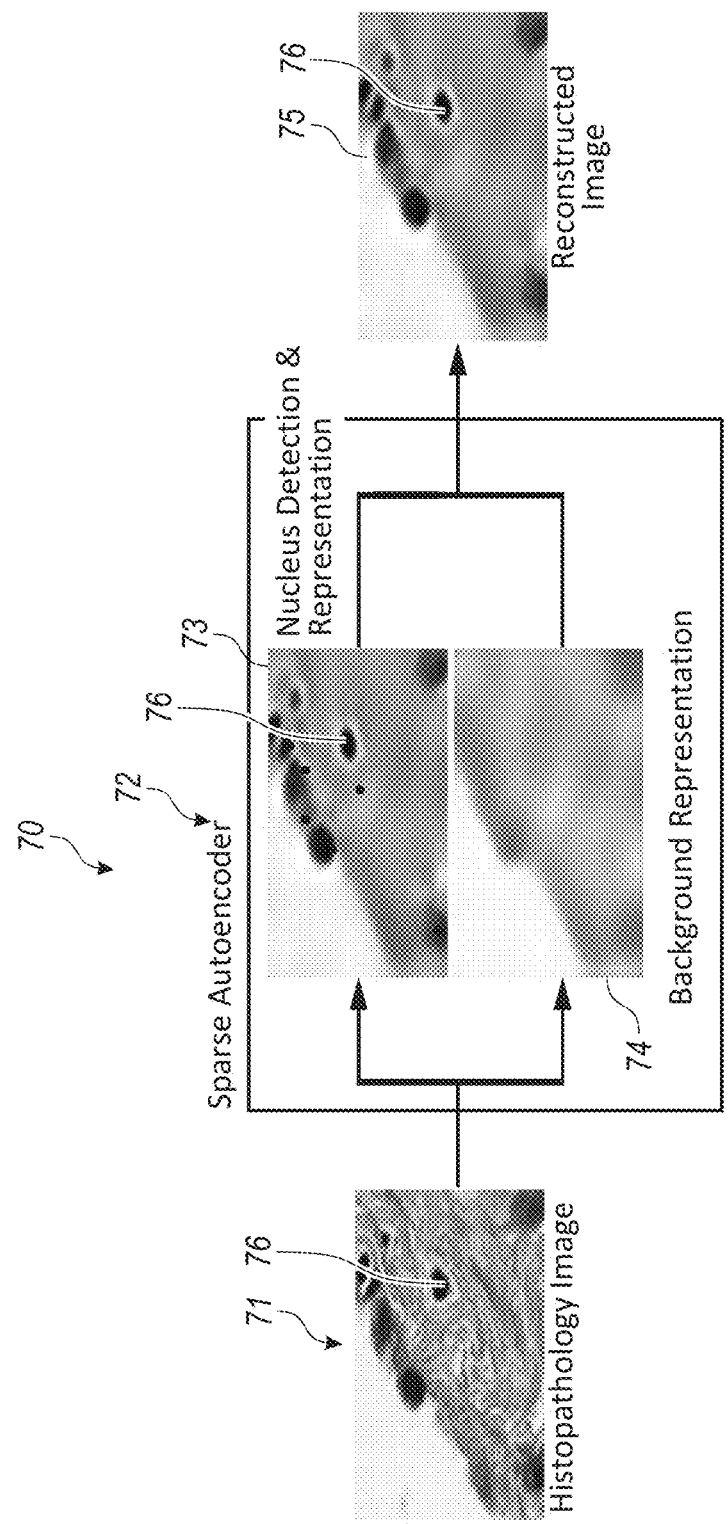
FIG. 2A illustrates a workflow of an example fully unsupervised autoencoder, including input images, a sparse autoencoder, and resultant reconstructed images, in accordance with an embodiment of the disclosed system and method.

Referring to FIG. 2A, shown is a more detailed described of the fully unsupervised autoencoder described hereinabove in connection with FIG. 1C. In particular, FIG. 2A illustrates a workflow of an example fully unsupervised autoencoder, including input images, a sparse autoencoder, and resultant reconstructed images, in accordance with an embodiment of the disclosed system and method.

The fully unsupervised autoencoder 70 in FIG. 2A first decomposes or segments an input histopathology image patch 71 into foreground (e.g. nuclei) 73 and background (e.g. cytoplasm) 74 during the sparse autoencoding step 72. The CAE then detects nuclei in the foreground by representing the locations of nuclei as a sparse feature map. Finally, the autoencoder interatively encodes each nucleus to a feature vector. The autoencoder 70 is trained end-to-end, minimizing the reconstruction errors.

The disclosed novel Convolutional Autoencoder (CAE) unifies nuclei detection and feature/representation learning into a single network and can be trained end-to-end without supervision. In addition, using existing labeled data, the network can be fine-tuned with supervision in certain embodiments to improve the state-of-the-art performance of nuclei classification and segmentation.

In order to perform unsupervised representation learning and detection, the system modifies the conventional CAE to encode not only appearance, but also spatial information in feature maps. In this regard, the CAE first learns to separate background 74 (e.g. cytoplasm) and foreground 73 (e.g. nuclei 76) in an image patch 71, as also shown hereinbelow in FIG. 2B. It is noted that an image patch is a rectangular region in a whole slide tissue image in certain embodiments or aspects. The CAE 70 implements image patches, because a tissue image can be very large and may not fit in memory. Hence, working with and processing image patches 71 is computationally more efficient. It is common in tissue image analysis to partition tissue images into patches and process the patches. Hence, the partitioned image patches may also be referred herein simply as the images. The CAE encodes the input image in a set of low resolution feature maps (background feature maps 74) with a small number of encoding neurons. The feature maps generally encode large scale color and texture variations because of their limited capacity and to increase computational efficiencies. Thus, these feature maps 74 encode the image background. The high frequency residual between the input image 71, 81 and the reconstructed background 89 during the sparse autoencoding step 72, is the foreground that contains nuclei 76, hence, the reconstructed image 75 is output.

It is noted that the set of nuclei 76 is often sparse in the image 71. The CAE system utilizes this sparse property to design the foreground learning sub-network. Specifically, the network learns the foreground feature maps 86 in a "crosswise sparse" manner: neurons across all feature maps are not activated (output zero) in most feature map locations (as further shown and described in FIG. 2B).

Figure 2B:
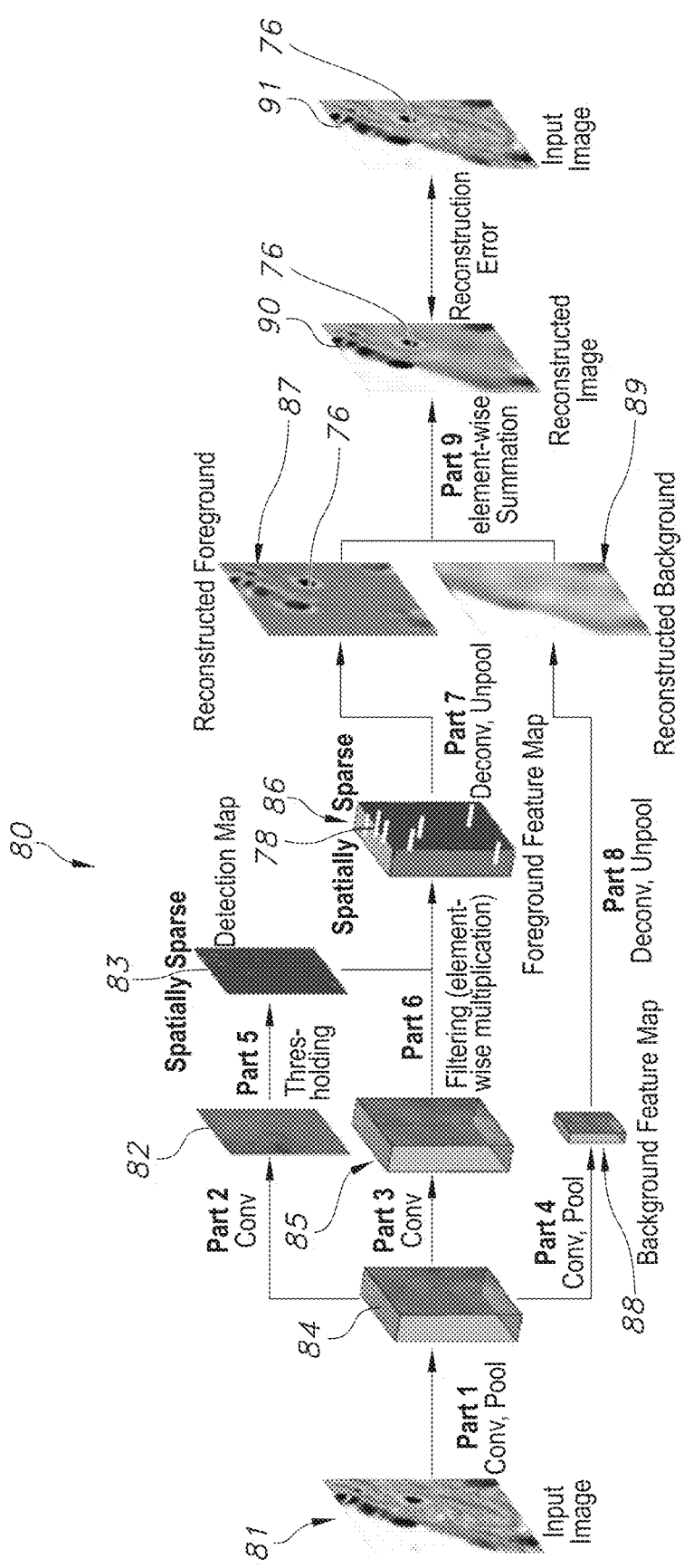
FIG. 2B illustrates the architecture of an exemplary sparse convolutional autoencoder (CAE), in accordance with an embodiment of the disclosed system and method.

FIG. 2B illustrates the architecture of an exemplary sparse convolutional autoencoder (CAE), in accordance with an embodiment of the disclosed system and method.

In particular, the architecture of the sparse Convolutional Autoencoder (CAE) in stepwise fashion is shown in FIG. 2. The CAE minimizes image reconstruction error. The reconstructed image patch 90 is a pixel-wise summation of two intermediate reconstructed image patches: the background 89 and the foreground 86. The background is reconstructed from a set of small feature maps (background feature map 88) that generally encode just large scale color and texture, and results in reconstructed background 89, in the shown embodiment.

The foreground (including nuclei) is reconstructed from a set of crosswise sparse feature maps 86 (foreground feature maps 86). These foreground feature maps 86 capture local high frequency signals, for example, nuclei 76. The crosswise sparsity is defined herein as a type of sparsity with the following constraint: when there is no detected nucleus at a location, neurons in all foreground feature maps at the same location should not be activated. Additional details of the CAE network parts 1-8 as shown in FIG. 2B, are further shown in TABLE 1, provided hereinbelow.

Shown below is TABLE 1 which provides the layer setup of different portions in an embodiment of the CAE as shown and described hereinabove with respect to FIGS. 2A and 2B.

TABLE 1

| Part | Layer | Kernal Size | Stride | Output Size |
| --- | --- | --- | --- | --- |
| 1 | Input | — | — | $100^2 \times 3$ |
|  | Conv | 5 × 5 | 1 | $100^2 \times 100$ |
|  | Conv | 5 × 5 | 1 | $100^2 \times 120$ |
|  | Pool | 2 × 2 | 2 | $50^2 \times 120$ |
|  | Conv | 3 × 3 | 1 | $50^2 \times 240$ |
|  | Conv | 3 × 3 | 1 | $50^2 \times 320$ |
|  | Pool | 2 × 2 | 2 | $25^2 \times 320$ |
|  | Conv | 3 × 3 | 1 | $25^2 \times 640$ |
|  | Conv | 3 × 3 | 1 | $25^2 \times 1024$ |
| 2 | Conv | 1 × 1 | 1 | $25^2 \times 100$ |
|  | Conv | 1 × 1 | 1 | $25^2 \times 1$ |
| 3 | Conv | 1 × 1 | 1 | $25^2 \times 640$ |
|  | Conv | 1 × 1 | 1 | $25^2 \times 100$ |
| 4 | Conv | 1 × 1 | 1 | $25^2 \times 128$ |
|  | Pool | 5 × 5 | 5 | $5^2 \times 128$ |
|  | Conv | 3 × 3 | 1 | $5^2 \times 64$ |
|  | Conv | 1 × 1 | 1 | $5^2 \times 5$ |
| 5 | Thres. | Defined by Eq. 6 |  | $25^2 \times 1$ |
| 6 | Filter | Defined by Eq. 5 |  | $25^2 \times 100$ |
| 7 | Deconv | 3 × 3 | 1 | $25^2 \times 1024$ |
|  | Deconv | 3 × 3 | 1 | $25^2 \times 640$ |
|  | Deconv | 4 × 4 | 0.5 | $50^2 \times 640$ |
|  | Deconv | 3 × 3 | 1 | $50^2 \times 320$ |
|  | Deconv | 3 × 3 | 1 | $50^2 \times 320$ |
|  | Deconv | 4 × 4 | 0.5 | $100^2 \times 320$ |
|  | Deconv | 5 × 5 | 1 | $100^2 \times 320$ |
|  | Deconv | 5 × 5 | 1 | $100^2 \times 100$ |
|  | Deconv | 1 × 1 | 1 | $100^2 \times 3$ |
| 8 | Deconv | 3 × 3 | 1 | $5^2 \times 256$ |
|  | Deconv | 3 × 3 | 1 | $5^2 \times 128$ |
|  | Deconv | 9 × 9 | 0.2 | $25^2 \times 128$ |
|  | Deconv | 3 × 3 | 1 | $25^2 \times 128$ |
|  | Deconv | 3 × 3 | 1 | $25^2 \times 128$ |
|  | Deconv | 4 × 4 | 0.5 | $50^2 \times 128$ |
|  | Deconv | 3 × 3 | 1 | $50^2 \times 64$ |
|  | Deconv | 3 × 3 | 1 | $50^2 \times 64$ |
|  | Deconv | 4 × 4 | 0.5 | $100^2 \times 64$ |
|  | Deconv | 5 × 5 | 1 | $100^2 \times 32$ |

TABLE 1-continued

| Part | Layer | Kernal Size | Stride | Output Size |
|---|---|---|---|---|
| | Deconv | 5 × 5 | 1 | $100^2 \times 32$ |
| | Deconv | 1 × 1 | 1 | $100^2 \times 3$ |

It is noted that generally neurons in a few feature map locations can be activated. Since the non-activated neurons have no influence in the later decoding layers, the image foreground 74 is reconstructed in the example embodiment, using the non-zero responses in the foreground encoding feature maps 86. This means that the image reconstruction error will be minimized only if the activated encoding neurons at different locations capture salient objects—the detected nuclei 76.

Hence, learning a set of crosswise sparse foreground in encoding feature maps is not straightforward. Neurons at the same location across all foreground feature maps 86 should be synchronized: they should be activated or not activated at the same time depending on the presence of nuclei 76. In order to achieve this synchronization, the CAE needs to learn the locations of nuclei 76 by optimizing the reconstruction error between the reconstructed image 90 and the input image 91. Hence, the nucleus detection and feature extraction models are learned simultaneously during optimization. In order to represent the inferred nuclei locations, introduced is a special binary feature map: the nucleus detection map 83. This nucleus detection map is generated sparsely in a spatial sense as shown in step 83, by thresholding neural activations detected in step 82. After such optimization, a neuron in the nucleus detection map 83 should output 1, if there is a detected nucleus 76 at the neuron's location, in certain disclosed embodiments. The foreground feature maps 86 are computed by element-wise multiplications between the nucleus detection map 83 and a set of dense feature maps, as shown in steps 83, 85 and 86, in FIG. 2B.

It is noted that the disclosed exemplary CAE architecture with crosswise sparsity in FIG. 2B, can detect and represent nuclei in histopathology images with the following advantages over the art: it is the first unsupervised detection network for computer vision applications. The disclosed methods can be fine-tuned for end-to-end supervised learning. In this regard, the experimental evaluations using multiple datasets indicates the disclosed embodiments perform significantly better than other methods. The crosswise constraint in the CAE method boosts the performance substantially. In addition, the CAE method reduces the error of the best performing baseline by up to 42% on classification tasks, and reduces the error of the U-net method for example, by 20% in nucleus segmentation. The disclosed method achieves comparable results with 5% of training data needed by other methods, resulting in considerable savings in the cost of label generation.

The Convolutional Autoencoder (CAE) as shown and described in connection with embodiments of FIGS. 2A-2B, is also described in greater particularity hereinbelow with respect to the crosswise sparse CAE embodiment shown in FIG. 2C. The CAE reconstructs an image 76 as the pixelwise summation of a reconstructed foreground image 87 and a reconstructed background image 89. The sparse foreground encoding feature maps 83, 86 represent detected nucleus locations and extracted nuclear features. It is noted that the background feature maps 88 are not necessarily sparse.

In certain embodiments or aspect, the autoencoder is an unsupervised neural network that learns to reconstruct its input. The main purpose of this model is to learn a compact representation of the input as a set of neural responses. A typical feedforward autoencoder is composed of an encoder and a decoder, which are separate layers. The encoding layer models the appearance information of the input 81. The decoder reconstructs the input from neural responses in the encoding layer. The CAE and sparse CAE are autoencoder variants. In certain embodiments, the system can construct a CNN with a trained CAE. Such semi-supervised CNNs outperform fully supervised CNNs significantly in many applications.

The architecture of the CAE as described hereinabove is provided in FIG. 2B. More particularly, the system trains the CAE to minimize the input image reconstruction error as shown between steps 90 and 91. The early stages of the CAE network consist of six convolutional (for example, shown labeled as parts 1-4, parts 7-8) and two average-pooling layers (for example, shown labeled as parts 1, 4). The network then splits into three branches: the nucleus detection branch (the top branch; steps 82-82), the foreground feature branch (the middle branch; steps 85-86), and the background branch (the bottom branch; steps 88-89). The detection branch from step 83 then merges into the foreground feature branch (see part 6 between steps 85 and 86) to generate the foreground feature maps 86 that represent nuclei 76 (shown as spatially crosswise elements). The foreground 86 and background feature maps 88 are decoded to generate the foreground reconstructed image 87 and background reconstructed image 89. Finally the two intermediate images 87, 89 are summed to form the final reconstructed image at step 90.

In certain aspects or embodiments, the background encoding step of feature maps 88 are based on first modeling the background (tissue, cytoplasm etc.) and then extract the foreground that contains nuclei from the image at step 84. In certain embodiments, the largest part of tissue images is background 88; its texture and color vary usually in a larger scale compared to the foreground 86. Also, usually a major portion of a tissue image is background. Thus, the system encodes an input image to a few small feature maps and can accurately assume those feature maps 88 mostly contain the background information. In an example implementation, the system represents the background of a 100×100 image by five 5×5 maps.

In certain aspects or embodiments, the foreground encoding of feature maps 86 occurs once the background is encoded and then reconstructed, since the residual between the reconstructed background 89 and the input image 91 will be the foreground 87. The foreground 87 consists of nuclei 76 which are roughly of the same scale and often dispersed throughout the image. The foreground encoding feature maps 86 encode everything about the nuclei, including their locations and appearance. A foreground feature map 86 can be viewed as a matrix, in which each entry is a vector (for example, representing a set of neuron responses) that encodes an image patch (which represents the neurons' receptive field). The vectors will encode nuclei, if there are nuclei at the center of the image patches. Otherwise, the vectors contain zeroes only.

Since a small number of non-zero vectors encode nuclei 76, the foreground feature map 86 will be sparse in the example embodiment.

During the process of crosswise sparsity, the system defines crosswise sparsity as follows: a set of $f$ feature maps as $X_1, X_2, \ldots X_f$ are denoted. Each feature map is a matrix.

The system further denotes the i, j-th entry of the l-th feature map as $X_l^{i,j}$, and the size of a feature map is s×s. A conventional sparsity constraint requires the following Equation (1) defined hereinbelow as:

$$\frac{\sum_{i,j,l} \mathbb{1}(X_l^{i,j} \neq 0)}{fs^2} \ll 1 \tag{1}$$

Where $\mathbb{1}(\cdot)$ is the function that returns 1 if its input is true and 0 otherwise. Crosswise sparsity requires the following condition defined in Equation (2) defined hereinbelow as:

$$\frac{\sum_{i,j} \mathbb{1}\left(\sum_l \mathbb{1}(X_l^{i,j} \neq 0) > 0\right)}{s^2} \ll 1 \tag{2}$$

In most locations in the foreground feature maps 86, neurons across all the feature maps should be activated. This sparsity definition, as illustrated in FIG. 2C, can be viewed as a special form of group sparsity in certain embodiments or aspects.

If a foreground image is reconstructed by feature maps 86 that are crosswise sparse 78, as defined by Equation (2) provided hereinabove, the foreground image 87 is essentially reconstructed by a few vectors in the feature maps. As a result, those vectors must represent salient objects 78 in the foreground image—for example, nuclei, since the CAE aims to minimize the reconstruction error.

Crosswise sparsity defined by Equation (2) as defined hereinabove, is not achievable using conventional sparsification methods that can only satisfy Equation (1) defined hereinabove. Hence, the system introduces a binary matrix D with its i, j-th entry $D^{i,j}$ indicating if $X_l^{i,j}$ are activated for any l or not as defined by Equation (3) as provided hereinbelow as:

$$D^{i,j} = \mathbb{1}\left(\sum_l \mathbb{1}(X_l^{i,j} \neq 0) > 0\right) \tag{3}$$

Therefore, Equation (2) now becomes defined as Equation (4) provided hereinbelow as:

$$\frac{\sum_{i,j} D^{i,j}}{s^2} \ll 1 \tag{4}$$

The foreground feature maps $X_1, X_2, \ldots X_f$ are crosswise sparse, if there exists a matrix D that satisfies Eq. 3 and Eq. 4. In order to satisfy Eq. 3, the system implements an embodiment of the CAE to generate a binary sparse feature map that represents D. The CAE computes $X_l$ based on a dense feature map $X_l'$ and D by element-wise multiplication defined as Equation (5) hereinbelow:

$$X_l = X_l' \odot D \tag{5}$$

The feature map D is then defined as the detection map 83, as shown in FIG. 2B. The dense feature map $X_l'$ is automatically learned by the CAE by minimizing the reconstruction error. The exemplary CAE also computes the D that satisfies Equation (4) as defined hereinabove. It is noted that Equation (4) is equivalent to the conventional sparsity defined by Equation (1), when the total number of feature maps $f=1$ and $X_f$ is a binary feature map. Therefore, Equation (4) can be satisfied by existing sparsification methods. A standard sparsification method is to add a sparsity penalty term in the loss function. This method requires parameter tuning to achieve the desired expected sparsity. The k-sparse method guarantees that exactly k neurons will be activated in D, where k is a predefined constant. However, in tissue images, the number of nuclei per image varies and the sparsity rate also should vary, in certain embodiments or aspects.

In certain embodiments, a threshold based method that generates an overall expected predefined sparsity rate, even though the sparsity rate for each CAE's input can vary. The binary sparse feature map D is computed as output from an automatically learned input dense feature map D' as defined by equation (6) hereinbelow as:

$$D^{i,j} = \text{sig}(r(D'^{i,j} - t)) \tag{6}$$

wherein sig($\cdot$) is the sigmoid function, r is a predefined slope, and t is an automatically computed threshold. In certain exemplary implementations, r=20 is selected, hence, rendering D a binary matrix in such applications. Different r values generally do not affect the performance significantly based on the exemplary implementations. The CAE computes a large t in the training phase, which results in a sparse D. The expected sparsity rate is defined as p %, which can be set according to the average number of nuclei per image (for example, use p=1.6 in example experiments), and compute t as defined in equation (7) as provided hereinbelow:

$$t = E[\text{percentile}_p(D'^{i,j})] \tag{7}$$

wherein percentile$_p$(D'$^{i,j}$) is the p-th percentile of D'$^{i,j}$ for all i, j, given a particular CAE's input image. Next, t is computed using the running average method:

$$t \leftarrow (1-\alpha)t + \alpha \text{ percentile}_p(D'^{i,j}) \tag{8}$$

The constant $\alpha=0.1$ is set in exemplary experiments. This running average approach is also used by batch normalization processes. In order to make sure the running average of t converges, the system also uses batch normalization on D'$^{i,j}$ to normalize the distribution of D'$^{i,j}$ in each stochastic gradient descent batch. In total, three parameters are introduced in the CAE: r, p, and $\alpha$. The sparsity rate p can be decided based on the dataset easily. The other two parameters do not affect the performance significantly in exemplary experiments.

In addition, with crosswise sparsity, each vector in the foreground feature maps can possibly encode multiple nuclei. In order to achieve one-on-one correspondence between nuclei and encoded vectors, the size of the encoding neurons' receptive fields are reduced, such that a vector encodes a small region the size of which is close to the size of a nucleus.

Figure 2C:
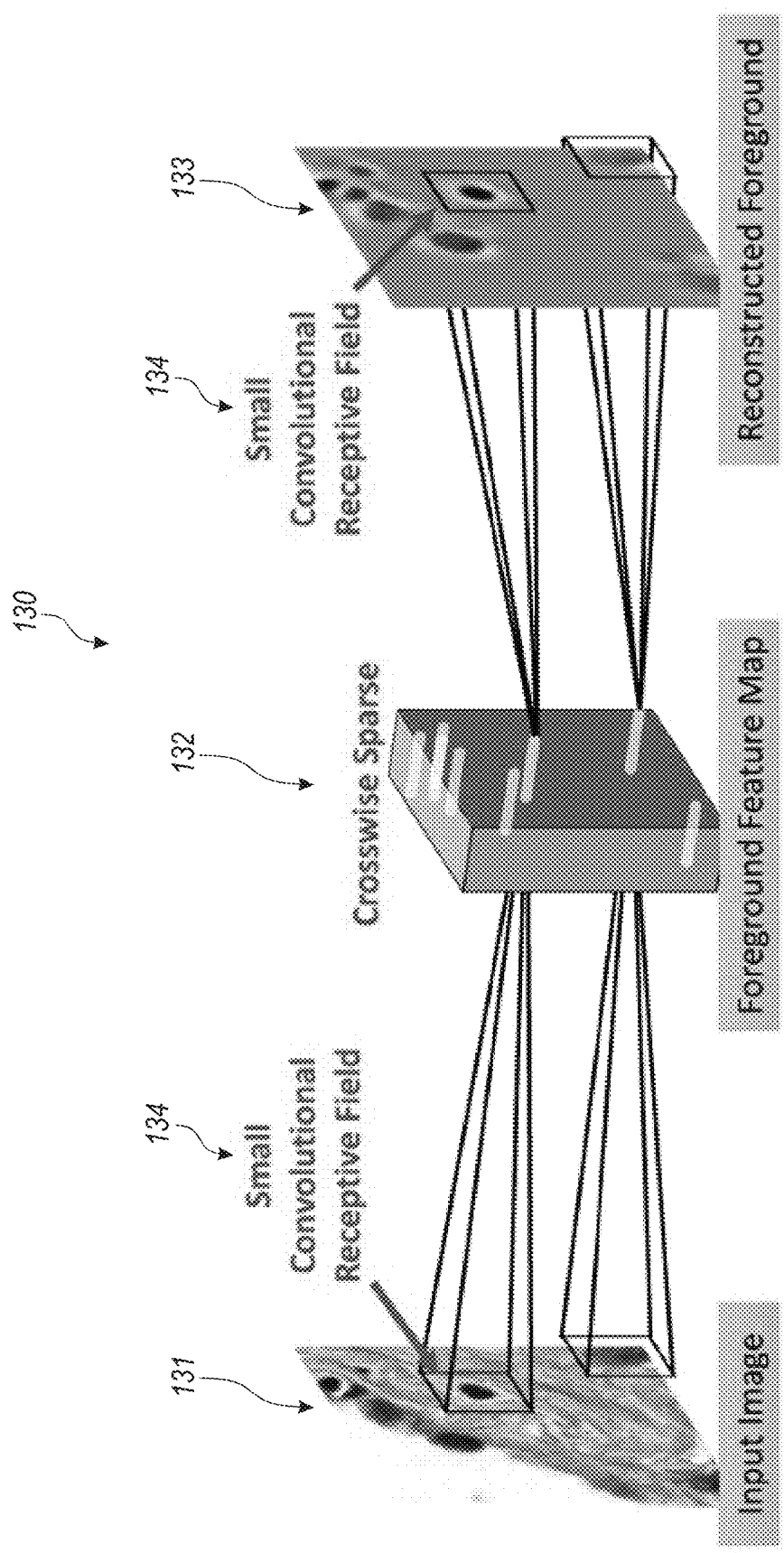
FIG. 2C illustrates how each nucleus is encoded and reconstructed during crosswise sparse CAE reconstruction process, in accordance with an embodiment of the disclosed system and method.

FIG. 2C illustrates how each nucleus is encoded and reconstructed during crosswise sparse CAE reconstruction process, in accordance with an embodiment of the disclosed CAE system and method, as described hereinabove in connection with FIG. 2B. First the foreground feature map must be cross-wise sparse 132 using equation (2) defined hereinabove. Second, the size of the receptive field 134 of each encoding neuron should be small enough that it contains just one nucleus, in the example embodiment. The reconstructed foreground map 133 is shown in FIG. 2C, with the small convolutional receptive field enclosing the neurons 134.

Referring to FIGS. 2A-2C, an embodiment of the Convolutional Autoencoder (CAE) contains one branch with a small number of low resolution, dense feature maps, and a second branch with high resolution, but sparse feature maps. The high resolution sparse feature maps are designed to capture foreground objects (e.g., cancer cell nuclei and lymphocytes)—these objects are sparsely distributed in the tissue and contain substantial high spatial frequency color and texture variability. The network learns foreground feature maps in a "crosswise sparse" manner: neurons across all feature maps are not activated (output zero) in most feature map locations. Only neurons in a few feature map locations can be activated. Since the non-activated neurons have no influence in the later decoding layers, the image foreground is reconstructed using only the non-zero responses in the foreground encoding feature maps. The low resolution dense feature maps are designed to encode background color and texture of the background. First, the system models the background (tissue, cytoplasm etc.) and then extract the foreground that contains nuclei.

The supervised CNN takes the unsupervised encoded features from the unsupervised CAE for classification. The system initializes the parameters in these layers to be the same as the parameters in the CAE. The system attaches four 1×1 convolutional layers after the foreground encoding layer and two 3×3 convolutional layers after the background encoding layer. Each added layer has 320 convolutional filters. Next, the system applies global average pooling on the two branches. The pooled features are then concatenated together, followed by a final classification layer with for example, sigmoid activation function.

Figure 3A:
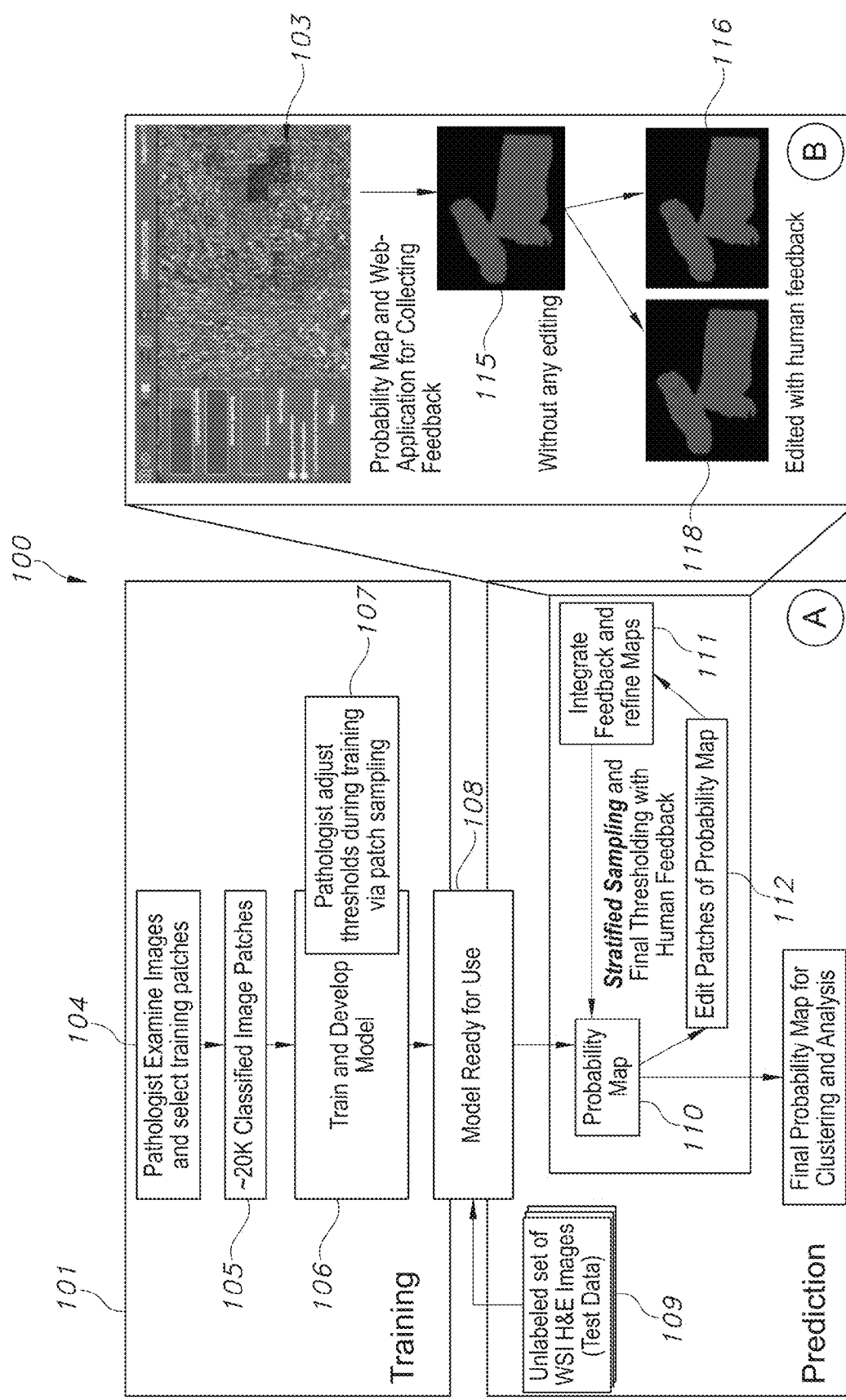
FIG. 3A illustrates a workflow overview of CNN training and model development, iterative cycles of prediction, editing of spatial prediction maps, retraining and generating final TIL maps, in accordance with an embodiment of the disclosed system and method.

Referring to overview of the system and method of determining probability maps associated with TILs, shown in FIG. 3A is an overview of the model, in accordance with an embodiment. Phase (1) 101 comprises initial training and model development. Phase (2) 102 comprises an iterative cycle of prediction, editing of spatial prediction map, and re-training. Phase (3) 103 comprises expert refinement of patches for final thresholding and refinement of the generated maps. In certain embodiments such expert refinement phase is automated as the system (and respective CNN model) is iteratively trained using copious image samples. In alternate embodiments, the system can receive such stratified sampling via human feedback by expert pathologist review of patches for final thresholding and refinement of maps. A user can edit the respective heatmap using the "Lymphocyte Sensitivity," "Necrosis Specificity," and "Smoothness" tools. For finer-grain editing, the user can use the "Markup Edit" tool to mark-up specific patches and label them as lymphocyte infiltrated or not. One example implementation provides for edited tumor infiltrating lymphocyte maps by pathologists. The red pixels represent lymphocyte infiltrated patches and the blue pixels indicate patches that are not infiltrated by lymphocytes.

Shown in FIG. 3A, is an embodiment of the workflow associated with a deep learning based system and method 100 for the determination and refinement of TIL maps. CNN is a state-of-the-art deep learning technique that is popular in many image analysis applications. However, the disclosed Convolutional Neural Network (CNN) model is novel in identifying lymphocyte-infiltrated regions in whole slide tissue images (WSIs) of Hematoxylin and Eosin (H&E) stained tissue specimens. The CNN is a supervised classification method which has been successfully applied in a large number of image classification problems. The CNN learns a classification (or predictive) model during a training phase 101. The model is then used to classify new data elements in a prediction phase 102. The workflow 100 shown in FIG. 3A, is specifically implemented in order to train the CNN models to determine and refine TIL maps. The workflow 100 consists of an initial training and model development phase 101 in which pathologists classify sample whole slide image patches in a single tumor type. This process applies an iterative cycle of 1) CNN prediction 102, 2) Pathologist visual editing of a spatial map generated from the CNN lymphocyte prediction algorithm and 3) CNN re-training using the edited prediction map. The last step consists of pathologist review of a finite set of representative patches, for example, ten patches sampled from each slide for final setting of thresholds. This iterative review, and refinement, is outlined in step B of FIG. 3A.

Phase 101 training begins with pathologist examination of images and selection of training patches in step 104. Next approximately 20K image patches are classified in step 105. The training and development model occurs during step 106. In certain embodiments the pathologists may adjust thresholds during training via patch sampling in step 107. The model is developed and ready for use in step 108. An unlabeled set of WSI H&E stained images 109 are received by the system in step 108. Probability maps are generated during step 110 wherein patches of the probability map are edited during step 112. Integration of feedback and further refinement of maps occurs in step 111. The stratified sampling of and final thresholding of the maps occurs in certain embodiment with expert pathologist feedback. In alternate embodiments, the system is already trained to provide expert pathologist feedback through the above deep learning techniques and refinements thereof. The final probability map is generated for clustering and analysis during step 113. The probability map 103 that is generated is shown in 103. The unedited map 115 may undergo further refinement. Once the final TIL map 116, 118 is further edited and/or refined, it is ready for use in connection with classification and/or diagnosis.

The approach implements two CNNs: a lymphocyte infiltration classification CNN (lymphocyte CNN) and a necrosis segmentation CNN as shown and described hereinabove in connection with FIG. 1C. The lymphocyte CNN categorizes patches of the image into those with lymphocyte infiltration, and those without lymphocyte infiltration. The second CNN, for necrosis segmentation, is designed to eliminate false positives from necrotic regions where nuclei may have characteristics similar to those in lymphocyte infiltrated regions. The lymphocyte CNN is trained with 50×50 square micron patches from whole slide tissue images—each patch covers 100×100 square pixels in tissue images acquired at 20× magnification level. The necrosis CNN works with a larger region with more contextual information to predict if patches are necrotic.

In order to assess the performance of the disclosed embodiment was compared in its prediction performance with that of a state-of-the-art CNN, called VGG16, using a set of WSIs from TCGA lung adenocarcinoma (LUAD) cases. The training set of the lymphocyte CNN consisted of 20,876 patches in the example implementation (each patch is a 100×100 pixel images extracted from a subset of the LUAD original whole slide images). Each patch was annotated by a pathologist as lymphocyte-infiltrated or not-lymphocyte-infiltrated. The training set of the necrosis segmentation CNN consisted of 1,800 patches. Each patch was annotated with a necrosis region mask segmented by a pathologist. Sample were 2480 patches to create the test dataset. An ROC curve shows that the disclosed approach outperforms VGG16 by 3.1% with respect to the Area Under ROC Curve (AUROC) metric (referring to example FIG. 9A). Although the ROC curve did not show significant improvement, after training the CNN, it is observed that significant improvement occurred when visualizing the retrained TIL results overlaid on the H&E images.

After this evaluation, another exemplary implementation applied the CNNs to diagnostic H&E WSIs from 13 TCGA tumor types (see below list of tumor types and acronyms) in which lymphocytes are known to be present and including uveal melanoma (UVM) as a type of negative control, as it has the fewest immune cells among TCGA tumors. Each image was partitioned into patches of 50×50 square microns and each patch was classified by the lymphocyte CNN. One or more pathologists examined the prediction results and annotated patches that had been classified incorrectly by the lymphocyte CNN. The lymphocyte CNN was re-trained with the updated dataset. This labeling and retraining process was repeated until the pathologists agreed that the prediction results are reasonable. The disclosed method incorporates a region segmentation phase using the necrosis segmentation CNN to account for necrosis regions. If the necrosis segmentation output was not adequate to support further analysis, the pathologists circled necrosis vs. non-necrosis regions and the necrosis CNN was retrained. In a final step, probability thresholds for determining tumor-infiltrating-lymphocyte (TIL) positive patches were set on an individual-slide basis. TIL maps were generated for 5156 TCGA tumor images from the 13 TCGA cancer types. Tumor types were selected on the basis of known positive involvement of lymphocytes and immunogenicity based on literature.

The pipeline can be conceptualized into three stages that share many methods and technologies: 1) use the computational staining and CNN model(s) to predict, extract and characterize TIL Maps; 2) train CNN model(s) for a new unseen cancer type; and 3) further refine CNN model(s) for deployment at a new site or geographical location where different patterns may emerge among a local population even for similar types of cancer cells.

Figure 3B:
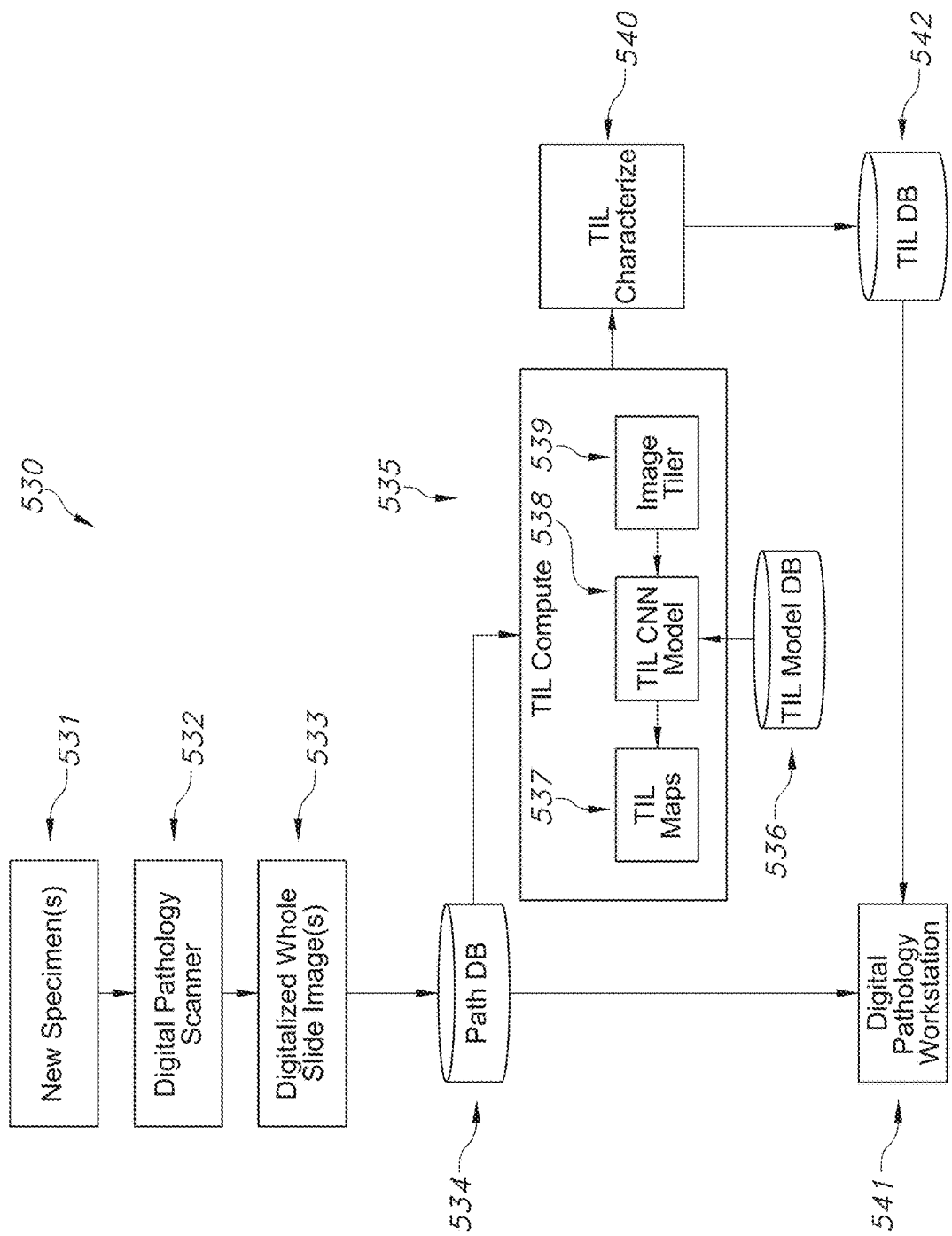
FIG. 3B provides a flowchart delineating the steps associated with generating TIL maps and respective TIL Map prediction using computationally stained digitized whole slide tissue images, in accordance with an embodiment of the disclosed system and method.

FIG. 3B illustrates a workflow for TIL Map Prediction in accordance with an embodiment of the disclosed system and method. In particular, FIG. 3B provides a flowchart delineating the steps associated with Computational Staining that generating TIL maps and the associated TIL predictions from digitized whole slide tissue images and the subsequent characterization of TILs, in accordance with an embodiment of the disclosed system and method.

Beginning with step 531 of workflow 530, a new diagnostic pathology slide(s) is scanned by a whole slide pathology scanner (step 532) that results in one or more digitized whole slide images (533) that are saved in a pathology image database (step 534). The TIL Map prediction system (step 535), in accordance with an embodiment of the disclosed system and method, then computes TIL Maps and the associated TIL predictions. This computation of TIL Maps consists of a series of artificial intelligence and deep learning models that are applied on the image, using a series of optimizations and parallelizations such as those enabled by image tiling, and results in TIL predictions that are represented as TIL Maps. The deep learning models are managed and versioned in a TIL Model Database (step 536). The computed TIL Maps are then optionally fine-tuned using an intelligent thresholding step (step 550 and FIG. 3D) and characterized (step 540). The resulting TIL maps and characterizations are then stored and managed in a database (TIL DB Step 542). In certain embodiments, digital pathology cloud platforms permits collaboration on cancer research and diagnosis across several of cancer types. The system can further include AI-powered image detection and workflow support, telepathology, collaboration, cloud storage and built in APIs for integration by hardware and software vendors and also various biopharma companies.

In certain embodiments, the computer expert pathologist system using AI and/or CNN training techniques, trains the system to detect TILs that arguably humans may not be able to detect or at least can highlight areas to the human pathologists.

The database stores the whole slide images in step 534, and the TIL computer, computing device or processor 535 receives the digitized data for TIL analysis. A TIL Model Database 536 stores sample digitized whole slide images step 536 and transmits a sample set of WSI slides to train the TIL CNN model. The objective of this pipeline is to identify tumor infiltrating lymphocytes (TILs) from digitized whole slide images (WSI) of Hemotoxylin and Eosin (H&E) stained pathology specimens obtained from biopsied tissue, and then spatially characterize the TIL Maps (for example, map of TILs in a whole slide image as shown in FIG. 7B). This process is done using deep-learning (CNN) based model which is trained from step 538.

Figure 3C:
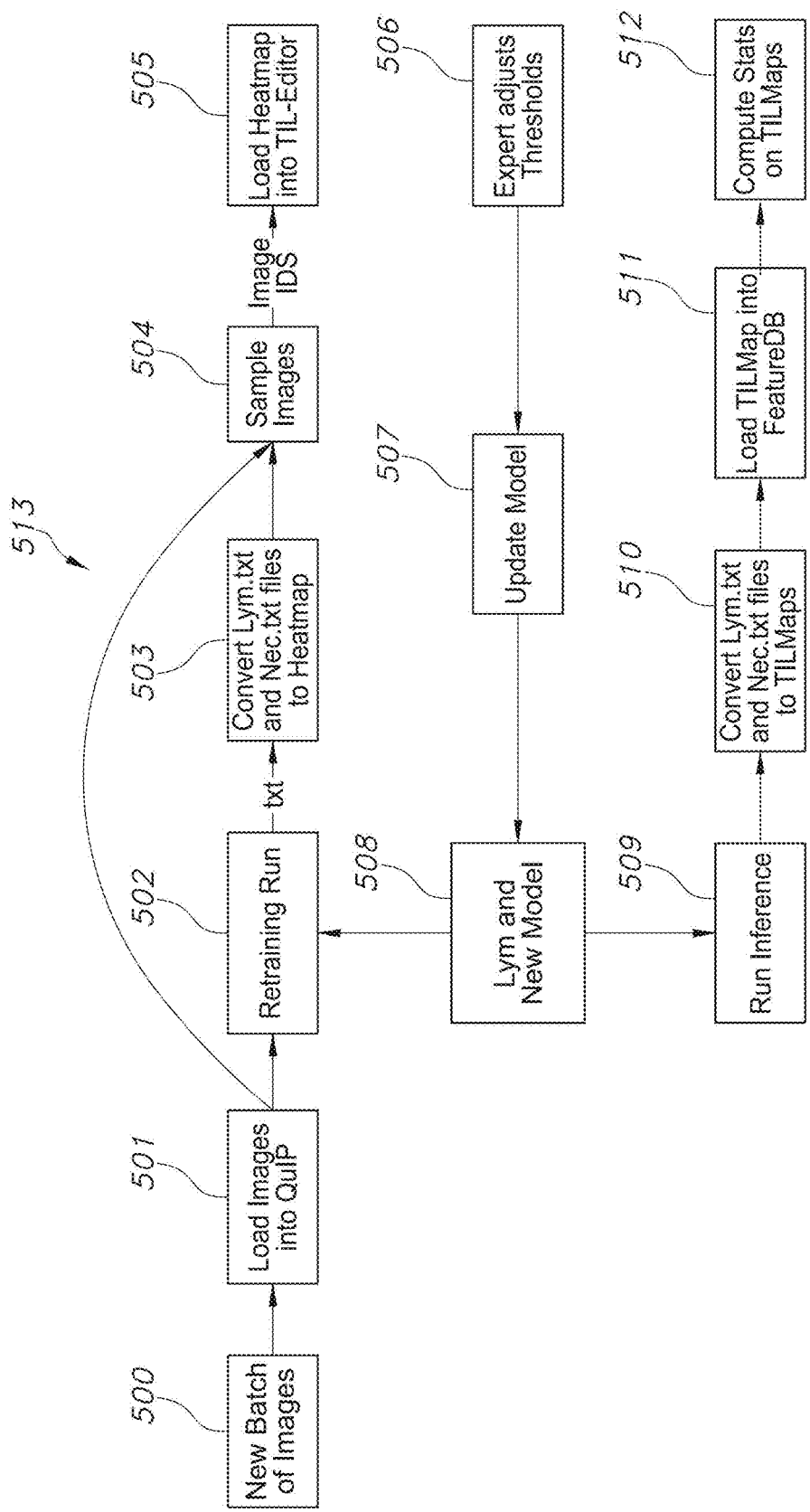
FIG. 3C illustrates a workflow associated with identifying tumor infiltrating lymphocytes (TILs) from digitized whole slide images (WSI) of Hemotoxylin and Eosin (H&E) computationally stained pathology specimens, and spatially characterizing the TIL Maps, in accordance with an embodiment of the disclosed system and method.
Figure 3D:
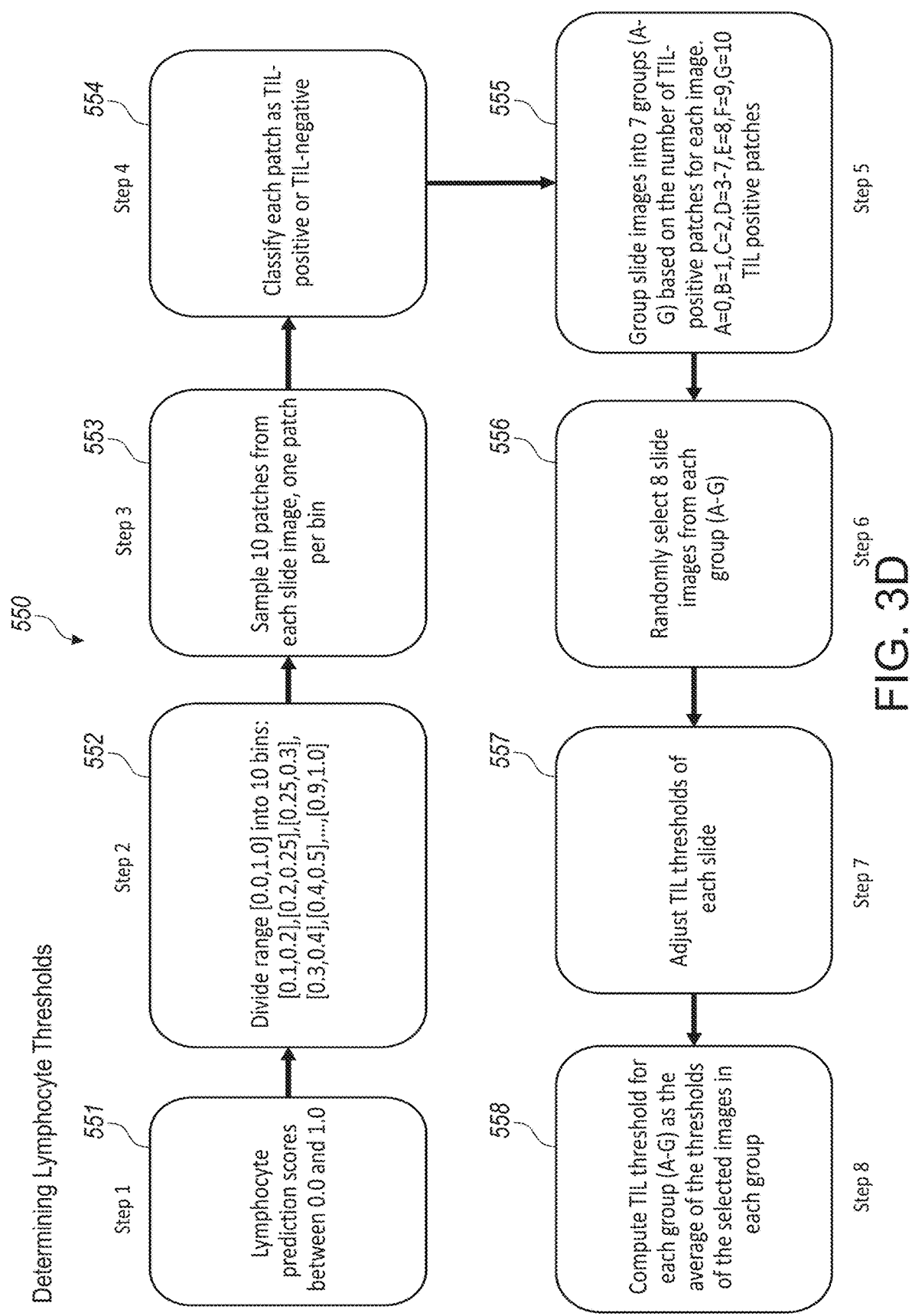
FIG. 3D illustrates a workflow associated with determining lymphocyte threshold values used in refining respective TIL maps, in accordance with an embodiment of the disclosed system and method.

FIG. 3C illustrates a workflow associated with identifying tumor infiltrating lymphocytes (TILs) from digitized whole slide images (WSI) of Hemotoxylin and Eosin (H&E) stained pathology specimens obtained from biopsied tissue, and then spatially characterizing the TIL Maps, in accordance with an embodiment of the disclosed system and method.

It is noted that the objective of this exemplary pipeline in FIG. 3C, is to identify and characterize Tumor Infiltrating Lymphocytes (TILs) from digitized whole slide images (WSI) of Hemotoxylin and Eosin (H&E) stained pathology specimens obtained from biopsied tissue, and then spatially characterize the TIL Maps (defined as a map of TILs in a whole slide image). This process is done using deep-learning (CNN) based model. This entire process may be referred to as computational staining for TILs. Also described are certain of the various supporting infrastructure that is required in certain embodiments during the different stages of computational staining process.

The exemplary process is done using deep-learning convolutional neural network (CNN) based model. The process implements computational staining for TILs. In certain aspects or embodiments, various supporting infrastructure can be implemented in the different stages of computational staining. In certain embodiments, computational staining for TILs consists of three distinct and independent stages: 1) training the CNN model; 2) refining the CNN model and 3) deploying and using a model to identify TILS and produce a TIL MAP) or a heatmap that shows the areas of an image that are TILs).

The first stage in computational staining for TILS involves training the model so that it can learn to identify a new cancer type. The model accumulates its respective learning. Essentially, a single model is learned that is capable of recognizing TILs for example, in 13 different cancer types and not 13 models, one for each type.

The second stage in computational staining for TILS involves refining a model to account for latent features that are unique to a local population and may also be implemented when deploying the model at a new site (hospital, medical facility, or geographic location). Over the course of this refinement, a model, that has been trained to identify for example, TILs in lung cancer, is refined to incorporate the subtle, largely latent, characteristics of local populations and/or diagnostic protocol. In certain embodiments, refining a model is different from training a model. A trained model can be further refined.

The third stage for computational staining for TILS includes deploying and using the developed model to identify TILs and produce a TIL Map (for example, in the form of a heatmap that shows the areas of an image that are TILs as shown for example, in FIGS. 6C and 7B), and subsequently characterize TILs is another stage of the pipeline in identifying TILs.

In certain exemplary implementations, the process implements certain infrastructure consisting of: 1) Path DB: tool for managing images and associated image metadata; 2) FeatureDB: tools for managing image labels, patches, and TIL Maps; 3) TIL Training Tool (also referred to as a viewer or caMicorscope): a web-based or desktop-based tool that can interface with PathDB to display images, capture markups, annotations and labels and load the resulting data into FeatureDB; 4) TIL-Editor: a web-based or desktop client that can display TIL Maps, spatial characterizations of TILs and patient level summaries; 5) TIL-ModelDB: a version controlled model management system that is used to store and manage the various machine learning models; 6) TIL-Compute: an image processing pipeline that takes in one or more whole slide image, and a deep learning model for identifying TILs in an image which can be executed on cloud computing environments as well as on-premise compute environments; 6) TIL-Characterize: a TIL characterization pipeline receives an image and associated TIL Maps and computes spatial characteristics of the TIL Maps. It subsequently computes a patient-level aggregate from one or more TIL Maps extracted from a patient. These spatial characteristics and patient-level aggregates are then loaded into TIL-DB; and 7) TIL-DB: a database that stores and manages TIL Maps, spatial characteristics of TILs and patient-level summaries.

Training a CNN Model to Recognize a New Cancer Type is another exemplary embodiment. Such training is used to train the model to recognize TILs in a new, previously unseen cancer type. This training implements an existing model and supplements the model, with the ability to process a new cancer type.

The steps in training a model in accordance with the exemplary embodiment are as follows:

1) Training Data Preparation:
  a. Acquire specimens of the new cancer type
  b. Digitize slides
  c. Load digitized slides into PathDB
  d. 80% of slides are marked Training Data
  e. 20% of slides are marked as Testing Data
2) Obtain the Initial Training Set:
  a. Pathologist Views Training Data in Viewer
  b. Pathologist labels data
  c. Labeled Data is Loaded into FeatureDB
3) Train the Model:
  a. Load existing model from TIL-ModelDB
  b. Train the Convolutional AutoEncoder (CAE)
  c. Train the Lymphocyte Convolutional Neural Network (Lym-CNN)
  d. Train the Necrosis Convolutional Neural Network (Necrosis-CNN)
4) Save the updated model:
  a. An updated Model is versioned and saved to TIL-ModelDB During the step of obtaining the initial training set, one or more pathologists review the training data slides using the viewer. This process can be implemented using the TIL-Training-Tool that can load images from PathDB and provides the pathologist with a templated Q&A form that accompanies every image. Using the markup capabilities of the viewer and the form, the pathologist circles one or more representative regions that include different tissue types and textures, and lymphocyte infiltration patterns (individual lym or aggregated lym). Pathologists label more non-TIL patches much more than TIL patches, to reflect the real ratio of TIL and to catch variabilities of non-TIL regions. The labels (training data) are automatically saved to FeatureDB.

The goal is to create a dataset of digitized whole slide images that have been found to have adequate amounts and variety of TILs. Training the specific process in certain embodiments, proceeds as follows: Identify specimens from a number of patients who have a confirmed diagnosis of the new cancer type. The number of patients needed varies from cancer type to cancer type, but can begin with a sample size of 25. An image tiler 539 will tile the respective images and the CNN model is trained and/or being implemented once already trained. TIL Maps are generated 537 once the respective lymphocyte areas have been detected by the system.

The slides are next annotated using the TIL training tool or alternatively a TIL characterize tool in step 540. An expert pathologist will markup representative regions for each region. Representative regions include different types of tissue, observed textures, lymphocyte infiltration patterns, and also areas with no-TILs. The TIL training tool segments each marked up region into set of smaller image patches; these patches are labeled to identify the predominant histopathological finding located in that patch. Any respective TIL MAP prediction occurs in step 537. The patches and the associated labels are loaded into example database, FeatureDB or TIL database 542 for further analysis by a digital pathology workstation 541.

The model may be used to extract and characterize TIL Maps as shown in sub-process 535, for example. The objective of the workflow 530 of example FIG. 3B is to analyze digitized H&E images and itdentified TIL information associated with the digitized H&E stained images. The system computationally stains the images for generating and analysis of respective more refined and targeted TIL Maps. Such TIL Maps can be used in clinical analysis and/or prognosis and result in more accurate patient summaries including more accurate classification of the respective cancer type that is identified. This computationally stained TIL Map and the corresponding patient summary could be used by a pathologist for improved diagnostic, staging or prognostic applications.

During the training the model step, three models are trained in an example embodiment: the convolutional autoencoder (CAE), the lymphocyte convolutional neural network (Lym-CNN), and the necrosis convolutional neural network (Necrosis-CNN). The CAE is used to initialize the lym-CNN which predicts the probability of an input patch is being lymphocyte infiltrated. The system trains the necrosis-CNN to segment necrotic regions. An input patch is lymphocyte infiltrated if the lym-CNN predicts as such, and the necrotic-CNN determines it's not a necrotic region.

A color normalization step is applied during the model training phase to account for stain variations on account for operator variability. Additionally, data augmentation is applied in addition to rotating the images which also perturbs the colors of each patch slightly, to generate multiple versions of the same patch.

As described hereinabove regarding FIGS. 2A-2C, the CAE is an unsupervised model. The purpose of this CAE model, is to initialize the Lym-CNN thus enabling the Lym-CNN to focus on objects (nuclei, lymphocytes etc), before it is trained with supervision. Thus, the output of this step is a binary file containing all of the trained network parameters of the CAE. A CAE is only trained once and can be used for all current and future cancer types. The CAE is stored in TIL-ModelDB.

Figure 4A:
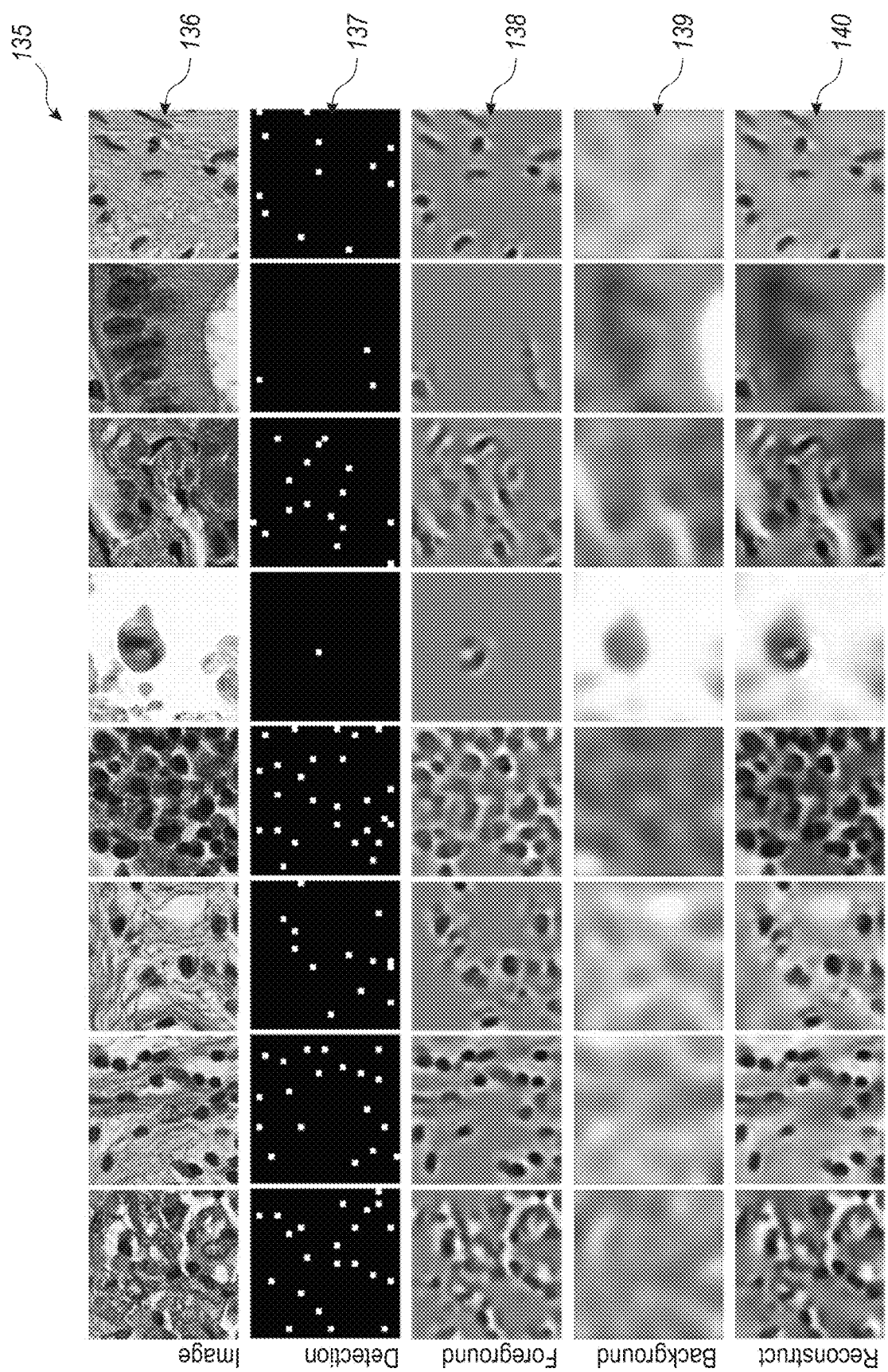
FIG. 4A shows microphotographs of sample image patches from randomly selected examples of unsupervised nucleus detection and foreground, background image representation and reconstruction results of using crosswise sparse CAEs, in accordance with an embodiment of the disclosed system and method.

The CAE learns to compress a pathology image patch (100×100 pixels, 20×) into a few vectors (around 10 ~20 vectors, each vector has length 100), and a coarse feature map representing the background. The objective function was optimized by training the CAE and also, from how well the reconstructed image patch result is, from the compressed vectors and feature map. The resulting CAE learns to encode each object (nucleus, lymphocyte, etc) into one vector. As shown in FIG. 4A, $1^{st}$ image: Input pathology patch 136; $2^{nd}$ image: places where the CAE compresses into vectors 137; $3^{rd}$ image: reconstruction from the vectors 138; $4^{th}$ image: reconstruction of the background 139; and $5^{th}$ image: reconstruction of the input image ($3^{rd}$ image+$4^{th}$ image) 140.

More particularly, training a model to recognize TIL maps in a new cancer type is another example implementation of training the model to detect TILs in the context of a new cancer type. Individual users will usually adapt existing models, but in some cases may elect to undertake this process. Generally, in practice, users are likely to train the model on new cancer types and publish the model to a version controlled model registry. During the creation of a labeled training set, the system will undergo certain processes to create a dataset of digitized whole slide images that have been found to have adequate amounts and variety of TILs. The example process begins with specimens identified from a number of patients who have a confirmed diagnosis of a new cancer type. The number of patients required varies from cancer type to cancer type, but the process generally begins with a sample size of 25. Slides are annotated using the TIL training tool. Hence in step 500 of the workflow 513 of FIG. 3C, a new batch of images are trained. The images are loaded into a training CNN in step 501. The training and retraining occurs in step 502. The system converts the data (TIL data) into a heatmap in step 503 (for example, the heatmap as shown in FIGS. 6C and 7B). The same images in step 504 are loaded into a TIL map editor for final refinement thereof. Parallel to this process, experts may adjust threshold values for the respective desired densities of lymphocyte regions in step 506. As shown for example in FIGS. 7E-7F, the lymphocyte sensitivity and necrosis specificity may be adjusted as shown in the left portions of such figures. In alternative embodiments, the expert refinement step is also trained in the model and does not require human pathologist feedback. The model is then updated in step 507. The new model and respective lymphocyte regions that are now thresholded, are loaded in step 508 and may also be used for further retraining of the model in step 502.

Refining a model to account for latent features that are unique to a local population also occurs when deploying the model at a new site (hospital, geographic location). Over the course of this refinement, a model, that has been trained to identify TILs in lung cancer, is refined to incorporate the subtle, largely latent, characteristics of local populations and/or diagnostic protocol. In other words, refining a model is different from training a model. Only a trained model can be refined.

The model can also be refined for deployment at a new site. It is noted that clinical diagnosis and decision making is a highly qualitative and has numerous latent confounding factors. Therefore it is complex to just simply deploy the pipeline at a new location or work on images acquired from a new scanner. The pipeline therefore consists of steps that are used to refine the model for local information, or develop credentials for the computational staining pipeline to work with new images. This is not the same as training the model to learn about a new cancer type as described hereinabove. Rather, this is a scenario where a model has to be tuned so that it can process images of a known cancer type, but one that comes from a new site/scanner.

The refinement process is similar to the training process. The primary difference is that, unlike training, it does not require any labeled images. Instead a small subset of images (10-50 for each known cancer type) are acquired and TIL Maps are predicted from these images using the inference process (Steps 534, 545 in FIG. 3B). The resulting maps are then thresholded and the threshold values are then incorporated back into the CNN model(s), thus refining them to recognize the local patient population This refinement process is shown in FIG. 3C (steps 500-508). In alternative embodiments, an additional AI component module can learn the pathologists manual refinements and train a model to implement such editing step in an automated fashion by the TIL MAP editor system processor.

It is noted that in alternative embodiments an additional workflow 550 for determining lymphocyte thresholds shown in FIG. 3D, is implemented between the following steps: TIL computation engine 535 and TIL characterize engine 540. Alternatively, the workflow 550 for determining lymphocyte thresholds shown in FIG. 3D, is implemented between steps: TIL computation engine 535 and generating the TIL model database 536. The workflow 550 described in FIG. 3D, is provided in greater detail hereinbelow.

FIG. 3D illustrates a workflow associated with determining lymphocyte threshold values used in refining respective TIL maps, in accordance with an embodiment of the disclosed system and method.

The thresholding step (550 in FIG. 3B and FIG. 3D) handles the issue that different slides require different thresholds—the CNNs over predicts lymphocytes in some of the slides while under predicts in others. Slides with under predicted lymphocytes require a lower threshold and vice versa. Manually selecting the lymphocyte sensitivity and necrosis specificity for all slides in a cancer type (around 500 slides) is very time consuming. Hence, the system adopts the following method: which is shown in workflow 550 in FIG. 3D.

In steps 551-553, for each slide, ten patches were sampled from 10 ranges of the lymphocyte CNN's scores (0.10-0.20, 0.20-0.25, 0.25-0.30, 0.30-0.40, 0.40-0.50, 0.60-0.70, 0.70-0.80, 0.80-0.90, 0.90-1.00). Three pathologists labeled them as lymphocyte infiltrated or not. Alternatively, the system is automated via CNN training and/or artificial intelligence modules to learn the pathologist expert analysis and implement such labeling expertise of the three pathologist.

Based on the number of labeled lymphocyte/non-lymphocyte patches, each slide was categorized into 1 of 7 groups: Groups A-G, based corresponding to 0,1,2,3-7,8,9, and 10 positive patches respectively, in steps 554-555.

The next step 556 is to select a threshold in each group. In each group, randomly selected were 8 slides and adjusted thresholds for each of them using the visual TIL-Map editor. If a group has less than 8 slides, the system selects all slides in the group.

The threshold of all slides in one group was set to be the average threshold selected for the eight slides sampled in that group. Note that if the system categorizes the slides into more number of groups, then the system selects thresholds for more slides, since per group, a meaningful averaged threshold requires a minimum number of selected thresholds. On the other hand, the system categorizes the slides into fewer groups, the intra-group variance of possible slide-specific biases might be too large. Therefore, the system selects 7 or alternatively 8 slides, as the number of groups, striking a balance between efficiency and effectiveness in step 556.

Following the process described above, to threshold 500 slides, pathologists must manually label 5000 patches, and threshold at most 56 slides (at most 8 slides per group, 7 groups). The amount of manual work is arguably significantly less than manually thresholding 500 slides. In step 557 the system accomplishes adjusting TIL thresholds of each slide. In step 558 the system computes TIL threshold for each group (A-G) as the average of the thresholds of the selected images in each group.

The system in FIG. 3B, for example, may implement a web application, a TIL-Map editor, to support the review and refinement by the pathologists of the tumor-infiltrating lymphocyte patch predictions and the segmentation of necrotic regions. In particular the review and refinement of CNN predictions can be implemented. In an embodiment, the TIL-Map editor extends for example, caMicroscope interface to enable the visualization of patch-level classification labels as a heatmap overlay on a WSI. It is distributed as part of a suite of tools called QuIP—Quantitative Imaging for Pathology. QuIP is a software system which consists of a suite of integrated data services and web-based user applications designed for the management and analysis of whole-slide tissue images and indexing and exploration of image features. When using the TIL-Map editor, a user can interactively visualize, pan, and zoom-in/out of the whole-slide tissue image and interactively pan and zoom around the image, in a manner similar to various online mapping systems. The TIL-MAP visualization tool displays the TIL-Maps, as polygonal overlays that appear over the H&E image. The intermediate and final TIL Maps are stored in the QuIP FeatureDB, which manages and indexes both the image metadata and the TIL classification results. FIG. 9B shows an example heatmap along with the TIL-Map editor.

It is noted that each patch in a WSI is represented as a rectangle and associated with a classification label and the probability value computed by the CNN. This information is stored as a data element (document) in FeatureDB and indexed to speed up queries by the TIL-Map editor to retrieve and display subsets of patches. After classification results for a set of WSIs have been loaded to the database, a pathologist can use a web browser to view and update the classification results. The pathologist may implement the TIL-Map editor to examine an image, query FeatureDB to retrieve patches visible within the view point and zoom level and display them as a two-color heatmap. The pathologist can edit the heatmap using the "Lymphocyte Sensitivity," "Necrosis Specificity," "Smoothness" sliders in a panel 255 (for example, as shown in FIGS. 7E-7F). These slides 255 permit the pathologist to change the threshold value which determines if a patch should be classified as lymphocyte-infiltrated or not.

In addition, for even finer-grain editing of individual patches or sets of patches, the pathologist can use the "Markup Edit" function to markup specific patches and label them as lymphocyte-infiltrated or not-lymphocyte-infiltrated. The pathologist can then save the updated patch labels to the database. The updated patch labels are used to retrain the CNN. Changes to the heatmap are only visible to the user him/herself: however, multiple users can work independently selecting lymphocyte sensitivity and making finer-grain editing in the same slide without knowing each other's editing choices, in certain embodiments.

In an example implementation, a team of three pathologists refined 10 to 20 WSIs in each cancer type using the TIL-Map editor. Each image was assigned to two pathologists. Each pathologist separately adjusted the "Lymphocyte Sensitivity," "Necrosis Specificity," "Smoothness" thresholds and manually edited regions in the images using the "Markup Edit" tool in order to generate an accurate patch-level classification in the entire image. Depending on the pathologists' consensus, if re-training was needed, the pathologists collaboratively generated a consensus lymphocyte heatmap for each image. Data from these consensus heatmaps was input back into the lymphocyte CNN in a training step to further improve its performance.

An inference module is also loaded in step 509, which is discussed in greater detail hereinbelow. Data is converted to TIL maps in step 510 and loaded into Feature DB in step 511. Such Feature DB tool or other relevant tool is used for managing image labels, patches, and TIL Maps. The relevant diagnostic statistics are then computed in step 512 on generated TIL Maps.

It is noted that for a given a set of new whole slide images, possibly from a new cancer type, implemented by the example embodiment shown in FIG. 3C is the lym-CNN and necrosis-CNN to first assign prediction values for each patch (100×100 pixels in 20×) in about 20 representative whole slide images. Additionally, computed are color variance for each patch to eliminate white, non-tissue background. Next the heatmaps are uploaded onto caMicroscope. Pathologists exam the heatmap predictions, and can then decide whether to further refine the threshold values in accordance with the workflow 550 of FIG. 3D.

By adjusting the lymphocyte sensitivity and necrosis specificity, the system is able to generate targeted and more refined TIL maps in step 510. In step 509 the system runs an inference module phase to produce binary TIL maps for all slides. IN certain embodiments, the system needs to first collect additional training data for a particular cancer type, to retrain 502 the CNNs before it can proceed to the inference stage 509. Otherwise, the system may be unable to generate targeted and refined TIL maps, simply by adjusting the lymphocyte sensitivity and necrosis specificity values. Hence, the system may proceed to a retraining phase 502 in order to retrain the CNN for this cancer type, retrain the CNN(s), and then move forward to the inference phase 509.

Generally, the lym-CNN is requires further retraining and the necrosis-CNN is generally well-trained. Additional training data for the lym-CNN may be collected in different ways. When implementing analysis of the LUAD and BRCA, pathologists label all patches in about 10 whole slide images, by correcting thresholded heatmaps. Then the system randomly sampled patches. Some of the training retraining patches were collected via a patch-label website. One pathologist may process approximately 20 slides, and circle a representative region for each slide, overloading the "tumor" marker.

Pathologists may collectively label all patches in each region. However, an even more targeted approach by the system is to threshold the TIL heatmap on caMicroscope, and only correct miss-predicted patches, in an alternative embodiment.

Hence, after extracting patches in each region, with labels, for retraining, i.e. extracting the retraining patches, the system retrains the lym-CNN with all available patches—including existing patches and patches extracted for training. The lym-CNN is initialized from the CAE again, instead of from the existing, trained lym-CNN. An alternative embodiment, is to use the existing, trained lym-CNN, and continue training it. Another alternative embodiment, trains the lym-CNN on all available patches, instead of just on retraining patches. The system may also implement retraining patches only, in yet another alternate embodiment. Training on the set of retraining patches yields better results, but, using an abundant amount of retraining patches (approximately more than 5K patches).

In avoidance of training a lym-CNN is to predict the previous lym-CNN's errors, instead of training all lymphocyte infiltrated regions, the system is designed to implement retraining or alternatively, retraining patches should reflect unbiased distribution of real data. Ideally, the cancer type being targeted, has unbiased distribution and generates the proper data which was used for training. Patches from other cancer types are biased to some extent. However, to save labor on manual labeling, the system utilizes existing training patches from other cancer types too—the bias is not significant, since lymphocytes look very similar across cancer types. In an example implementation, the system used around 30K LUAD patches (15% patches are positive), and resulted with approximately 50K patches (22% patches are positive) from 6 different cancer types.

The necrosis-CNN is relatively robust and does not need retraining. Generally, the necrosis-CNN requires training once. In this case, pathologist(s) circled necrotic and non-necrotic regions, overloading the "tumor" and "non-tumor" markers respectively. Then the system extracted retraining patches, combined with existing training patches, and retrained the necrosis-CNN.

Referring back to step 509 of FIG. 3C, the inference stage takes the lym-CNN and necrosis-CNN, whole slide images, and generates binary (thresholded) TIL maps.

In accordance with an embodiment, referring to FIG. 3C, the TIL Map analysis system engine and/or processor determines lymphocyte selection thresholds. IN an example implementation, the trained lymphocyte and necrosis CNNs were applied to 5455 diagnostic slides available for the 13 TCGA tumor types in the evaluation. Next, selection thresholds were determined by the system based on overall probability estimates for each slide to correct for possible slide-specific bias, in which the CNN was seen to systematically over-predict or under-predict lymphocytes depending on the overall characteristics of the whole slide. The process of determining the lymphocyte selection thresholds is shown in FIG. 1C and an alternative embodiment, in FIG. 3C.

The first step is to classify each slide into categories that reflect whether there is systematic over or under prediction of lymphocytes. In order to accomplish this classification step, the system enters lymphocyte prediction scores between 0.0 to 1.0 in step 551. Next, for each slide, ten patches were sampled from 10 ranges of the lymphocyte CNN's scores and divides the ranges into 10 bins (0.10-0.20, 0.20-0.25, 0.25-0.30, 0.30-0.40, 0.40-0.50, 0.60-0.70, 0.70-0.80, 0.80-0.90, 0.90-1.00), as shown in step 2 (552) of FIG. 3D. A number of pathologists (for example, three pathologists) label the patches as lymphocyte infiltrated or not in step 554. In an alternative embodiment, the system samples 10 patches from each slide image, one patch per bin in step 553. Based on the number of labeled lymphocyte/non-lymphocyte patches, each slide was categorized into 1 of 7 groups: Groups A-G, based corresponding to 0, 1, 2, 3-7, 8, 9, and 10 positive patches respectively, in step 555 (alternatively, Group slide images into 7 groups (A-G) based on the number of TIL-positive patches for each image. A=0, B=1, C=2, D=3-7, E=8, F=9, and G=10 TIL positive patches in step 555).

The next step is to select a threshold in each group. In each group, the system randomly selects 8 slides from each group (A-G) in step 556 and adjusts thresholds for each of them using a visual TIL-Map editor tool. The threshold of all slides in one group was set to be the average threshold selected for the eight slides sampled in that group. Note that if the system categorizes the slides into a greater number of groups, then the system selects thresholds for more slides, since per group, a meaningful averaged threshold requires a minimum number of selected thresholds. On the other hand, if the system categorizes the slides into fewer groups, the intra-group variance of possible slide-specific biases might be too large. Therefore, in the example implementation, the system selects seven as the number of groups, striking a balance between efficiency and effectiveness. Hence, in step 557, the system adjusts the TIL thresholds of each slide. In step 558, the system computes the TIL threshold for each group (A-G) as the average of the thresholds of the selected images in each group.

Subsequent to processing as described in the example implementation of FIG. 3D above, incomplete TIL maps or those with failed predictions were removed, and for LUAD additional review and analysis was performed by the system editor to remove TIL maps derived from poor slides, such as those that were out-of-focus or only partially visible. This resulted in 5202 TIL maps (referring to for example, FIG. 1E and TABLE 3) for further analysis and distribution. For a number of TCGA cases, multiple diagnostics slides are available, distinguished by TCGA slide ID barcode suffixes DX1, DX2, . . . , DX13. All cases have a DX1 diagnostic slide; hence these slides and corresponding TIL maps were used in subsequent correlative analyses. The 5202 slide-derived TIL maps correspond to 4759 TCGA participants and slide IDs with suffix DX1

It is noted that in certain embodiments, an expert pathologist will mark-up representative regions for each region. Representative regions include different types of tissue, observed textures, lymphocyte infiltration patterns, and areas with no-TILs. The TIL training tool segments each marked-up region into set of smaller image patches. These patches are labeled to identify the predominant histopathological finding located in that patch. The patches and the associated labels are loaded into FeatureDB for example, or other tools for managing image labels, patches, and TIL Maps.

The encoding Layer (as defined in TABLE 5 herein below) takes an input patch (1st image in sequence above) and compresses it into vectors for nuclei and background (visualized in 2nd image). The Decoding Layer (TABLE 6 defined herein below) processes these vectors and reconstructs the foreground (3rd image 138 in seq. FIG. 4A) and the background (4th image 139 in seq.) and then combines the two to recreate the input patch (5th image 140 in seq.). The accuracy of the reconstructed patch determines the effectiveness of the CAE in encoding objects.

| Part | Layer | Kernel size | Stride | Output size |
|---|---|---|---|---|
| 1 | Input | — | — | $100^2 \times 3$ |
|  | Convolution | 5 × 5 | 1 | $100^2 \times 100$ |
|  | Convolution | 5 × 5 | 1 | $100^2 \times 120$ |
|  | Average Pooling | 2 × 2 | 2 | $50^2 \times 120$ |
|  | Convolution | 3 × 3 | 1 | $50^2 \times 240$ |
|  | Convolution | 3 × 3 | 1 | $50^2 \times 320$ |
|  | Average Pooling | 2 × 2 | 2 | $25^2 \times 320$ |
|  | Convolution | 3 × 3 | 1 | $25^2 \times 640$ |
|  | Convolution | 3 × 3 | 1 | $25^2 \times 1024$ |
| 2 | Convolution | 1 × 1 | 1 | $25^2 \times 100$ |
|  | Convolution | 1 × 1 | 1 | $25^2 \times 1$ |
| 3 | Convolution | 1 × 1 | 1 | $25^2 \times 640$ |
|  | Convolution | 1 × 1 | 1 | $25^2 \times 100$ |
| 4 | Convolution | 1 × 1 | 1 | $25^2 \times 128$ |
|  | Average Pooling | 5 × 5 | 5 | $5^2 \times 128$ |
|  | Convolution | 3 × 3 | 1 | $5^2 \times 64$ |
|  | Convolution | 1 × 1 | 1 | $5^2 \times 5$ |
| 5 | Thresholding | Defined by Eq. (6) |  | $25^2 \times 1$ |
| 6 | Element-wise multiplication | Defined by Eq. (5) |  | $25^2 \times 100$ |

It is noted that when referring to TABLE 5, related FIG. 2B also provides the overall network architecture that implements such encoding of layers. The Batch normalization is applied before the leaky ReLU activation function in all respective layers.

An exemplary flow of the encoding, decoding and reconstruction of image patches (also as shown in FIGS. 2B and 4A) is defined as follows:

Input_patch→(encoding layer: TABLE 5)→Encoding Vectors For Nuclei and Background→(decoding layers: TABLE 6)→Reconstructed_patch TABLE 6 hereinbelow provides the decoding layers in an example CAE.

TABLE 6

| Part | Layer | Kernel size | Stride | Output size |
|---|---|---|---|---|
| 7 | Deconvolution | 3 × 3 | 1 | $25^2 \times 1024$ |
|  | Deconvolution | 3 × 3 | 1 | $25^2 \times 640$ |
|  | Deconvolution | 4 × 4 | 0.5 | $50^2 \times 640$ |
|  | Deconvolution | 3 × 3 | 1 | $50^2 \times 320$ |
|  | Deconvolution | 3 × 3 | 1 | $50^2 \times 320$ |
|  | Deconvolution | 4 × 4 | 0.5 | $100^2 \times 320$ |
|  | Deconvolution | 5 × 5 | 1 | $100^2 \times 120$ |
|  | Deconvolution | 5 × 5 | 1 | $100^2 \times 100$ |
|  | Deconvolution | 1 × 1 | 1 | $100^2 \times 3$ |
| 8 | Deconvolution | 3 × 3 | 1 | $5^2 \times 256$ |
|  | Deconvolution | 3 × 3 | 1 | $5^2 \times 128$ |
|  | Deconvolution | 9 × 9 | 0.2 | $25^2 \times 128$ |
|  | Deconvolution | 3 × 3 | 1 | $25^2 \times 128$ |
|  | Deconvolution | 3 × 3 | 1 | $25^2 \times 128$ |
|  | Deconvolution | 4 × 4 | 0.5 | $50^2 \times 128$ |
|  | Deconvolution | 3 × 3 | 1 | $50^2 \times 64$ |
|  | Deconvolution | 3 × 3 | 1 | $50^2 \times 64$ |
|  | Deconvolution | 4 × 4 | 0.5 | $100^2 \times 64$ |
|  | Deconvolution | 5 × 5 | 1 | $100^2 \times 32$ |
|  | Deconvolution | 5 × 5 | 1 | $100^2 \times 32$ |
|  | Deconvolution | 1 × 1 | 1 | $100^2 \times 3$ |

In particular, TABLE 6 provides decoding layers but referring to FIG. 2B, the overall network architecture implemented is shown. A batch normalization is applied before the leaky ReLU activation function is applied, in all respective layers.

During training the lymphocyte CNN, the lymphocyte convolutional neural network (LYM-CNN) is initialized for training. Specifically, the lym-CNN is initialized from the CAE. In particular, the same architecture and trained weights are used in the encoding layers of the CAE, followed by added new layers with an architecture that can be trained to classify the input patch (instead of reconstructing the input patch) in an example embodiment. Those added new layers are initialized randomly. The lym-CNN takes input image patches (100×100 pixels at 20× magnification) and outputs one floating point number as probability of the input patch is lymphocyte infiltrated. A simple diagram defines the process below:

Input_patch→(encoding layers)→Encoding_vectors_for_ nuclei_and_background →(classification layers)→probability_of_lymphocyte_infiltration After initialization, the system trains the lym-CNN to minimize training error (in terms of binary cross-entropy) by comparing its output probability which ranges from 0.0~1.0, against the ground truth value of either 0 or 1. There are two training stages. Stage (1) corrects the weights of encoding layers and only trains the added classification layers which are initialized randomly. Stage (2) trains all layers of network jointly. The purpose of this two stage training scheme is that, after the lym-CNN is constructed, only part of it (the encoding layers) have been trained and part of it is randomly initialized. Thus, it is arguably better to just train those randomly initialized layers first before training all layers jointly. In an alternative embodiment, training all layers jointly, may be performed as well.

Necrosis convolutional neural network (necrosis-CNN) is also implemented during training. The lym-CNN operates at 100×100 pixels and a 20× magnification. At this size and magnification there is not enough contextual information for distinguishing neutrophils vs. lymphocytes. Therefore a second CNN is used that helps identify regions of necrosis. This CNN operates at a lower magnification (more zoomed out) than 20× (10×, 6.6×, 5× . . . ), because at these resolutions there is more contextual information which helps discriminate between lymphocytes and neutrophils. The necrosis-CNN is generally required to generate eventually reasonable TIL maps. The necrosis-CNN is usually robust enough for its task. In most cases, the system does not need to retrain or change it. In some ways it's like the CAE. It is trained once and can be re-used repeatedly without any re-training or refinement.

Because recognizing a region of 50×50 square microns require contextual information in a larger region, this implementation is modeled as a segmentation problem with larger input patches at a relatively lower resolution: 500×500 square micron patches are extracted from the image and downsampled 3 times. The resulting patch is 333×333 pixels at 6.67× magnification. The necrosis segmentation CNN outputs pixel-wise segmentation results. This can be implemented using DeconvNet (Noh et al., 2015) because it is designed to predict pixel-wise class labels and handle structures and objects at multiple scales (which is more suitable for segmentation than patch-level classification) and it has been shown to achieve high prediction accuracy with several benchmark image datasets. DeconvNet is trained to classify each pixel as inside or outside a necrosis region. The output of the necrosis segmentation CNN is resized to match the output resolution of the lymphocyte CNN. If over half of a 50×50 patch intersects with a necrotic region, the patch is classified as non-lymphocyte-infiltrated.

Referring to FIG. 4A, shown are microphotographs of image patches from randomly selected examples 135 of unsupervised nucleus detection 137 and foreground 138, background image representation 139 and reconstruction results 140 of using crosswise sparse CAEs, in accordance with an embodiment of the disclosed system and method. The detection map 83 of FIG. 2B is shown in second row 137. The reconstructed image (bottom row 140) is the pixel-wise summation of the reconstructed foreground and background images. An example implementation of the CAE can decompose input images 136 to foreground 138 and background 139, and further detect 137 and represent (reconstruct) nuclei 76 in the foreground 138 as reconstructed images 140.

The CNNs are initialized with crosswise sparse CAEs. In certain embodiments or aspects, the results are empirically evaluated, on four datasets: a self-collected lymphocyte-rich region classification dataset, a self-collected individual lymphocyte classification dataset, the nuclear shape and attribute classification dataset, and the MICCAI 2015 nucleus segmentation challenge dataset. The results show that the proposed method achieves better results than other known methods.

The dataset for unsupervised learning was collected as 0.5 million unlabeled small images randomly cropped from 400 lung adenocarcinoma histopathology images obtained from the public TCGA repository. The cropped images are 100× 100 pixels in 20× (0.5 microns per pixel). Cropped images are generally referred to as images in this description. The dataset for Lymphocyte Classification Experiments is shown and described with respect to FIG. 6A hereinbelow.

Figure 4B:
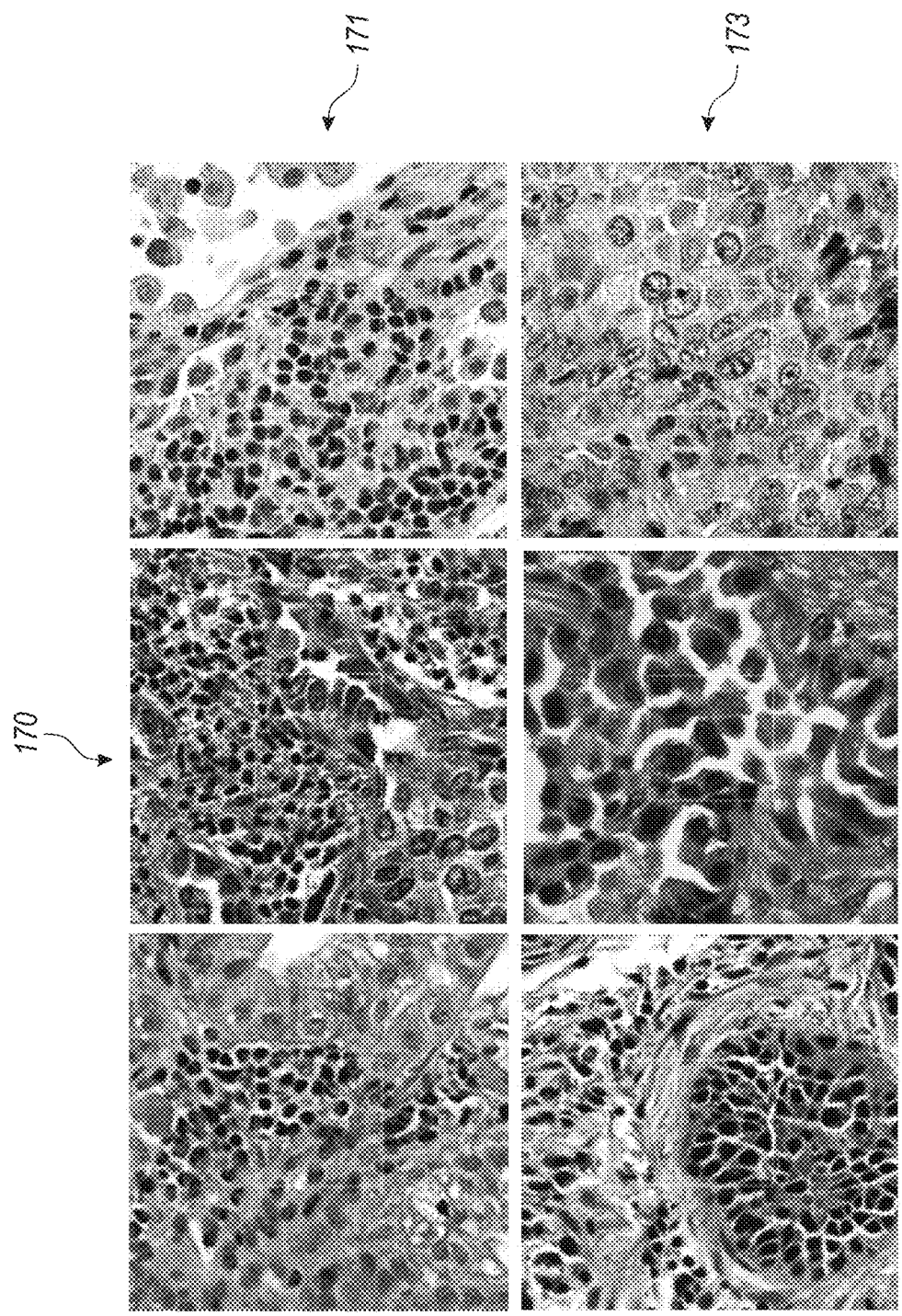
FIG. 4B shows microphotographs of sample image patches associated with lymphocyte rich region datasets, in accordance with an embodiment of the disclosed system and method.

Referring to FIG. 4B, shown are microphotographs of image patches associated with a lymphocyte rich region dataset. The top row shows lymphocyte rich images 171. The bottom row shows non-lymphocyte-rich images 173. In the example set, a pathologist labeled 23,356 images depending on the percentage of lymphocytes in the center 100×100 pixels of the image (for example, framed in green). The peripheral pixels provide context information to the pathologist and automatic classification models.

Lymphocytes and plasma cells are types of white blood cells in the immune system. Automatic recognition of lymphocytes and plasma cells is very important in many situations including the study of cancer immunotherapy. In an exemplary implementation, shown in FIG. 4B, a dataset of 23,356 images labeled as lymphocyte (including plasma cells) rich or not lymphocyte rich, were collected. These images were cropped from lung adenocarcinoma tissue images in the publicly available TCGA dataset. Each image is 300×300 pixels in 20× (0.5 microns per pixel). In the exemplary embodiment, a pathologist labeled these images, according to the percentage of lymphocytes in the center 100×100 pixels of the image. The peripheral pixels provide context information to the pathologist and to automatic classification models. Overall, around 6% of the images are labeled as lymphocyte rich. Examples of the training set are shown in FIG. 4B.

Another example dataset for classifying individual lymphocytes involved collecting a dataset of 1785 images of individual objects that were labeled lymphocyte or non-lymphocyte by a pathologist. These 1785 images were cropped from 12 representative lung adenocarcinoma whole slide tissue images from the TCGA repository. Then labeled images were used and cropped from 10 whole slide tissue images as the training data and the remaining used as the test dataset.

Yet another example dataset for Nuclear Shape and Attribute Classification involved applying the method on an existing dataset for nuclear shape and attribute classification. The dataset consists of 2000 images of nuclei labeled with fifteen morphology attributes and shapes.

Yet another example dataset for Nucleus Segmentation involved testing the method for nucleus segmentation using the MICCAI 2015 nucleus segmentation challenge dataset which contains 15 training images and 18 testing images with a typical resolution of 500×500. The ground truth masks of nuclei are provided in the training dataset.

Figure 5:
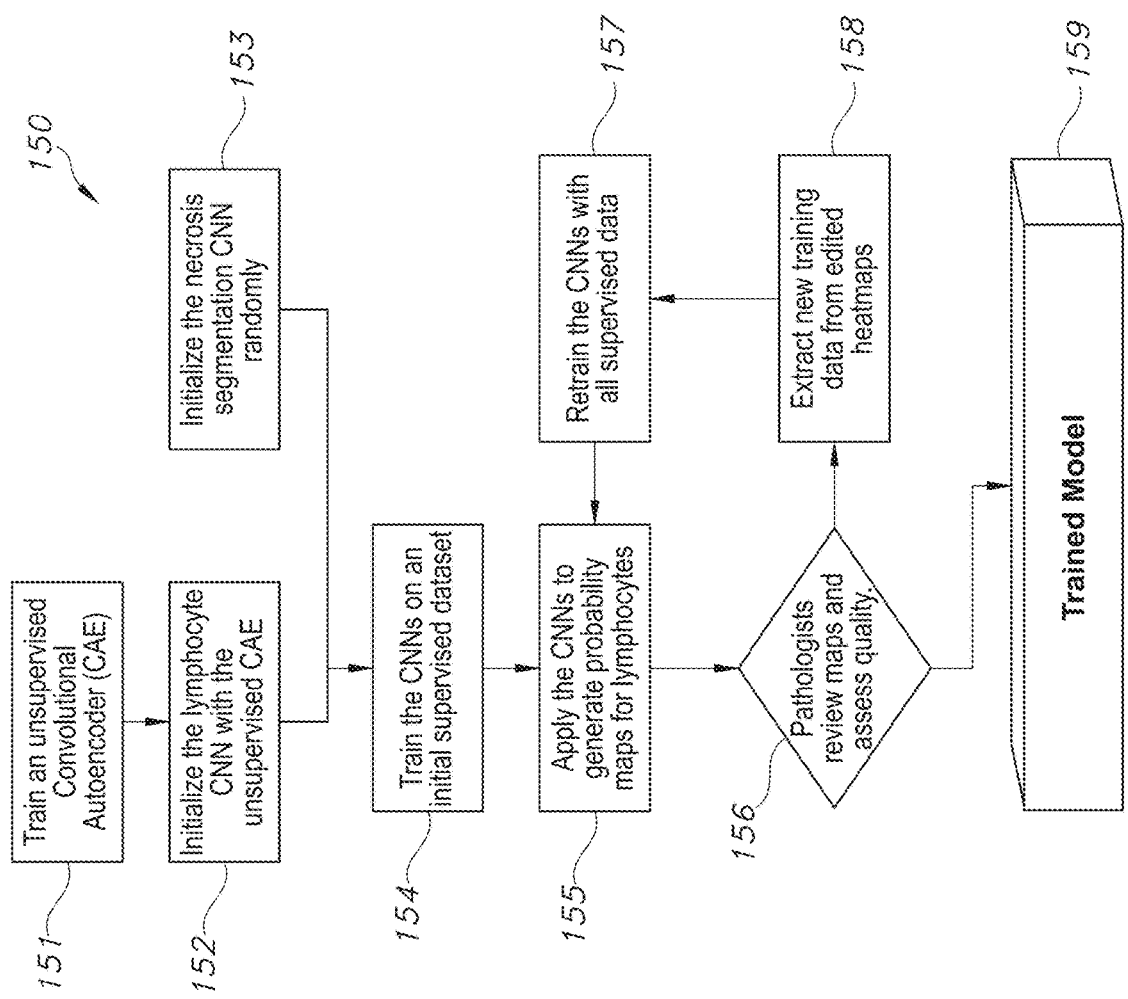
FIG. 5 illustrates a flowchart providing the training of a CNN based algorithm for generating a tumor infiltrating lymphocyte map, in accordance with an embodiment of the disclosed system and method.

FIG. 5 illustrates a flowchart providing the training of a CNN based algorithm for generating tumor infiltrating lymphocyte map, in accordance with an embodiment of the disclosed system and method. The workflow involves an iterative process in which CNN predictions are reviewed, refined, and corrected, if necessary, further by expert pathologists. Manual corrections and refinements are then used to retrain the CNN models in order to improve their performance. In alternative embodiments, such refinements are part of the training models and already automated by prior training and human feedback.

An exemplary iterative workflow 150 for model training and targeted data labeling is shown in FIG. 5. The iterative workflow 150 as illustrated in FIG. 5, is implemented to train respective CNN models. First, an unsupervised image analysis of WSIs is executed to initialize a CNN model. During step 151, the system trains an unsupervised convolutional autoencoder (CAE) (for example, as described hereinabove in exemplary embodiments of FIGS. 2A-2C). An algorithm (CNN) is first trained on image patches in step 151. The system initializes the lymphocyte CNN with the unsupervised CAE in step 152 and may further initialize the necrosis segmentation CNN randomly in step 153. The system next trains the CNNS on an initial supervised dataset in step 154. The system next applies the CNNs to generate probability heat maps 103, for lymphocyte regions (for example, as shown in FIG. 3A, 6C or 7B). This CNN model is further refined in an iterative process in which CNN predictions are reviewed, corrected, and refined by expert pathologists in step 156, in certain embodiments. In alternate embodiments, an expert system that is already trained by human pathologist review, correction and refinement is implemented in step 156 with a fully automated and trained module for refinement in place. The corrected and/or further refined heat maps are used to generate new predictions. The CNN model is re-trained with the updated data in order to improve its classification performance during step 158 and 157. The system extracts new training data for the edited heatmaps 148 and uses that data to retain the CNNs with all supervised data in step 157. Such retrained CNN is now applied to generate further refined probability maps for lymphocytes in step 155. Once the training model is perfected the system ends the refinements phase in step 156 and proceeds to generate and store the trained model in step 159.

Parameter optimization sub-processes may also occur in certain embodiments using for example, 6 patches chosen from each image by implementation of a stratified sampling method. Comparison with molecular data to carefully check highly discrepant molecular/image results may also occur in certain embodiments.

After the training phase, the CNN model is applied to patches in the test set. For each test patch, the lymphocyte CNN produces a probability of the patch being a lymphocyte-infiltrated patch. The label of the patch is decided by thresholding techniques. If the probability value is above a pre-defined threshold, the patch is classified as lymphocyte-infiltrated. If the probability value is below a pre-defined threshold value, the patch is classified as not lymphocyte-infiltrated.

Training a fully supervised CNN requires a large number of training instances with ground truth labels. Prior art methods have shown that utilizing unlabeled instances can boost the performance of a CNN. Drawing from those findings, the novel system and method first trains an unsupervised Convolutional Auto-Encoder (CAE) in step 151 to learn the representation of nuclei and lymphocytes in histopathology images and initialize the lymphocyte CNN in step 152. In this way, the initial lymphocyte CNN model captures the appearance of histopathology images without supervised training. Next, the system initializes the weights of the necrosis segmentation CNN randomly in step 153, for example, following the DeconvNet approach. Next, the system trains the CNNs with labeled images in step 154.

In order to implement the review and refinement phase of CNN Prediction Results, the system can implement a Web-based application, referred to here as a TIL-map editing tool, to support the review and refinement by the pathologists of the tumor-infiltrating lymphocyte (TIL) patch predictions and the segmentation of necrotic regions in step 156. This application may be implemented in certain embodiments, using the QuIP infrastructure. QuIP is an open-source software system which consists of a suite of integrated services and web-based user interfaces and applications designed for the management and analysis of whole slide tissue images, indexing, and exploration of image features. Interactive web-based visualization of whole slide tissue images and analysis results (such as nuclear segmentations) in QuIP is enabled by caMicroscope.

The embodiment of FIG. 5, implements a Web-based application as an extension to the core caMicroscope user interface. The core user interface allows a user to view a whole slide tissue image and supports interactive panning of the image and zooming of the image regions of interest. It also can display an overlay on an image of image segmentation results as polygons. The interface is driven by the QuIP image tile service, which returns tiles of whole slide tissue images for visualization in response to a user's panning and zooming actions, and the QuIP FeatureDB database manages and indexes image metadata and analysis results in a document store database. The current implementation of FeatureDB uses MongoDB as the document store database. The TIL-map editing tool extends the core caMicroscope interface to enable the visualization of patch-level classification labels as a heatmap overlay on a WSI (for example as shown in FIG. 3A, 6C or 7B). The classification results are stored and indexed in FeatureDB. Each image patch (for example shown in FIG. 7C) in a WSI is represented as a rectangle and associated with a classification label and the probability value computed by the CNN (for example, shown in FIG. 7D, rectangles 231, 233, 237). This information is stored as a data element (document) in FeatureDB and indexed to speed up queries by the TIL-map editing tool to retrieve and display subsets of patches. After classification results for a set of WSIs have been loaded to the database, a pathologist can use a Web browser to view and update the classification results. The pathologist can choose the TIL-map editing tool from the caMicroscope interface, select an image, and pan and zoom to view image regions. The editing tool will query FeatureDB to retrieve patches visible within the view point and zoom level and display them as a two-color heatmapC. The pathologist can edit the heatmap using the "Lymphocyte Sensitivity," "Necrosis Specificity," and "Smoothness" sliders (255) in a pop-up panel for example as shown in element 255, FIG. 7D. These sliders 255 allow the pathologist to change the threshold value which determines if a patch should be classified as lymphocyte-infiltrated or not. In addition, for finer-grain editing of individual patches or sets of patches, the pathologist can use the "Markup Edit" function to mark up specific patches and label them as lymphocyte-infiltrated or not-lymphocyte-infiltrated. The pathologist can then save the updated patch labels to the database. The updated patch labels are used to retrain the CNN. Changes to the heatmap are only visible to the user him/herself: multiple users can work independently in selecting respective lymphocyte sensitivity and generating finer-grain editing in the same slide without knowing each other's editing choices.

In an example implementation, a team of three pathologists reviewed and refined 10 to 20 WSIs in each cancer type by using the TIL-map editing tool. Each image was assigned to two pathologists. Each pathologist separately adjusted the "Lymphocyte Sensitivity," "Necrosis Specificity," and "Smoothness" thresholds (for example, as shown in FIGS. 7D-7F) and manually edited regions (see example mark-up 249 as shown in FIG. 7G; see example mark-up 254 as shown in FIG. 7H) in the images using the "Markup Edit" tool in order to generate an accurate patch-level classification in the entire image. Depending on the pathologists consensus, if retraining was needed, the pathologists collaboratively generated a consensus lymphocyte heatmap for each image. Data from these consensus heatmaps was inputted back to the lymphocyte CNN in a training step to further improve its performance. In an alternative embodiment, such pathologist expert input can also be implemented in an automated module that is trained to provide automated feedback via a mark-up module that was trained by prior pathologist expert input, thus eliminating the necessity for human feedback during implementation of the trained and tested CNN that is generated during step 159 of example workflow 150 illustrated in FIG. 5.

Figure 5A:
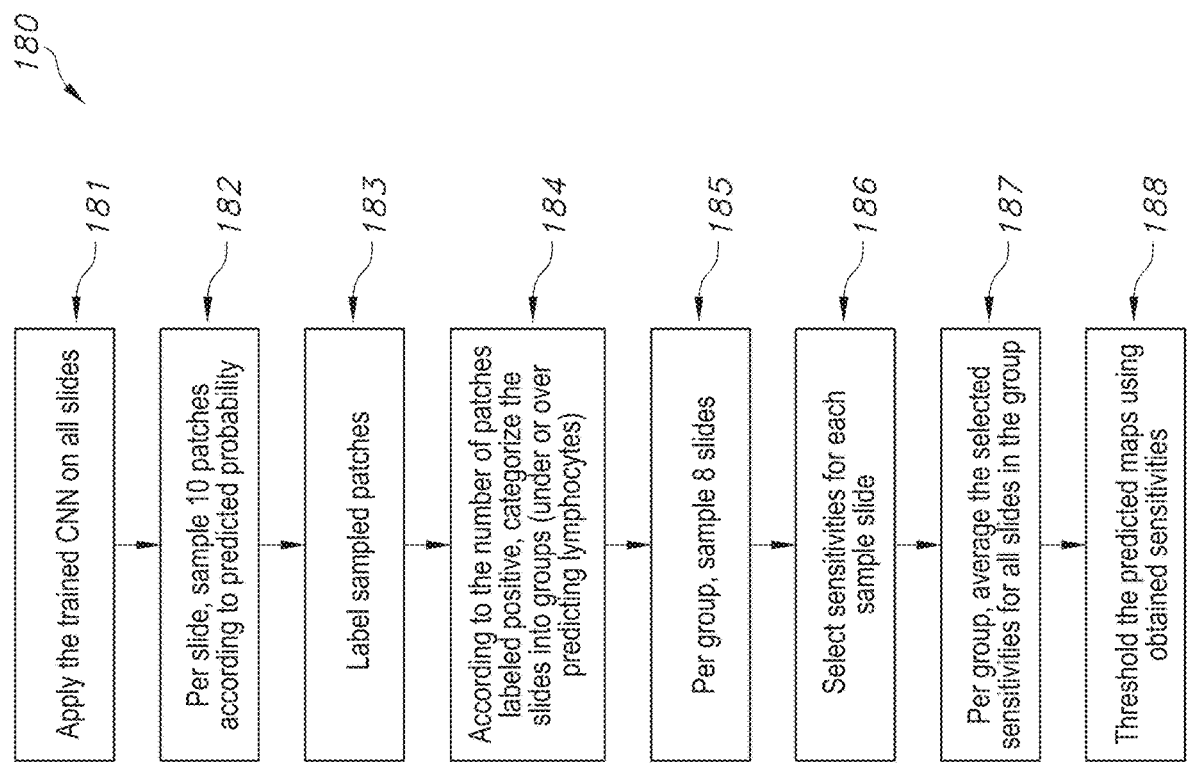
FIG. 5A illustrates an exemplary workflow for determination of lymphocyte selection thresholds, in accordance with an embodiment of the disclosed system and method.

Once the trained lymphocyte and necrosis CNNs are applied on all slides, the system next determines selection thresholds based on overall probability estimates for each slide to correct for possible slide-specific bias. FIG. 5A illustrates the determination lymphocyte selection thresholds during which the quality control system selects slides that have significantly over-predicted or under-predicted lymphocytes and adjusts the lymphocyte sensitivities and necrosis specificities for these slides.

Referring to FIG. 5A, the workflow 180 for determination of lymphocyte selection thresholds is illustrated, in accordance with an embodiment of the disclosed system and method. In particular, after applying the trained lymphocyte and necrosis CNNs on all slides in step 181, the system determines selection thresholds based on overall probability estimates for each slide to correct for possible slide-specific bias, in which the CNN was seen to systematically over-predict or under-predict lymphocytes depending on the overall characteristics of the whole slide. The first step is to classify each slide into categories that reflect whether there is systematic over- or under-prediction of lymphocytes. In order to achieve this step, for each slide, the system samples ten patches according to a predefined sampling strategy in step 182. Because the goal is to decide the threshold on the lymphocyte CNN's scores, the system samples one patch from 10 ranges of the lymphocyte CNN's scores (0.10-0.20, 0.20-0.25, 0.25-0.30, 0.30-0.40, 0.40-0.50, 0.60-0.70, 0.70-0.80, 0.80-0.90, 0.90-1.00) in the example embodiment. Three pathologists label the patches as lymphocyte infiltrated or not in step 183. In alternate embodiments, an expert pathologist module is pre-trained and can automate such labeling step 183 applying deep learning techniques that pre-train a specific labeling model.

Next, based on the number of labeled lymphocyte/non-lymphocyte patches, each slide is categorized into 1 of G predefined groups, based on how many patches out of the ten sampled patches are positive in step 184. In particular, the system categorizes the slides into groups (as under-predicting or over-predicting lymphocytes). In each group, the system randomly selects S slides and adjusts thresholds for each of them using for example, a visual editing tool. In certain embodiments the respective thresholds can be manually adjusted. In alternative embodiments the threshold adjustment step is automated using pre-trained learning models. In step 187 the threshold of all slides in one group was set to be the average threshold selected for the eight slides sampled in the sample group during step 185. If a larger G is selected, then the system adjusts selection thresholds for more slides, since per group, a meaningful averaged threshold requires a minimum number of selected thresholds, S. On the other hand, if a smaller G is selected, the intra-group variance of possible slide-specific biases might be too large. Therefore, in an exemplary implementation, selected pre-defined groups are G=7 and S=8. A slide belongs to one of the seven groups if there are 0,1,2,3-7,8,9, and 10 positive patches respectively, out of the ten sampled patches. Hence the sensitivities for each sample slides are selected in step 186. Per group, the average of the selected sensitivities for the entire set of slides in the group is set in step 187. The system thresholds the predicted maps using obtained sensitivity values during step 188. Referring to FIGS. 7D-7F, shown are microphotographs of generated probability TIL maps, with the respective lymphocyte sensitivity and necrosis specificity values adjusted according to specific threshold values. The rectangle polygons are drawn about lymphocyte rich regions of respective density levels with the darker regions 237, 251 of higher density and lighter shaded rectangle regions 233, 231, 250 of a lower density level, as shown in example microphotograph images in FIGS. 7D, and 7H.

Figure 5B:
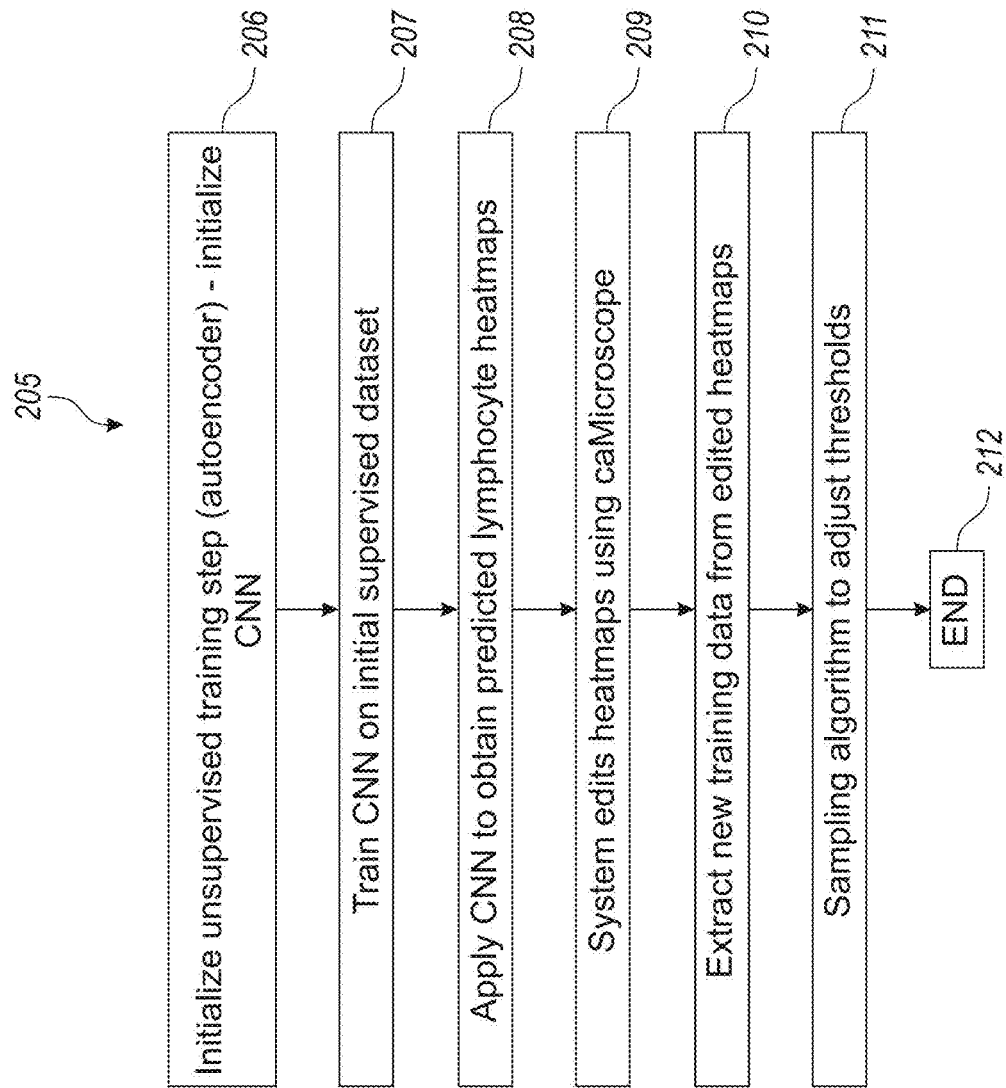
FIG. 5B illustrates an exemplary workflow for the application of sampling algorithm to adjust respective lymphocyte selection thresholds, in accordance with an embodiment of the disclosed system and method.

FIG. 5B illustrates an exemplary workflow 205 for the application of a sampling algorithm to adjust respective lymphocyte selection thresholds, in accordance with an embodiment of the disclosed system and method. Beginning with step 206, the system initializes the unsupervised training step using an unsupervised convolutional autoencoder (CAE) and initializes a CNN with the unsupervised CAE. The system trains the CNN on an initial supervised dataset in step 207. It next applies the CNN to obtain predicted lymphocyte heatmaps in step 208. The system edits the predicted lymphocyte heatmaps using for example caMicrosocope in step 209. The system next extracts new training data from such edited heatmaps in step 210. Finally, a sampling algorithm is applied in order to adjust the respective lymphocyte selection thresholds in step 211. During TIL map generation, a probability map for TILs is generated from each image. These probabilities are then reviewed and lymphocyte selection thresholds are established using a selective sampling strategy. These thresholds are then used to obtain the final TIL maps. The process ends at step 212.

Figure 6A:
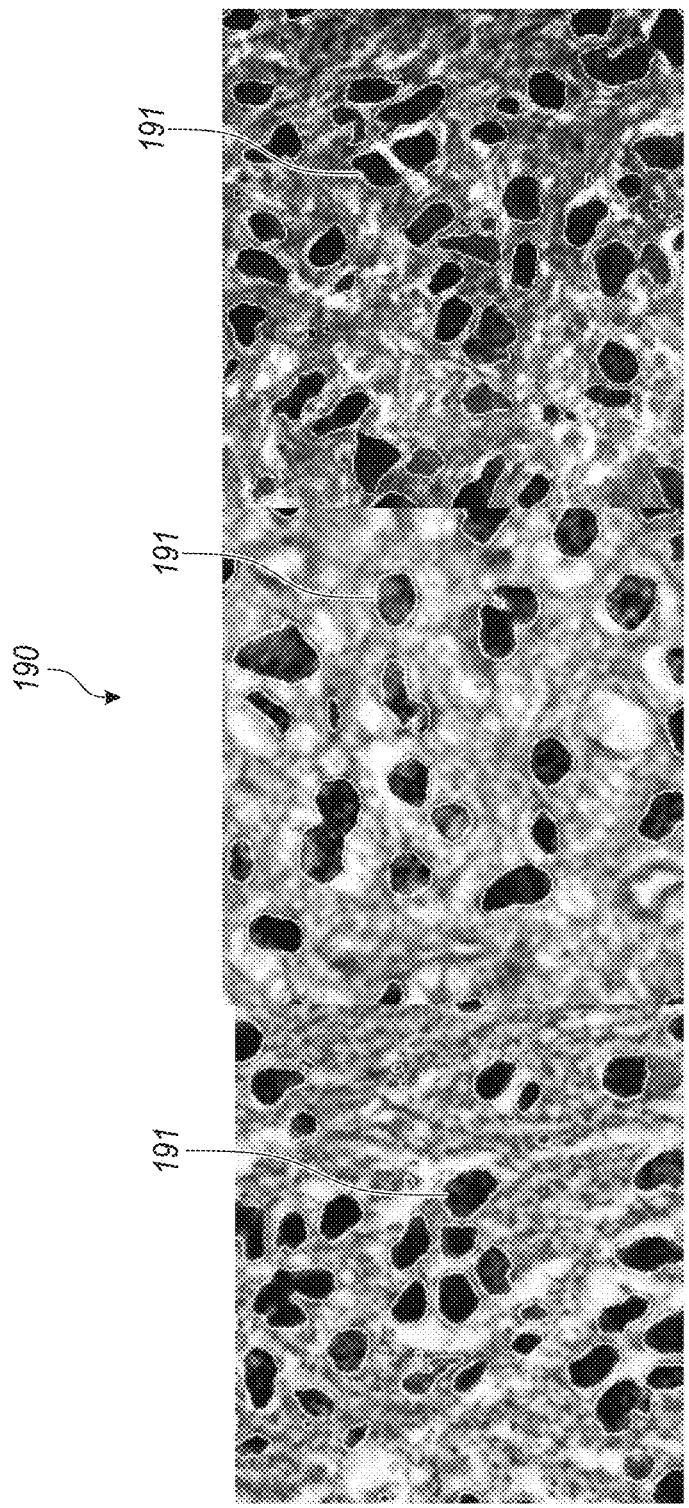
FIG. 6A are microphotographs of randomly selected examples of nucleus segmentation using a CSP-CNN, on a MICCAI 2015 nucleus segmentation challenge dataset, in accordance with an embodiment of the disclosed system and method.

FIG. 6A are microphotographs of randomly selected examples of nucleus segmentation using a CSP-CNN, on the MICCAI 2015 nucleus segmentation challenge dataset (with the color version is the best viewing if available). The segmentation boundaries of each of the segmented image patches 190 are displayed in (green) defined boundary areas 191.

Figure 6B:
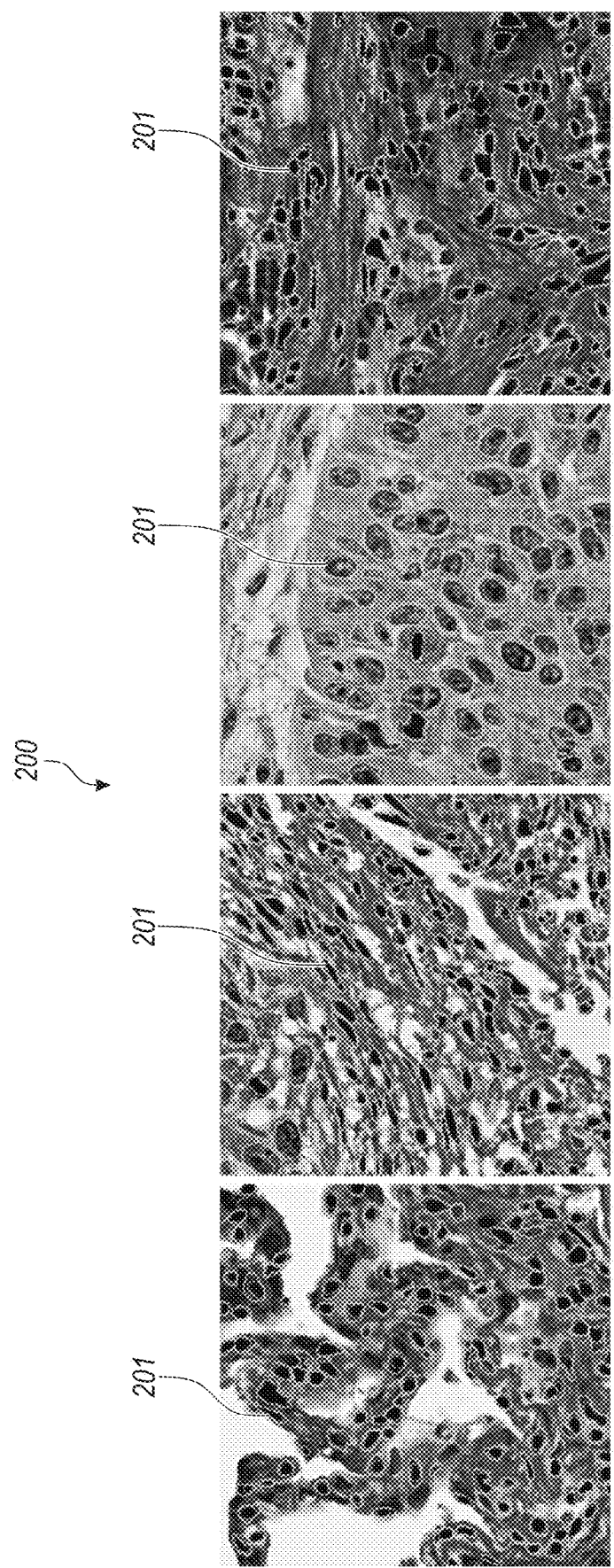
FIG. 6B are microphotographs of image patches associated with randomly selected examples of nuclear segmentation that have been robustly segmented, in accordance with an embodiment of the disclosed system and method.

FIG. 6B are microphotographs of image patches associated with randomly selected examples of nuclear segmentation that have been robustly segmented, in accordance with an embodiment of the disclosed system and method. A robust ensemble algorithm is implemented in accordance with an embodiment in order to robustly segment nuclei 201 across various tissue types. Optimized algorithm tuning method are also employed. Parameter optimization techniques are also implemented in order to optimize the quality of such segmentation of nuclei. Systematic quality control pipelines are implemented that encompass tissue image quality, human generated ground truths, and convolutional neural network critiques. These quality control pipelines ensure that good-segmentation of tissue samples occurs and eliminates under-segmented, over-segmented or bad-segmentation quality in tissue samples. This quality segmentation of nuclei in tissue samples is foundational to the pipeline processes implemented by embodiments of the disclosed system and method associated with accurately quantifying TIL information for useful prognosis and classification of tumor tissues.

FIG. 6C are exemplary TIL maps that are generated and further edited by pathologists or alternatively a trained expert system module that further refines the TIL maps based on selected threshold values (as also described hereinabove in connection with FIG. 3A). The original tissue sample is shown in sample tissue patch 218. The three TIL maps 215, 216, 217 shown in top panel, show non-lymphocyte regions in darker shaded areas 214 (blue in color versions). The lymphocyte rich regions are shown in areas 219 (red in color versions). In color figure version of the same TIL map representations 215, 216, 217, the red pixels 219 represent lymphocyte infiltrated patches and the blue pixels 214 indicate patches that are not infiltrated by lymphocytes.

Figure 7A:
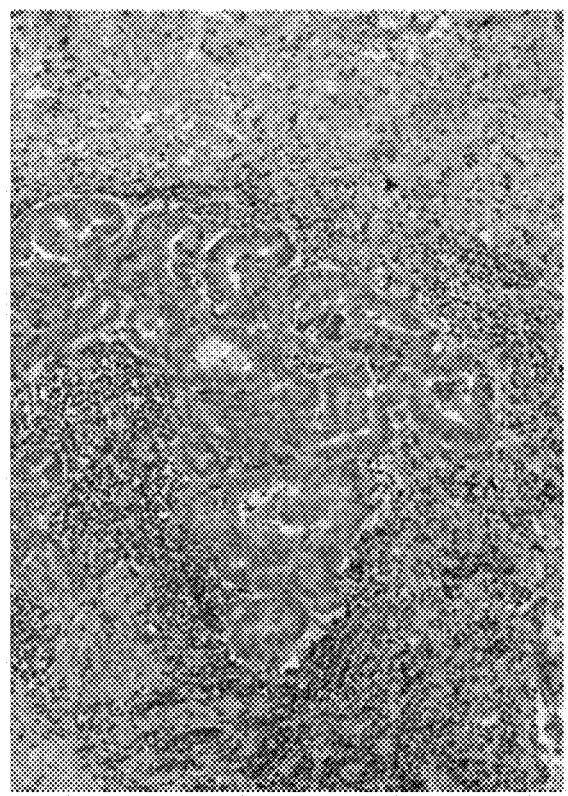
FIG. 7A provides a microphotograph of an initial tissue sample that is used to train a model in generating a lymphocyte classification heat map as shown in FIG. 7B, in accordance with an embodiment of the disclosed system and method.
Figure 7C:
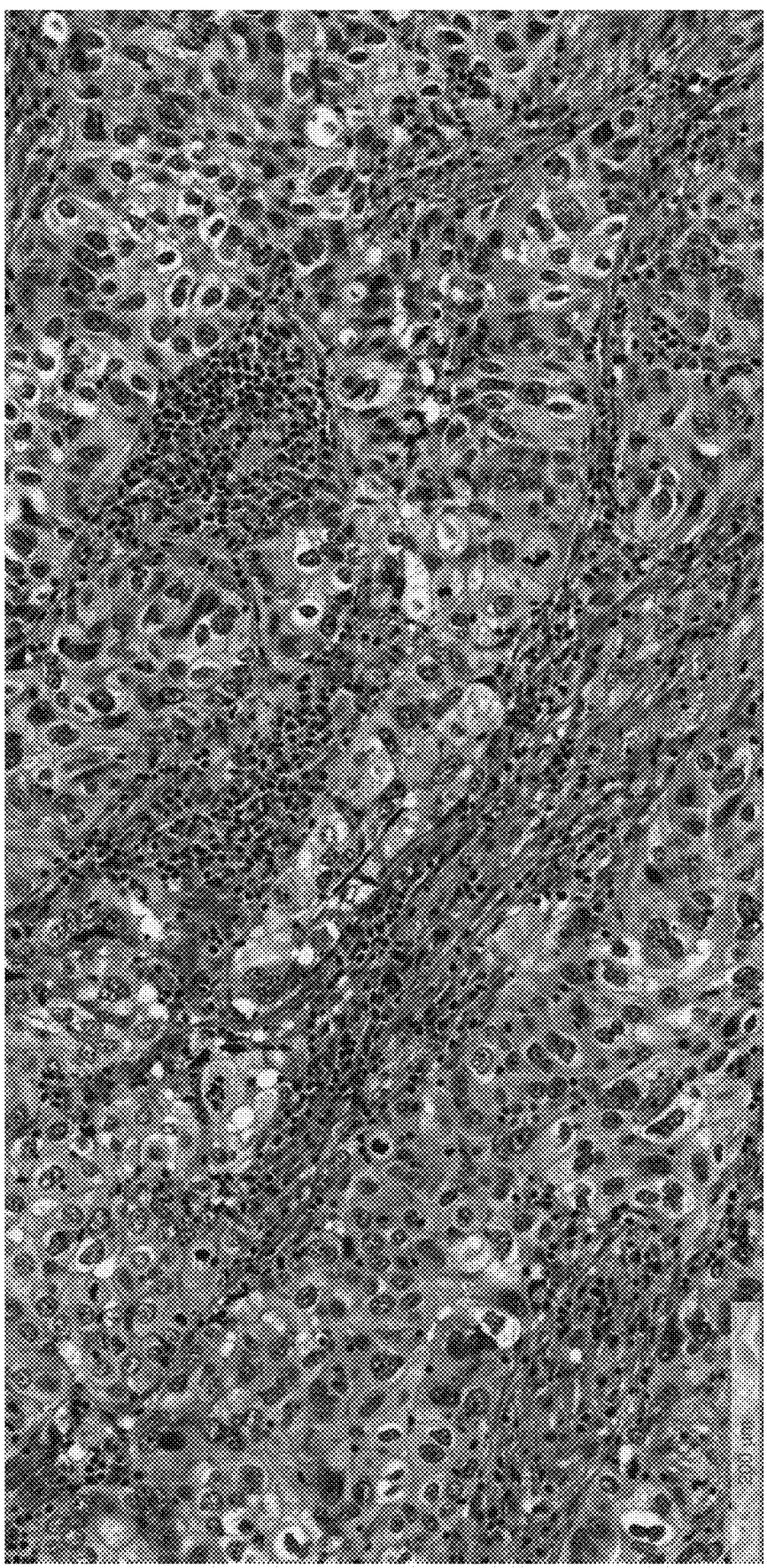
FIG. 7C provides a microphotograph of an image tissue patch, in accordance with an embodiment of the disclosed system and method.
Figure 7D:
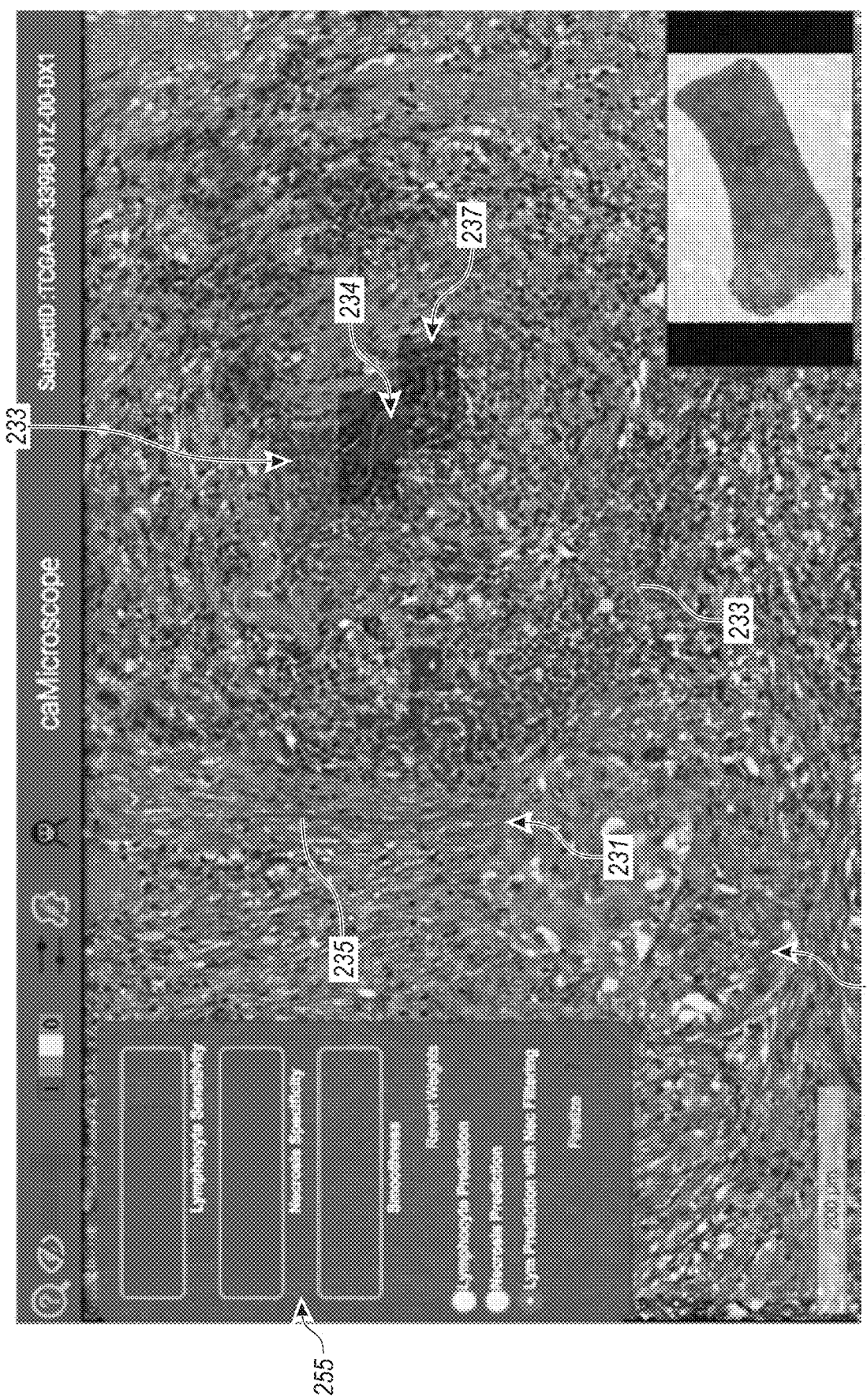
FIGS. 7D-7H show microphotographs of representative heat maps that are generated after training the CNNs on an initial supervised dataset, applying the CNNs to generate respective probability maps for respective density levels of lymphocytes on tissue sample regions, with any further refinement and adjustments to respective threshold values, in accordance with an embodiment of the disclosed system and method.
Figure 7E:
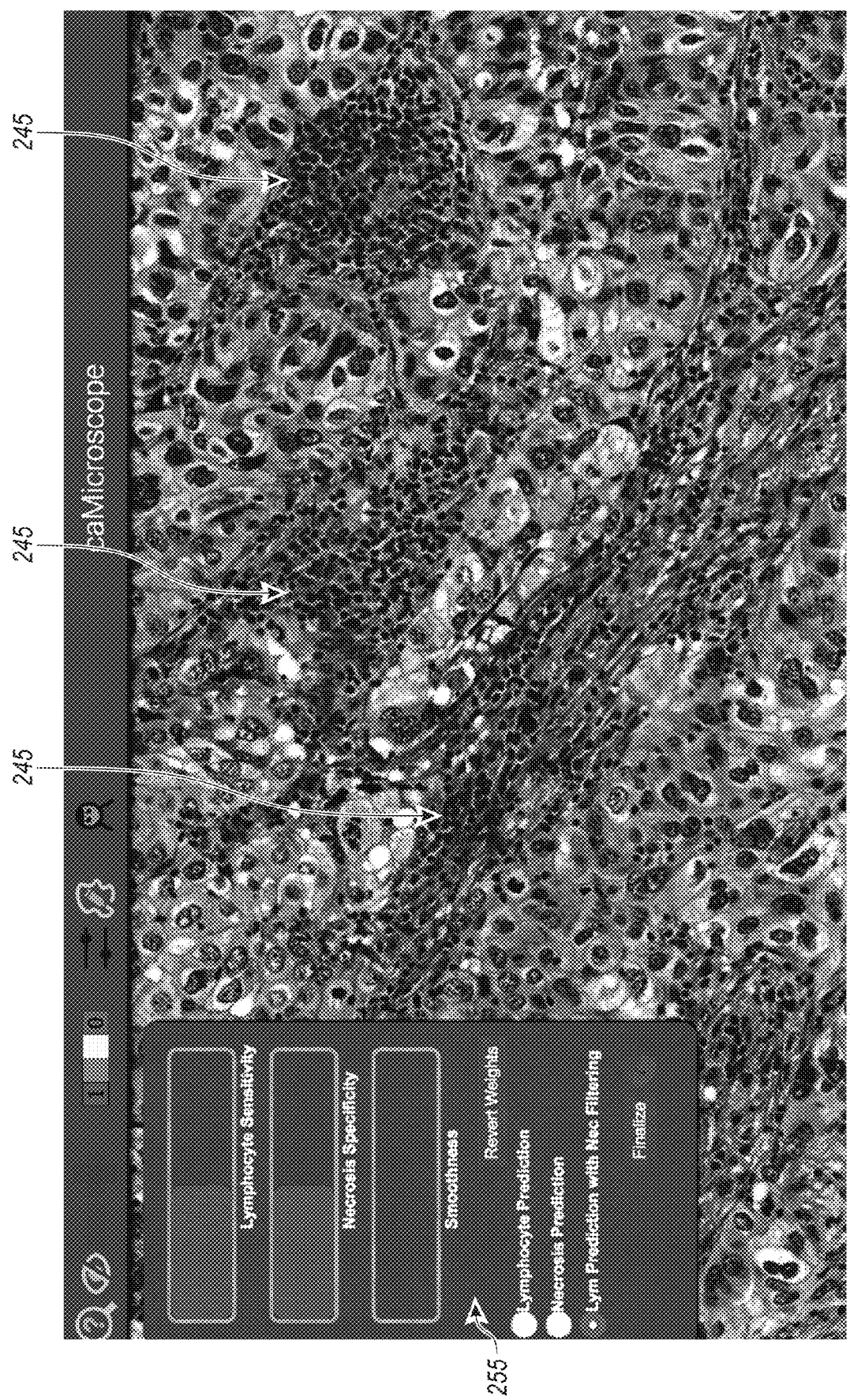
Figure 7F:
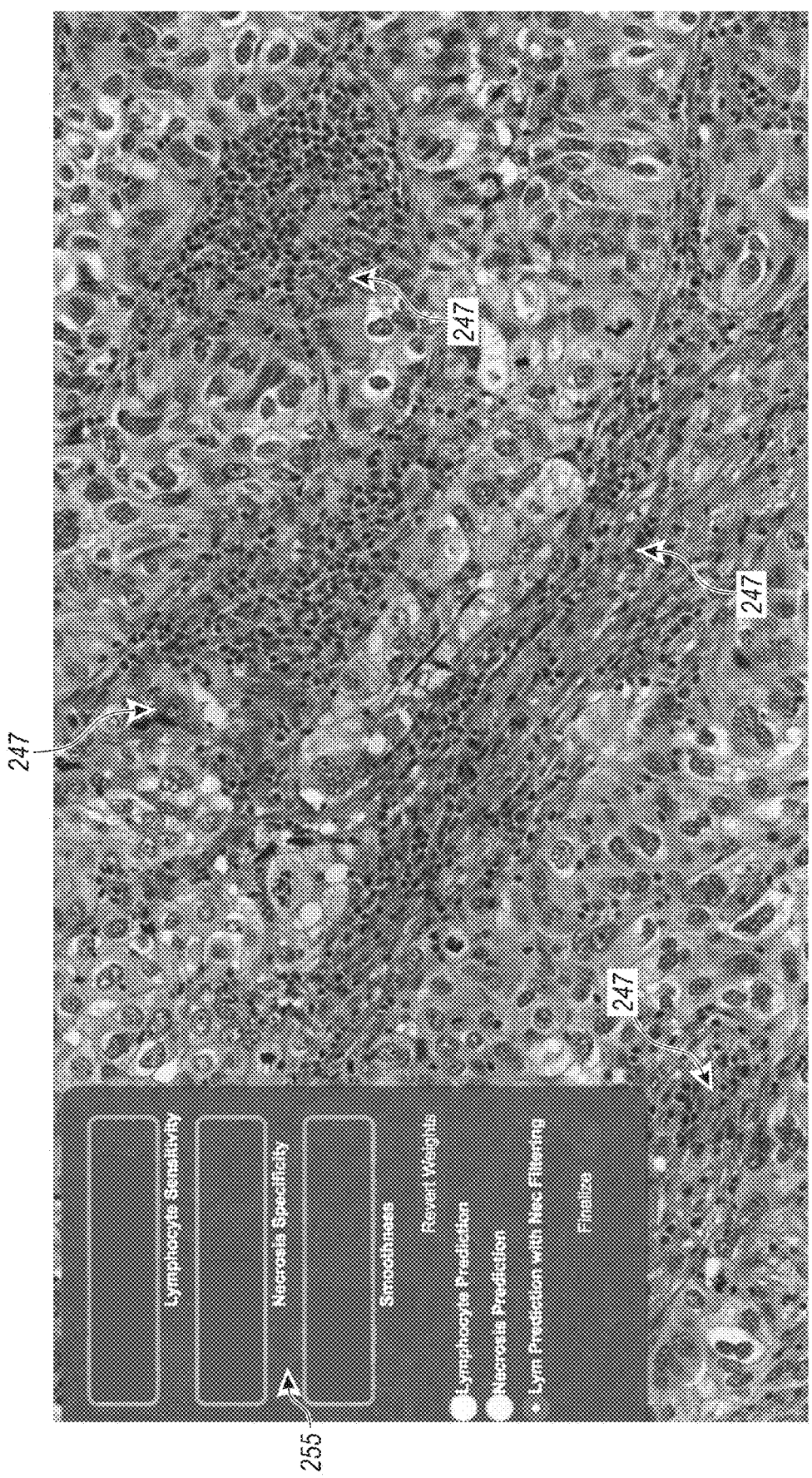
Figure 7G:
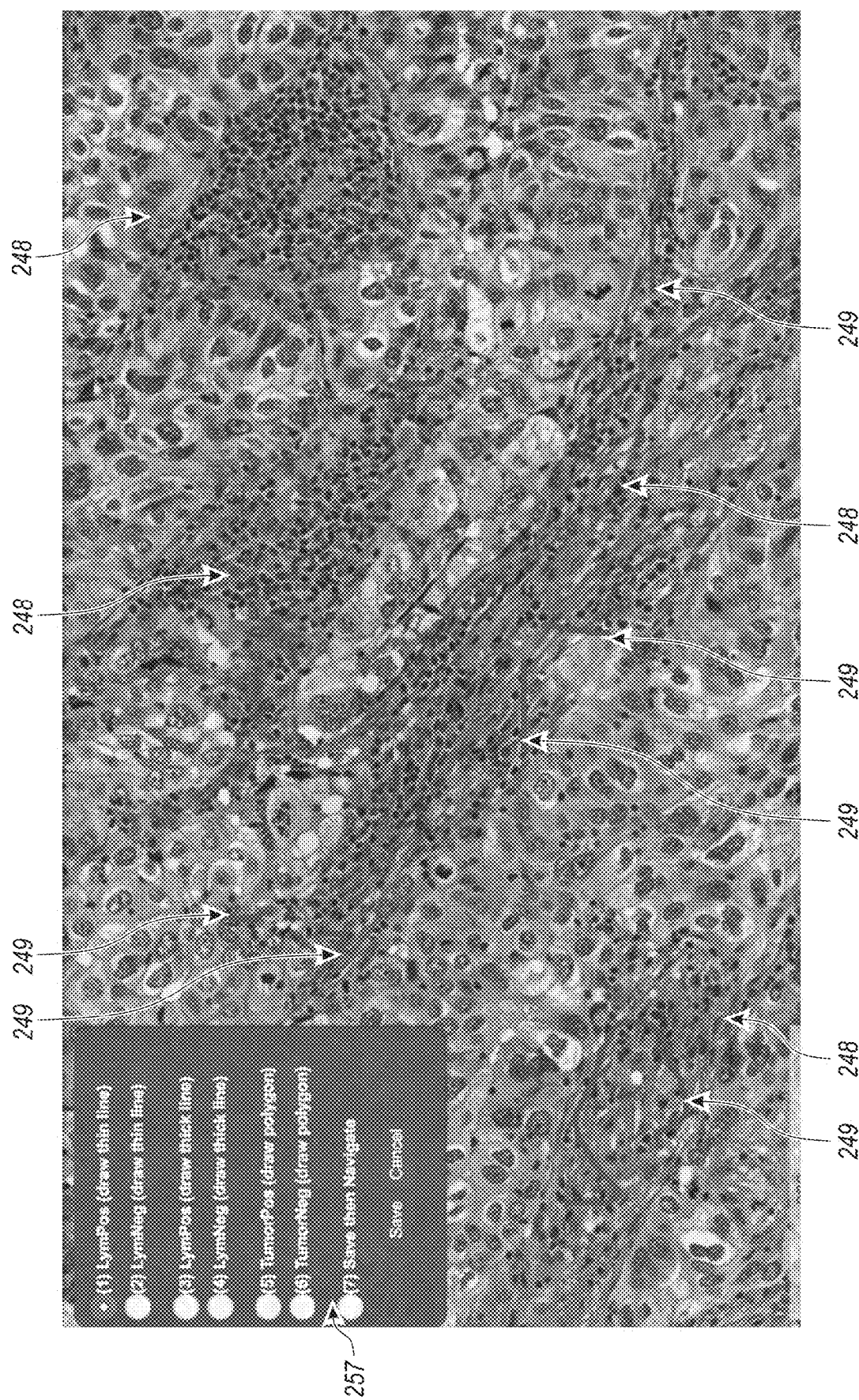
Figure 7H:
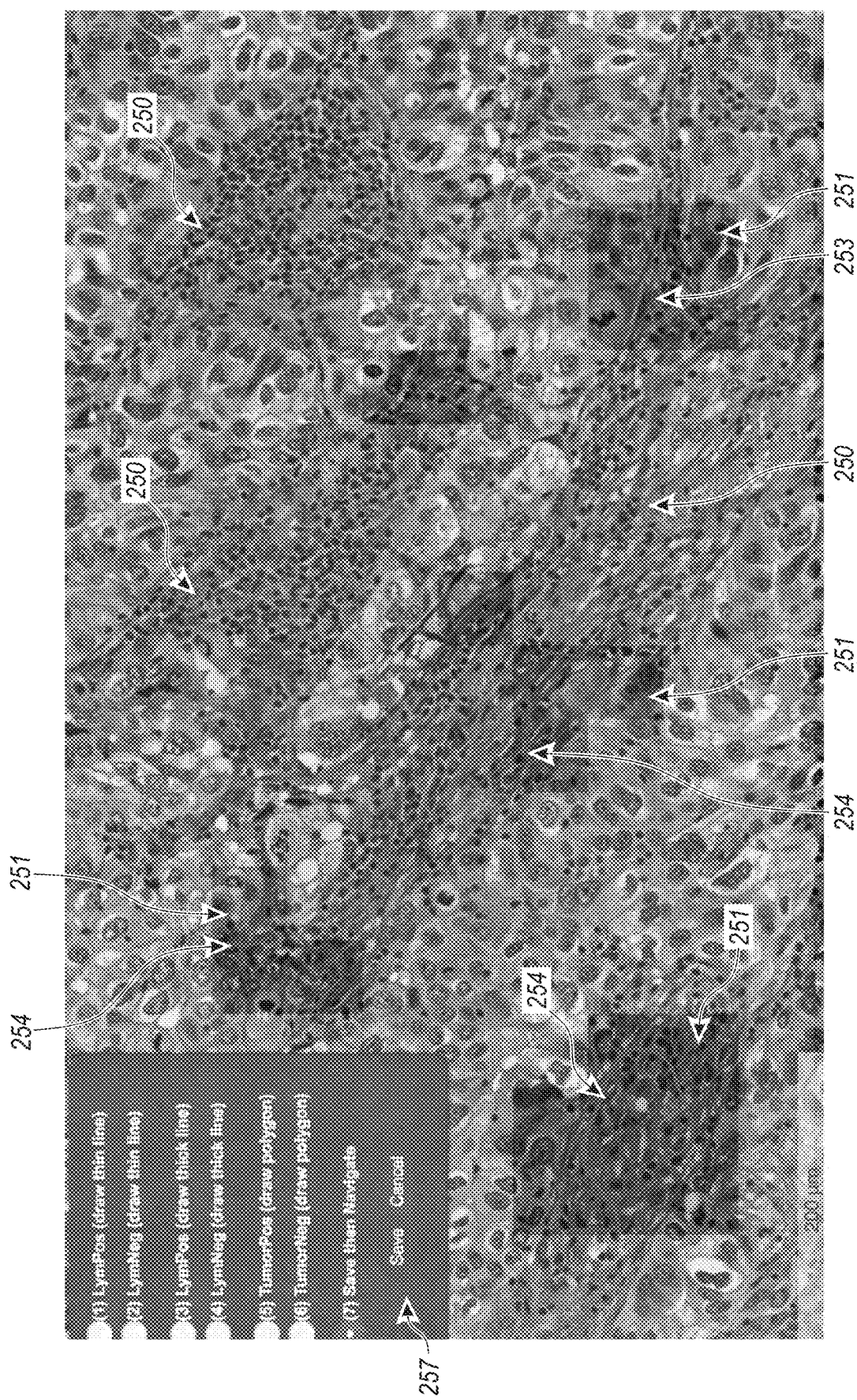

FIG. 7A provides a microphotograph of an initial tissue sample that is used to train a model in generating a lymphocyte classification heat map as shown in FIG. 7B, in accordance with an embodiment of the disclosed system and method.

FIG. 7B illustrates a lymphocyte classification heat map with various gradients of color scale indicating representative regions of lymphocyte density associated with a tissue sample, in accordance with an embodiment of the disclosed system and method. The darker shaded regions 220 (red areas) indicate higher density of tumor infiltrating lymphocytes while the lighter shaded areas 222 (yellow areas) shows the least density of tumor infiltrating lymphocytes. The median value of density is represented by regions of medium shade of grey 221 (orange areas).

FIGS. 7D-7H show representative heat maps that are generated after training the CNNS on an initial supervised dataset, applying the CNNs to generate respective probability maps for lymphocytes, with any further refinement and adjustments to respective threshold values further adjusting and retraining the CNNs, as described in steps 151-158 of at least FIG. 5 hereinabove. An exemplary initial tissue sample is shown in microphotograph of FIG. 7C.

FIG. 7D shows a microphotograph of an image slide 230 with marked-up regions 234, 235 surrounded by respective polygon rectangles drawn about those regions 231, 233, 237, which indicate TIL regions of varying density values. The respective lymphocyte sensitivity and necrosis specificity threshold values can be adjusted to vary the prediction of lymphocytes and/or necrosis in respective tissue samples as shown in panel 255. Rectangular areas 237 show darker shaded areas (red in color versions) with higher density levels of TILs. Rectangular areas 233 show lighter shaded rectangular areas (orange in color version) with lower density levels of TILs at least relative to the darker shaded rectangular areas 237 (red in color version). In addition, marked up areas are shown as markings 234, 235 and are shown as blue shaded rectangular area 231 (medium shaded area in black and white version) and red shaded area 234 (dark shaded area in black and white version) respectively. The respective lymphocyte sensitivity and necrosis specificity threshold values are adjusted to vary the prediction of lymphocytes and/or necrosis in respective tissue samples as shown in panel 255, and in FIG. 7D are set to approximately 75% lymphocytes value and 100% necrosis specificity.

FIG. 7E shows respective polygon rectangles drawn about polygon regions 245, which indicate TIL regions of a certain or varied density value. The respective lymphocyte sensitivity and necrosis specificity threshold values can be adjusted to vary the prediction of lymphocytes and/or necrosis in respective tissue samples as shown in panel 255. In the shown embodiment of FIG. 7E, rectangular areas 245 show lighter shaded areas (orange in color versions) with lower density levels of TILs at least relative to the darker shaded rectangular areas 234 as shown for example in FIG. 7D. The respective lymphocyte sensitivity and necrosis specificity threshold values are adjusted to vary the prediction of lymphocytes and/or necrosis in respective tissue samples as shown in panel 255, and in FIG. 7D are set to approximately 50% lymphocytes value and 50% necrosis specificity.

FIG. 7F shows respective polygon rectangles drawn about polygon regions 247, which indicate TIL regions of a certain or varied density value. The respective lymphocyte sensitivity and necrosis specificity threshold values can be adjusted to vary the prediction of lymphocytes and/or necrosis in respective tissue samples as shown in panel 255. In the shown embodiment of FIG. 7F, rectangular areas 247 show lighter shaded areas (orange in color versions) with lower density levels of TILs at least relative to the darker shaded rectangular areas 234 as shown for example in FIG. 7D. The respective lymphocyte sensitivity and necrosis specificity threshold values are adjusted to vary the prediction of lymphocytes and/or necrosis in respective tissue samples as shown in panel 255, and in FIG. 7F are set to approximately 80% value for lymphocyte sensitivity; 50% for necrosis specificity; and approximately 40% for smoothness.

FIG. 7G shows marked-up regions 249 with respective polygon rectangle areas 248 drawn about those marked-up lines 249, which indicate TIL regions of varying density values. The respective lymphocyte sensitivity and necrosis specificity threshold values can be adjusted to vary the prediction of lymphocytes and/or necrosis in respective tissue samples as shown in panel 255 of FIG. 7D, for example. In the shown embodiment of FIG. 7G, rectangular areas 248 show lighter shaded areas (orange in color versions) with lower density levels of TILs, at least relative to the darker shaded rectangular areas 234, as shown for example in FIG. 7D. The respective lymphocyte sensitivity and necrosis specificity threshold values are adjusted to vary the prediction of lymphocytes and/or necrosis in respective tissue samples. The panel 257 shows that for lymphocyte positive tissue sites, a thin line is drawn shown as marked-up regions 249.

FIG. 7H shows marked-up regions 254 with respective polygon rectangles 250 drawn about those marked-up regions 254, which indicate TIL regions of varying density values. The respective lymphocyte sensitivity and necrosis specificity threshold values can be adjusted to vary the prediction of lymphocytes and/or necrosis in respective tissue samples as shown in panel 255 of FIG. 7D, for example. In the shown embodiment of FIG. 7G, rectangular polygon areas 250 show lighter shaded areas (orange in color versions) with lower density levels of TILs, at least relative to the darker shaded rectangular areas 251. The respective lymphocyte sensitivity and necrosis specificity threshold values are adjusted to vary the prediction of lymphocytes and/or necrosis in respective tissue samples. The panel 257 shows that for lymphocyte positive tissue sites, a thin line is drawn shown as marked-up regions 253, 254.

Figure 8A:
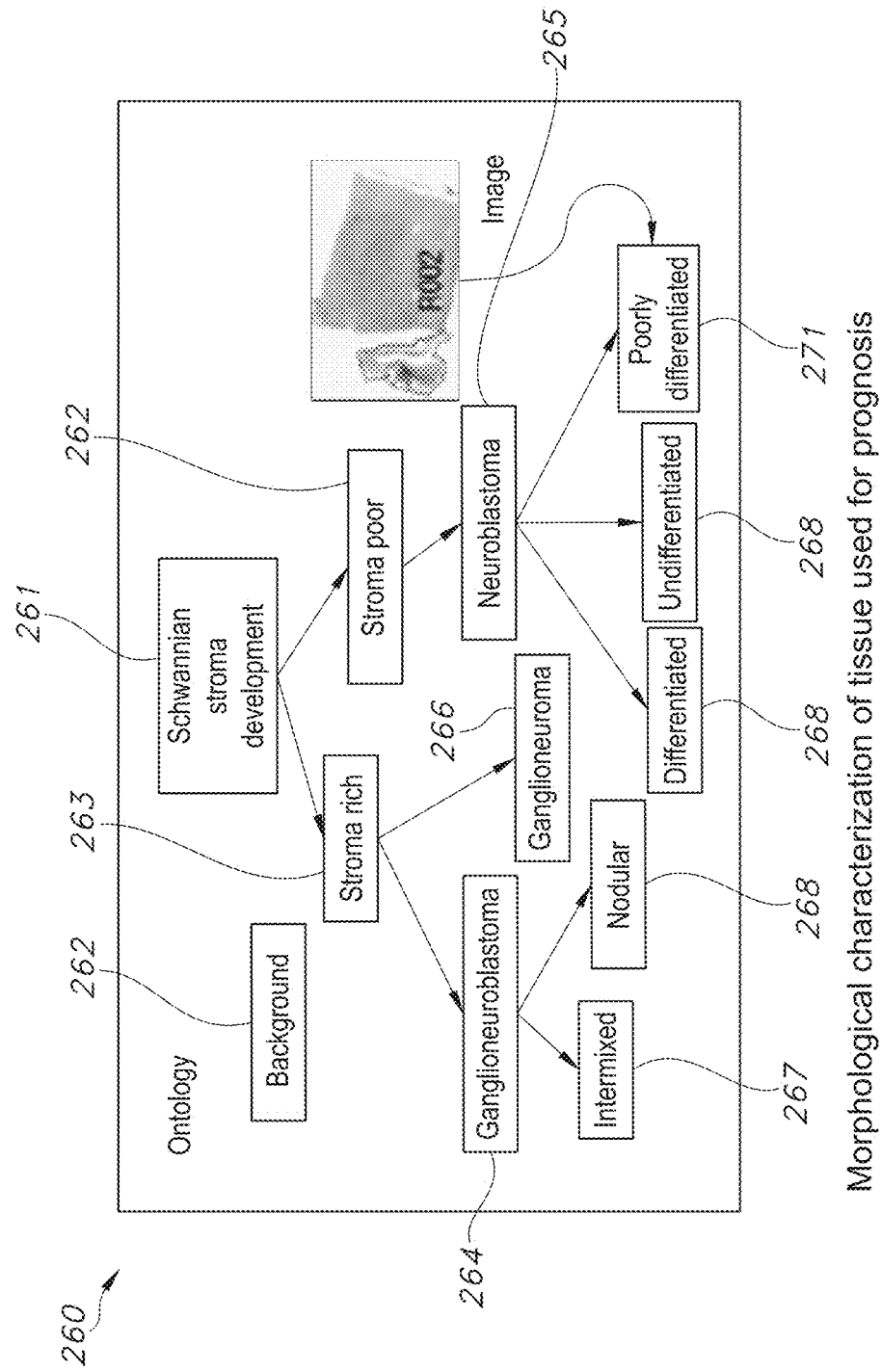
FIG. 8A illustrates a diagram outlining an exemplary human pathology classification system in particular, the Shimada classification for neuroblastoma, as relevant to the refinement of the morphological characterization of tissue used for prognosis by implementation of computer-assisted histopathology, in accordance with an embodiment of the disclosed system and method.

Referring to FIG. 8A, shown is a diagram outline of an exemplary human pathology classification system in particular, Shimada classification for neuroblastoma. It is noted that the morphological characterization of tissue is useful for prognosis. Computer assisted pathology has been instrumental in facilitating such prognosis of morphological characterization of tissue used in prognosis. The quantification of TIL information as described by the process of the disclosed system and method, is useful in the further refinement of such pathology classification system and other classification systems for more accurate prognosis and/or treatment of respective tumors.

It is noted that historically pathological classification involves three types of tumors that represent different degrees of differentiation. The first is ganlioneuroma 266 that consists of mature ganglion cells, Schwann cells and nerve bundles and is considered benign. Its calcified form may represent mature NB. The second, ganglioneuroblastoma 264 is intermediate between ganglioneuroma and NB. It is considered mature and undifferentiated neuroblast are evident. The third, neuroblastoma is considered undifferentiated end of the spectrum of neural crest tumors.

Prognostic effects of the individual morphologic features and prognostic groupings according to various classification systems have been analyzed. The classification systems analyzed for example is the Shimada classification (considered the favorable histology group). Shimada et al. took a new approach with their age-linked classification, which divided NTs into Schwannian stroma development 261 into stroma-rich 263 and stroma-poor tumors 262. They also have introduced the term "mitosis-karyorrhexis index" (MM) for describing one of the prognostic indicators. It has become apparent over the past decade that there are important biologic attributes of neuroblastic tumors that have impacted the understanding of these neoplasms. The challenge of any pathology classification, in common with others in the past, is to formulate a reproducible and biologically meaningful system. Digital pathology via computer-assisted histopathology is instrumental in more accurately characterizing tissue samples used for prognosis.

More particularly, the Shimada age-linked classification historically includes: (a) neuroblastoma 265 with low or intermediate MKI diagnosed at age <1.5 years, (b) neuroblastoma 265, differentiating subtype with low MKI diagnosed between ages 1.5-5 years, (c) ganglioneuroblastoma 264, intermixed 267 in any age, and (d) ganglioneuroma 266 in any age; and the unfavorable histology group, including: (a) neuroblastoma 265 with high MKI in any age; (b) neuroblastoma 265, undifferentiated 268 and poorly differentiated subtype 271 diagnosed between ages 1.5-5 years; (c) neuroblastoma 265 with intermediate MKI diagnosed between ages 1.5-5 years; (d) neuroblastoma 265 diagnosed at age >5 years; and (e) ganglioneuroblastoma 264, nodular diagnosed at any age; 2) histologic grade 8 (Grade 1: tumors with "MR=low and calcification=yes"; Grade 2: tumors with "MR=low and calcification=no" and "MR=high and calcification=yes", and Grade 3: tumors with "MR=high and calcification=no"); 3) risk group 8 (low risk: all Grade 1 tumors and Grade 2 tumors diagnosed at age >12 months and high risk: all Grade 3 tumors and Grade 2 tumors diagnosed at age >12 months); 4) modified histologic grade (modified Grade 1: tumors with "MKI=low or intermediate and calcification=yes," modified Grade 2: tumors with "MKI=low or intermediate and calcification=no" and "MKI=high and calcification=yes," modified Grade 3: tumors with "MKI=high and calcification=no"); and 5) modified risk group (modified low risk: all modified Grade 1 tumors and modified Grade 2 tumors diagnosed at age <12 months and modified high risk: all modified Grade 3 tumors and modified grade 2 tumors diagnosed at age 12 months. Prognostic evaluations by the histologic grade and the risk group were applicable only to the neuroblastoma (Schwannian stroma-poor) tumors.

Historically, any pathology review was a step-wise evaluation of morphologic features without knowledge of clinical information. First, tumors were classified into four different categories: neuroblastoma (Schwannian stroma-poor 262); ganglioneuroblastoma 264, intermixed 267 (Schwannian stroma-rich 263); ganglioneuroma 266 (Schwannian stroma-dominant); and ganglio-neuroblastoma 264, nodular 268 (composite Schwannian stroma-rich 263/stroma-dominant and stroma-poor 262). Second, for neuroblastoma 265 and the Schwannian stroma-poor 262 area of ganglioneuroblastoma, nodular 268, the grade of neuroblastic differentiation (undifferentiated 268, poorly differentiated 271, and differentiating 268) was determined along with the other specific features (3 classes for MKI [low, intermediate, and high], two classes for mitotic rate [MR] [low and high], and the presence of calcification [yes or no]). Third, for ganglioneuroma 266, two subtypes (maturing and mature) were distinguished.

Neuroblastoma is one of the peripheral neuroblastic tumors (pNTs) that have similar origins and show a wide pattern of differentiation ranging from benign ganglioneuroma 266 to stroma rich 263 ganglionueroblastoma 264, neuroblastic cells intermixed or in nodules, to highly malignant neuroblastoma 265. This distinction in the pre-treatment tumor pathology is an important prognostic factor, along with age and mitosis-karyorrhexis index (MKI). This pathology classification system (the Shimada system) describes "favorable" and "unfavorable" tumors by the International Neuroblastoma Pathology Committee (INPC) which was established in 1999 and further revised in 2003.

The prognostic importance of morphologic parameters in neuroblastic tumors has been suggested by many authors. However, the Shimada et al introduced an age-linked morphologic classification that assigned tumors to favorable or unfavorable categories. The evolution of the classification lead to the establishment of the INPC or Shimada system. A more recent modification was the subdivision of nodular ganglioneuroblastoma into favorable and unfavorable prognostic subsets based on the morphology and mitotic-karyorrhexis index of the stroma-poor component (revised INPC).

With the recent advances in digital pathology, current prognostic classification of neuroblastoma (NB) partly relies on morphological characteristics of the cells from H&E-stained images. In addition, the implementation of an automated cell nuclei segmentation method is used in the disclosed system and method of computational H&E-stained images and refinement of quantification of TIL lymphocyte regions in tissue samples. This method also employs morphological reconstruction algorithms coupled with hysteresis thresholding to both detect and segment the cell nuclei more accurately. According to the International Neuroblastoma Pathology Classification (the Shimada system), NB patients are classified into favorable and unfavorable histology based on the tissue morphology. In this study, an image analysis system operates on digitized H&E stained whole-slide NB tissue samples and classifies each slide as either stroma-rich 263 or stroma-poor 262 based on the degree of Schwannian stromal development as shown for example, in the pathology classification flow chart associated with computer-assisted histopathology as shown in FIG. 8A.

Figure 8B:
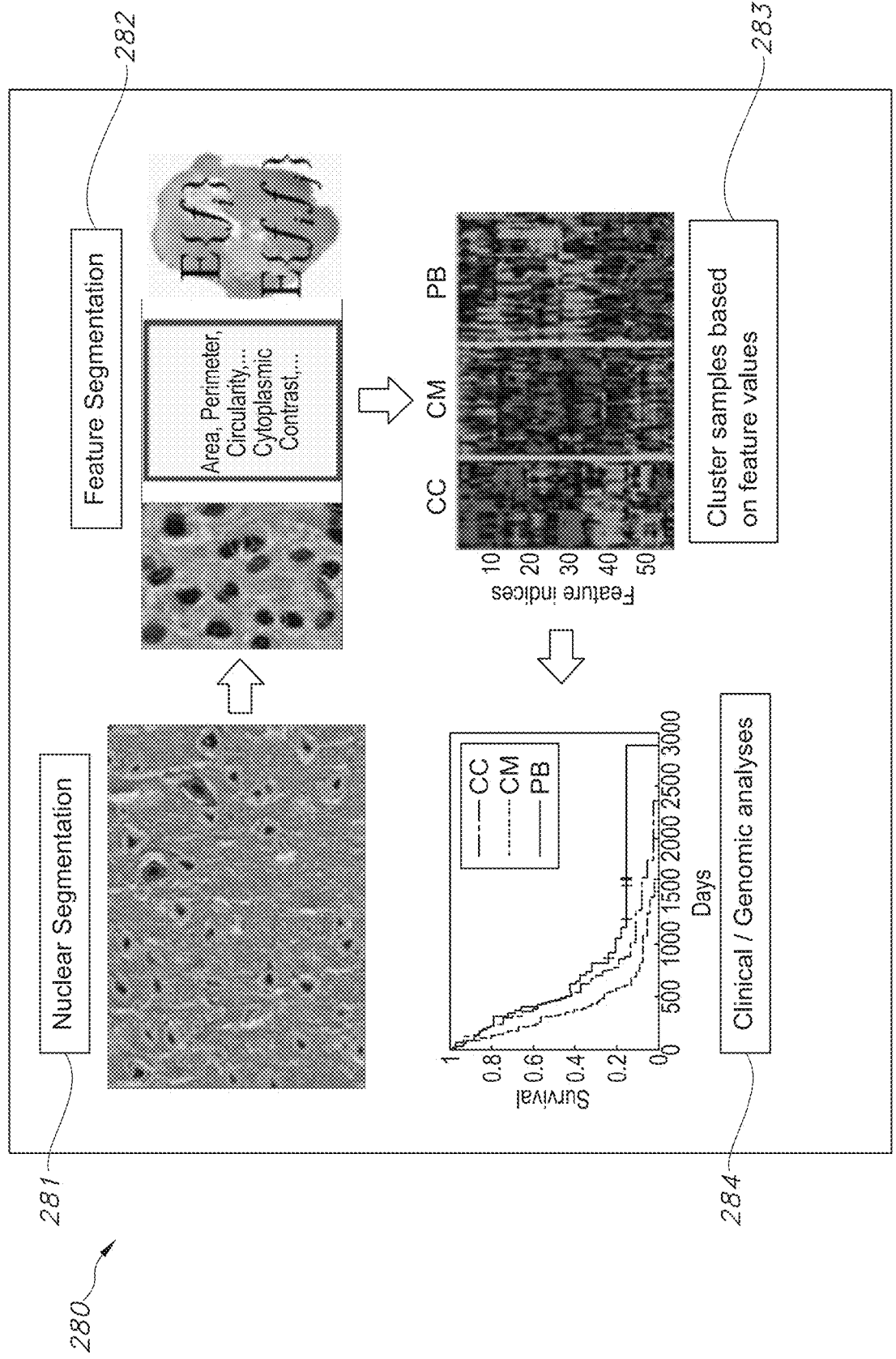
FIG. 8B shows a workflow of integrative digital pathology, analysis and morphology implemented for the identification, quantification, and refined characterization of tumors, in accordance with an embodiment of the disclosed system and method.

FIG. 8B shows a workflow of integrative digital pathology, analysis and morphology implemented for the identification, quantification, and refined characterization of tumors, in accordance with an embodiment of the disclosed system and method. As shown in the workflow 280, nuclear segmentation is implemented at the outset in step 281 for proper quality segmentation of nuclei in tumoral tissue. Next, the feature segmentation in step 282 involves the analysis of cell features such as area, perimeter, circulatory, cytoplasmic characteristics, contrast, etc. It is noted that such feature characteristics including, varying texture and/or appearance characteristics may vary significantly, such that different texture features may even be selected for the classification model and the training phase that would result in training a different classification model (CNN). Next the cluster samples based on feature values are computed in step 283. Finally, the clinical/genomic analysis are generated in step 284.

Figure 8C:
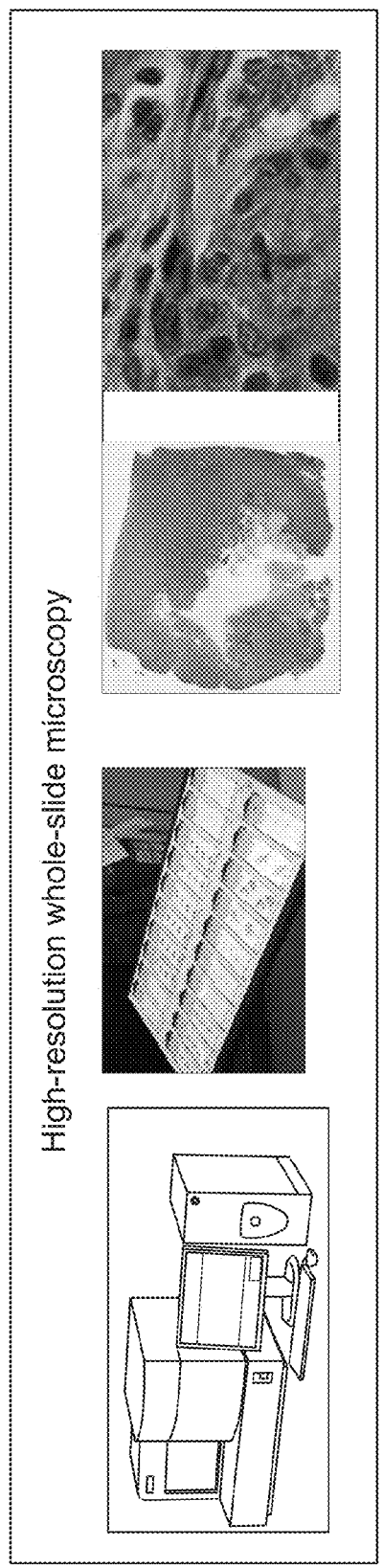
FIG. 8C provides an overview of an example high-resolution whole-slide microscopy digital pathology analysis of tissue images, and respective integrated analysis, in accordance with an embodiment of the disclosed system and method.

FIG. 8C provides an overview of an example high-resolution whole-slide microscopy digital pathology analysis of tissue images, and respective integrated analysis, in accordance with an embodiment of the disclosed system and method. In particular, shown is an exemplary high-resolution whole-slide microscopy workstation include whole-slide tissue images, an image patch under analysis and magnification of a certain region of interest in the tissue image slide. Also shown is the integrated analysis for a particular kind of tumoral research, including respective molecular, histology multiplex IHC, neuroimaging and clinical/pathology analysis.

FIG. 8D provides an overview of example tissue sample image slides from the same patient at the same magnification, and respective graphical representations of cancer nuclei of smaller and larger size ranges, in accordance with an embodiment of the disclosed system and method.

FIG. 8E provides an overview of exemplary user interface with nuclear and cell morphometry features that are analyzed including intensity information, texture information and gradient statistics, in accordance with an embodiment of the disclosed system and method. In particular, the following features are shown in the top panel of the exemplary user interface for selection: nuclei area, nuclei perimeter, eccentricity, circularity, major axis, minor axis, and extent ratio. The second row shows intensity information and texture information. The intensity information includes features such as average intensity, standard intensity, maximum intensity, and minimum intensity. The texture information includes features such as entropy, energy, skewness and kurtosis. The bottom panel includes gradient statistics. Specifically, it includes features such as as average GM, standard GM, skewness GM, energy GM, kurtosis GM, edge pixel summation and edge pixel percentage.

Figure 8F:
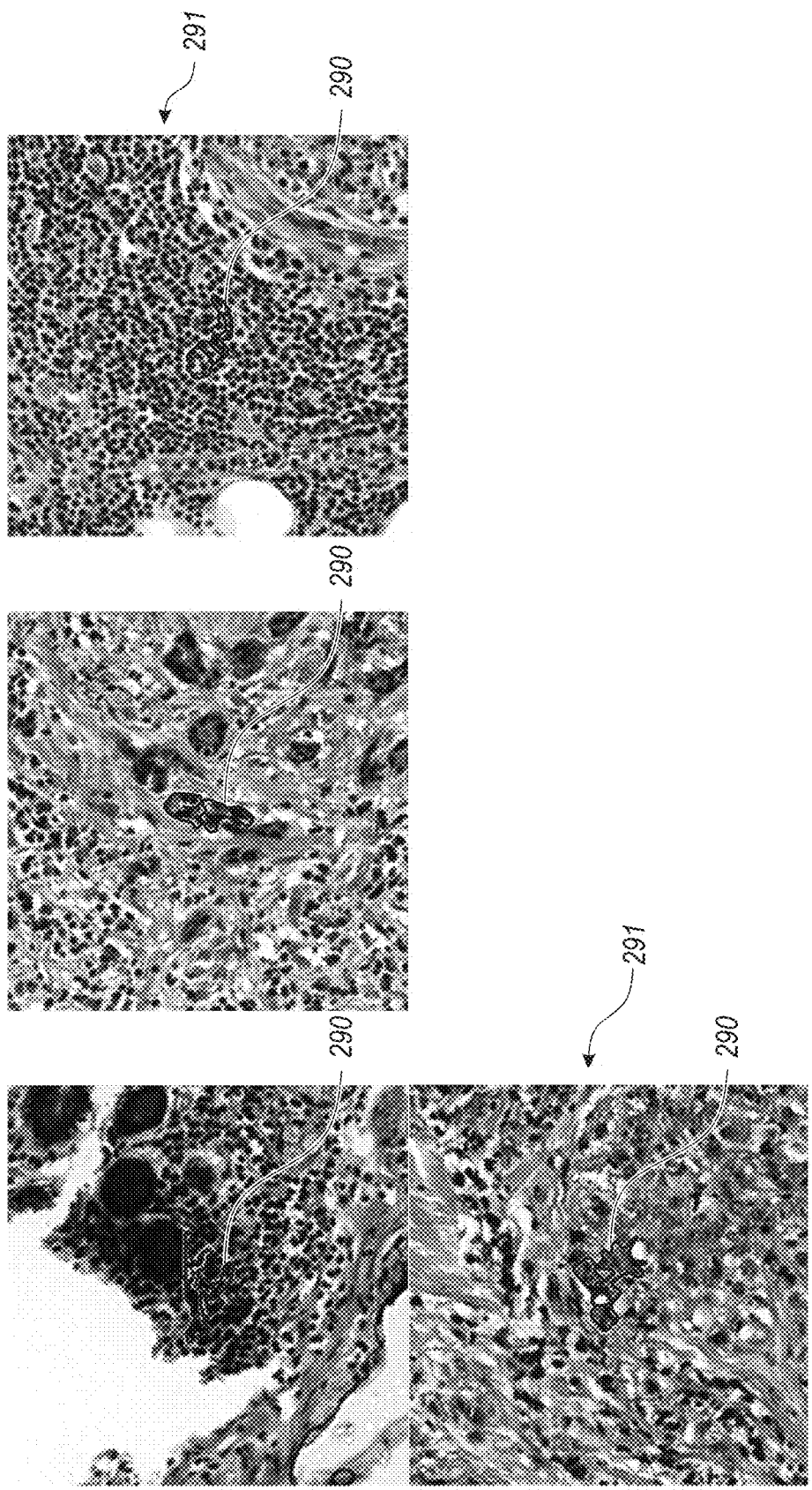
FIG. 8F provides microphotographs of example whole slide tissue images with respective lymphocyte areas of interest being designated for deep learning classification of a CNN model, in accordance with an embodiment of the disclosed system and method.

FIG. 8F provides microphotographs of example whole slide tissue images 291 with respective lymphocyte areas of interest 290 being designated for deep learning classification of a CNN model, in accordance with an embodiment of the disclosed system and method.

FIG. 8G provides a screenshot of an overview of the relationship between images and features, the mapping of both intuitive features and non-intuitive features, and the evaluation of features selected from tissue patch sample(s), in accordance with an embodiment of the disclosed system and method. In step 1, a case is selected from the TCGA atlas. A particular patient case is selected for an interactive visualization of pathology results. In step 2 of FIG. 8G, two features of interest are selected: x-axis (area) and y-axis (perimeter). In step 3, the user zooms in on the region of interest. Step 4 shows a specific nucleus of interest being selected. Each dot represents a single nucleus. The tool provides visual context for feature evaluation. The technique maps both intuitive features (i.e. size, shape, color) and non-intuitive features (i.e. wavelets, texture) to the ground truth of source images through an interactive web-based user interface. Step 5 next shows selection of nucleus geo-located within the whole slide image and detection of an elongated nucleus. Step 5 includes the evaluation of the features selected in the context of the specific nucleus and where this nucleus is located within the whole slide image.

Figure 9A:
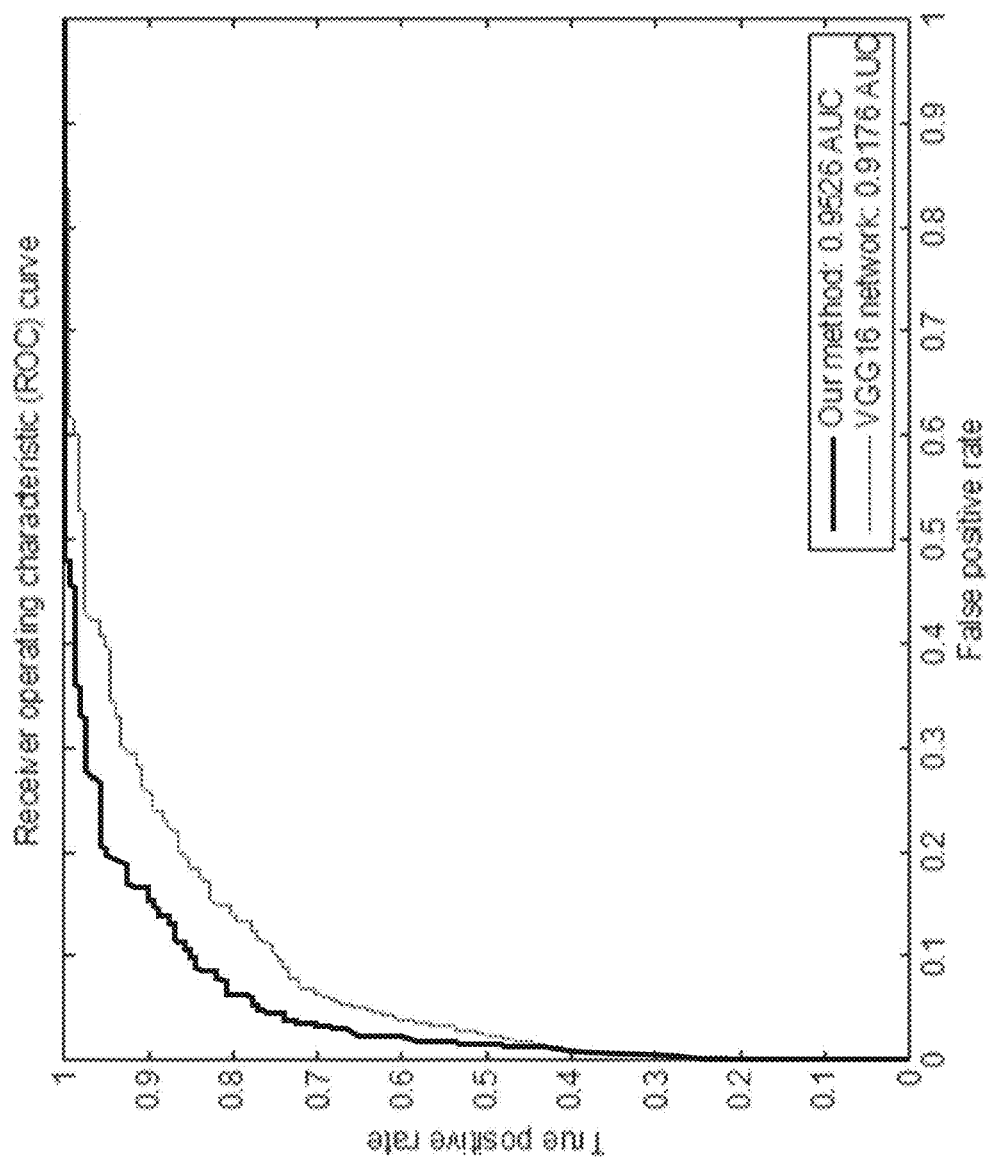
FIG. 9A shows a graphical representation associated with assessment of TIL prediction including a receiver operating characteristics (ROC) curve depicting performance of an exemplary CNN, in accordance with an embodiment of the disclosed system and method.
Figure 9B:
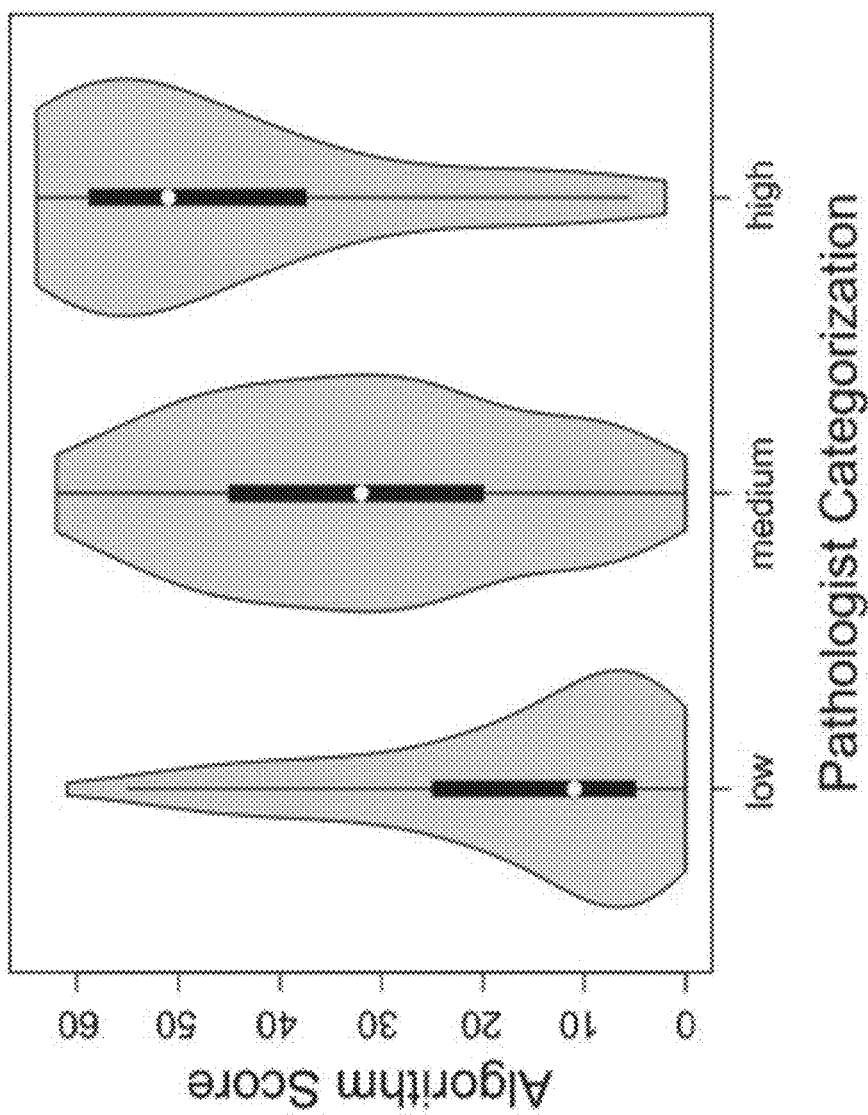
FIG. 9B provides a graphical representation providing a comparison of TIL scores of super-patches between pathologists and computational stain, in accordance with an embodiment of the disclosed system and method.

Referring to FIG. 9A, shown is a graphical representation associated with assessment of TIL prediction including receiver operating characteristics (ROC) depicting performance of a CNN, in accordance with an embodiment of the disclosed system and method.

The performance of an exemplary implementation of TIL prediction and related CNN model training, was assessed in two complementary, yet orthogonal ways. The first assessment method, compares performance prediction of the disclosed method with that of a popular and widely used CNN—called VGG16 (Simonyan and Zisserman, 2014)— using a set of WSIs from TCGA lung adenocarcinoma (LUAD) cases. The training set of the lymphocyte CNN consisted of 20,876 patches. Each patch usually contains 0 to 30 nuclei and was annotated by a pathologist as lymphocyte infiltrated or not lymphocyte infiltrated. The training set of the necrosis segmentation CNN consisted of 1,800 patches. Each patch was annotated with a necrosis region mask segmented by a pathologist. The system sampled 2,480 patches to create the test dataset. The ROC curve shows that the disclosed method outperforms VGG16 by 3.1% with respect to the area under ROC curve (AUROC) metric (referring to FIG. 9A). The ROC curve indicates that the disclosed method of TIL prediction can detect TILs accurately in lung adenocarcinoma. The disclosed digitized method of detecting TILs more precisely can also aid pathologists in the respective classification, evaluation and prognosis associated with TILs in various other tumoral cancer tissue types. It is noted that further pathologist analysis and or system expert analysis is beneficial in reducing false positives as there are copious image sample to analyze.

Referring to FIG. 9B, shown is a graphical representation providing a comparison of TIL scores of super-patches between pathologists and computational stain, in accordance with an embodiment of the disclosed system and method. A direct comparison of TIL patch assignments by the Computational Staining pipeline with those by experienced pathologists was undertaken by scoring 8×8 "super-patches" for TIL content. Shown in FIG. 9B, x axis indicates median scores from three pathologists assessing 400 super-patches as having low, medium, or high lymphocyte infiltrate. The y-axis indicates scores from computational staining, on a scale from 0 to 64.

In particular, during the exemplary performance evaluation, three pathologists assessed 400 super-patches as having low, medium, or high TIL content, while machine-derived scores were assigned for the patch by counting TIL-positive patches (thus ranging from 0 to 64). Consistency was high among each of the pathologists (>80%), as assessed by re-scoring of 100 super-patches. As seen in FIG. 9B, the median machine-derived score is quite distinct between the three ordinal bins. This is evidenced in strong correlation as assessed by the polyserial coefficient (Drasgow, 2014), designed for comparing ordinal with continuous values (0.36 with 95% CI [0.27,0.45], p value=5.2×10-15, R package polycor).

Figure 10A:
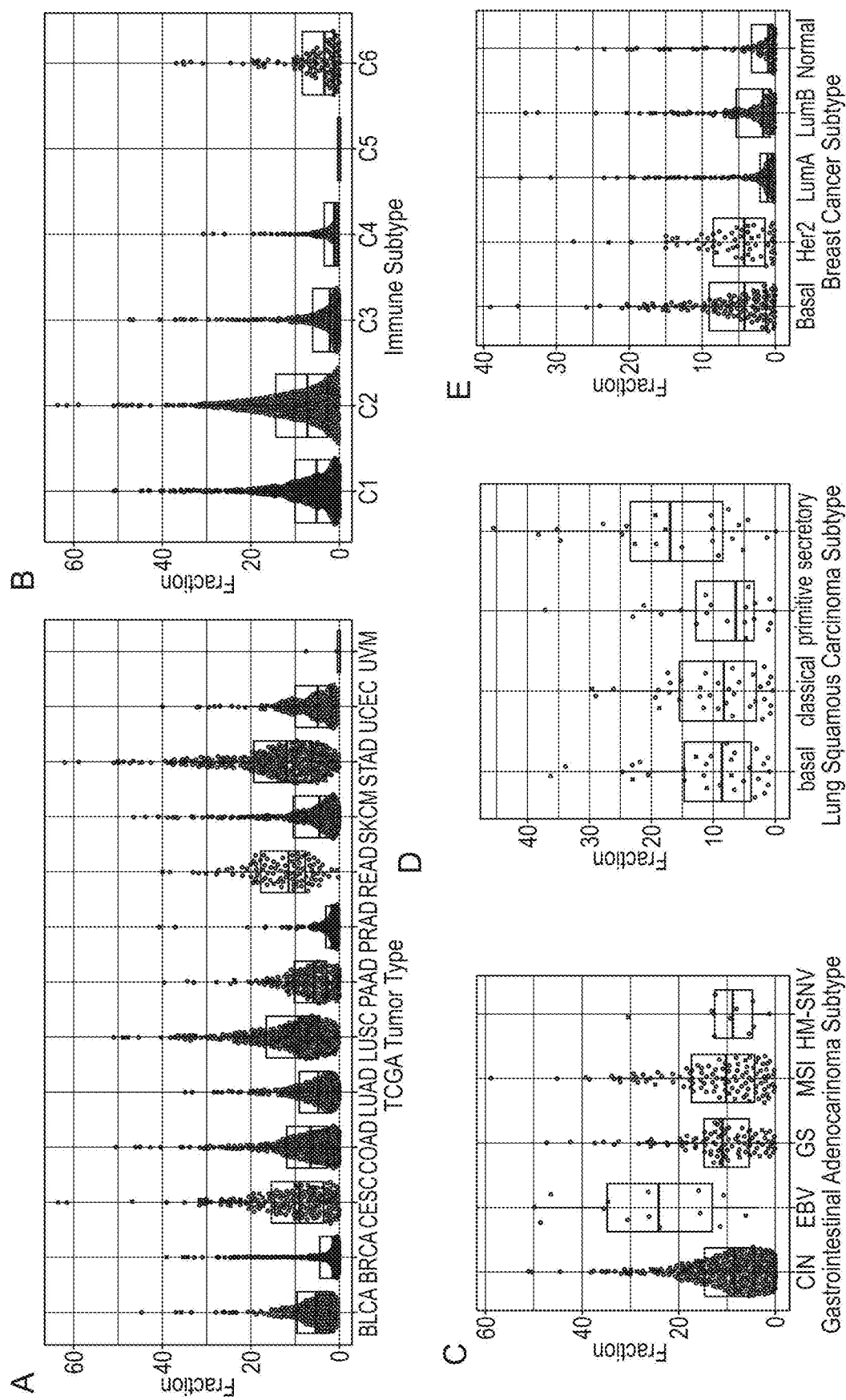
FIG. 10A provides a graphical representation indicating TIL fraction by tumor category, in accordance with an embodiment of the disclosed system and method.

Referring to FIG. 10A (Panels A-E), shown is a graphical representation showing TIL fraction by tumor category, in accordance with an embodiment of the disclosed system and method. In particular, shown in Panels (A-E) respectively, is percent TIL fraction, the proportion of TIL-positive patches within a TIL map, shown by various categorizations of TCGA tumor samples. Each plotted point represents a tumor sample for (panel A) 13 TCGA tumor types (4,612 cases), (panel B) six subtypes characterized by differences in the nature of the overall immune response (Thorsson et al., 2018) (C5 has very few samples here), (Panel C) gastrointestinal adenocarcinoma subtypes, (Panel D) lung squamous cell carcinoma subtypes, and (Panel E) breast adenocarcinoma subtypes. Also related to FIG. 10A is FIG. 10B, as described further hereinbelow.

Figure 10B:
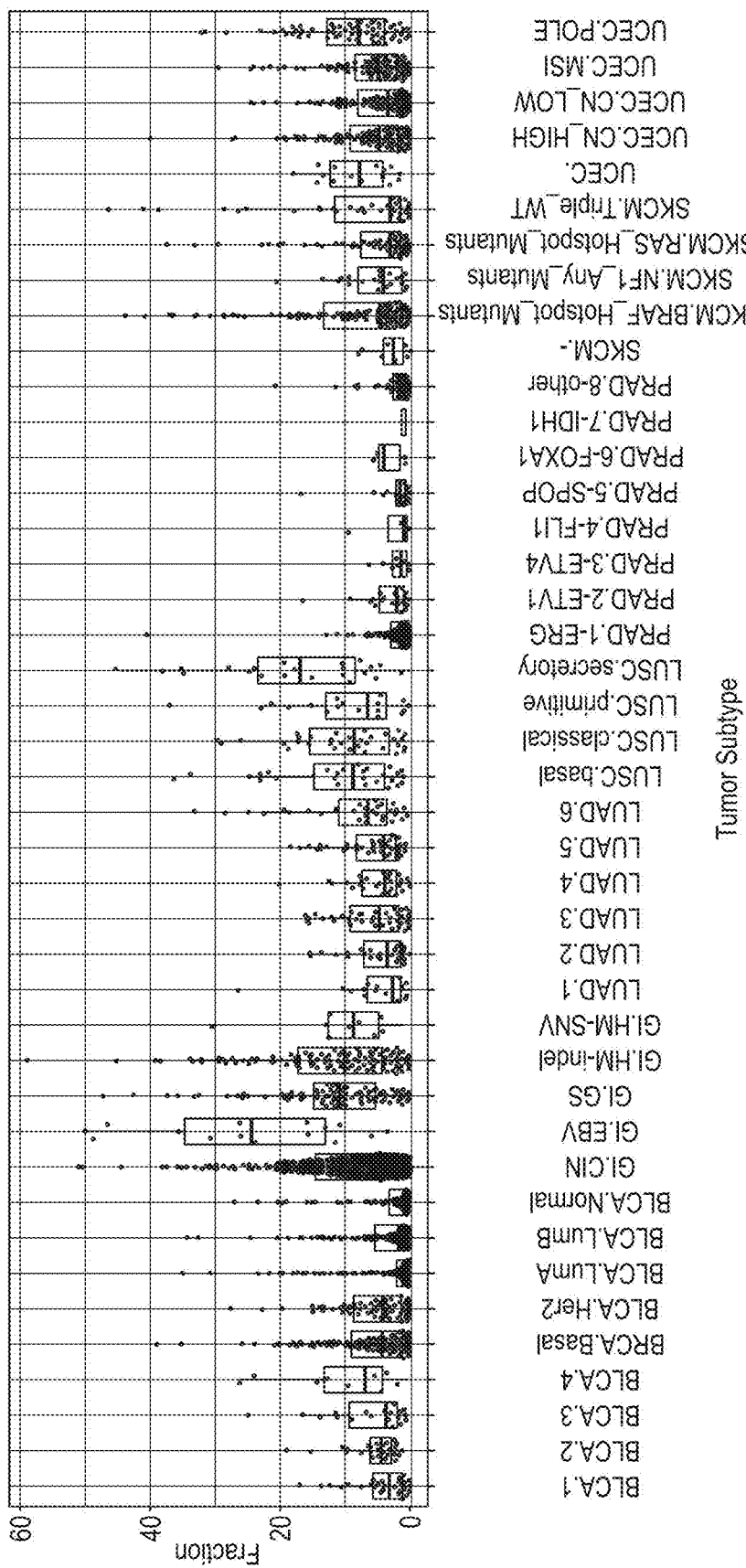
FIG. 10B provides a graphical representation of TIL fraction by tumor category, in accordance with an embodiment of the disclosed system and method.

In FIG. 10A, the spatial fraction of TILs was estimated as the fraction of TIL-positive patches among the total number of patches identified on the tissue sample. A wide range in spatial infiltrate is seen among the TCGA tumor types (referring to FIG. 3, panel A and TABLE 2 as provided hereinbelow), with high infiltrates in gastric cancer (STAD) with a mean of 14.6%, rectal cancer (READ) at 13.0%, squamous cell carcinoma in the lung (LUSC) at 11.6%, while uveal melanoma (UVM) has only 1% estimated TIL fraction, consistent with its inclusion as negative control (Figure S3A). Wide differences are also seen grouping tumors by the nature of the immune response, according to a recent immune characterization of all TCGA tumors (Thorsson et al., 2018) (FIG. 10A, Panel B). The most immunologically active immune subtypes (e.g., C1, C2) tend to have the greatest spatial infiltration of lymphocytes. In addition, within documented TCGA subtypes, which are typically characterized by specific molecular changes in tumor cells, strong differences are also seen (FIG. 10B). EBV-positive gastric cancer is particularly rich in TILs, with an average of 25% of spatial regions infiltrated by TILs (FIG. 10A, Panel C). The lung squamous secretory subtype (Wilkerson et al., 2010) is also particularly rich in infiltrate 17% (FIG. 10A; Panel D) as is the mutation-rich POLE subtype of endometrial cancer. Among breast cancer tumors, the basal subtype has the greatest infiltrate (FIG. 10A, Panel E), consistent with what has been observed in other studies (Iglesia et al., 2014). When reviewed in combination, these various data results show that the nature of the infiltrate has strong ties to aspects of the tumor microenvironment and that the nature of the infiltrate may be reflective of particular molecular aberration states of tumor cells.

TABLE 2

| Variable | Definition or Reference |
| --- | --- |
| Number of TIL Patches | TIL patch count |
| TIL fraction | (TIL patch count)/(Total number of available patches on tissue slice) |
| Number of TIL Clusters | Number of clusters, from affinity propagation clustering |
| Cluster Size Mean | Mean of the cluster membership counts |
| Cluster Size Standard Deviation | Standard deviation of the cluster membership counts |
| Within-Cluster Dispersion Mean | Mean of the values of $WGSS^k$, the within-cluster dispersion (see below) |
| Within-Cluster Dispersion Standard Deviation | Standard deviation of the values of $WGSS^k$ |

TABLE 2-continued

| Variable | Definition or Reference |
|---|---|
| Cluster Extent Mean | Mean of the maximum distances to clusters exemplars. The cluster exemplar is the most representative TIL patch for the cluster, as defined in the affinity propagation method |
| Cluster Extent Standard Deviation | Standard deviation of the maximum distances to exemplars |
| Ball Hall Index | Ball and Hall (1965). Available at: http://www.dtic.mil/docs/citations/AD0699616 |
| Banfield Raftery Index | Banfield and Raftery (1993) |
| C Index | Hubert and Schultz (1976) |
| Determinant Ratio Index | Scott and Symons (1971) |
| Ball Hall Index - TIL count adjusted | 'Adjusted' refers to the residual of the corresponding index after regression against % TIL density |
| Banfield Raftery Index - TIL count adjusted | 'Adjusted' refers to the residual of the corresponding index after regression against % TIL density |
| C Index - TIL count adjusted | 'Adjusted' refers to the residual of the corresponding index after regression against % TIL density |
| Determinant Ratio Index - TIL count adjusted | 'Adjusted' refers to the residual of the corresponding index after regression against % TIL density |

FIG. 10B provides a graphical representation of TIL fraction by tumor category, in accordance with an embodiment of the disclosed system and method. In particular the percent TIL fraction, the proportion of TIL-positive patches within a TIL map, is shown for TCGA molecular subtypes.

Referring to FIG. 11A, shown is a graphical representation comparison of TIL proportion from imaging and molecular estimates, in accordance with an embodiment of the disclosed system and method. In particular, in Panel A of FIG. 11A, provided are Spearman correlation coefficients and p values for comparison of TIL fraction from spatial estimates of TIL maps and molecular estimates of TIL fraction from processing of cancer genomics data using deconvolution methods. In Panel B of FIG. 11A, each point represents a breast adenocarcinoma tumor sample, with the value of TIL fraction from TIL maps (indicated on the x axis) and from molecular estimates (indicated on the y axis). In Panel C of FIG. 11A, similar to Panel B, each point represents a breast adenocarcinoma tumor sample, with the value of TIL fraction from TIL maps (indicated on the x axis) and from molecular estimates (indicated on the y axis) for 12 additional TCGA tumor types (referring also to FIG. 11B, as described further hereinbelow).

In particular, the spatial fraction of TILs was compared with molecular estimates of TIL content from molecular genomics assays (Thorsson et al., 2018). The molecular estimate of TIL fraction is obtained by multiplying an estimate of the overall leukocyte fraction, based on DNA methylation arrays, with an estimate of the lymphocyte proportion within the immune compartment obtained by applying CIBERSORT (Newman et al., 2015) to RNA sequencing data. Solid agreement is seen between the imaging and molecular estimates in FIG. 11A, PANEL A, with Spearman correlation values ranging from 0.20 to 0.45 for the most part accompanied by highly significant p values, and with UVM, the negative control, showing no correlation. The reasons for the differences between the molecular estimates and spatial TIL fraction include: (1) molecular data are extracted from a fresh frozen tissue section in proximity to the formalin-fixed paraffin-embedded (FFPE) sample used to generate the diagnostic H&E image, but the exact spatial relation is unknown; (2) the molecular estimate is proportional to the number of lymphocytes, whereas the spatial fraction of TILs is estimated by tissue area; (3) the spatial analysis and TIL fraction are an assessment of lymphocyte-infiltrated tissue that can also include non-tumor regions on the diagnostic slides; and (4) the molecular quantification is obtained from frozen sections that are highly enriched for tumor as a criterion for project inclusion.

Further examined were the outlier cases (referring to Panels B & C of FIG. 11A) manifesting high levels of discordance between molecular and spatial image-derived TIL estimates for several tumor types, including BRCA, SKCM, LUAD, LUSC, STAD, and READ. It was determined that spatial TILs in non-tumor regions appeared to play a major explanatory role (referring to FIGS. Panel B (297) of FIG. 11B and Panel C (298) of FIG. 11B). Further attempts to exclude such areas by manual negative masking and/or CNN-based automation for tumor recognition will be included in future efforts in order to reduce the discordance between the molecular estimates from samples that are highly enriched for tumor and the spatial TIL estimates derived from diagnostic H&E images.

Referring to FIG. 11B, shown are microphotographs 295 of various tissue images and TIL maps representative of examples of the Negative Control and Discordant Results between Molecular and Image-derived Analyses for TIL estimates, in accordance with an embodiment of the disclosed system and method.

In top panel 296, of FIG. 11B, shown are the images of uveal melanoma cases, exemplified here by TCGA-V4-A9EM, served as the group of negative controls for the example implementation of the lymphocyte-detection algorithm, as this tumor type is not generally associated with notable immune infiltrates. After the initial assessment of the H&E image (leftmost slide in top panel 296) and corresponding TIL map (center slide of top panel 296), additional histopathologic evaluation was performed to confirm the absence of lymphocytes (two slides on right portion, of top panel 296), showing the representative sections at higher magnification. The uveal melanoma cases show how the lymphocyte-detection algorithm correctly distinguishes tumor cells and aggregates of melanotic pigment by not labelling them as lymphocytes in a very challenging and complex scenario.

In Panel B (reference label 297) of FIG. 11B, an example representing the discordant results between the high molecular and low image-derived TIL estimates are shown, where the H&E of the FFPE is virtually devoid of lymphocytes, whereas the frozen section has mild to patchy moderate level of lymphocytes. Images are presented in the following sequence from left to right of panel B. In the left panel, of Panel B (reference label 297): H&E diagnostic image at low-magnification, Second from left panel: TIL map, and the third panel from left: fresh frozen section for molecular genomics assays at low magnification. It is noted that for TIL maps: red for color version or bright areas of TIL Map represents a positive TIL patch; blue or dark shaded area represents a tissue region with no TIL patch; and black background represents no tissue. In the rightmost two panels (of panel B (reference label 297)): Representative sections are shown at higher magnification.

In Panel C (reference label 298) of FIG. 11B, an example is shown of the discordance of low molecular and high image-derived TIL estimates where the H&E of the FFPE contains numerous lymphocytes in the peri-tumoral regions and distant stroma, whereas the frozen section consists of relatively pure tumor with minimal lymphocytes. Images are presented in the following sequence from left to right in the top panel: H&E diagnostic image at low-magnification, TIL map (center portion of panel C (298)), and the fresh frozen section for molecular genomics assays at low magnification (right portion of panel C (298)) and the two bottom panels 299 show representative sections at higher magnification.

Referring to FIGS. 12A-D, shown are examples of TIL Map Structural Patterns, in accordance with an embodiment of the disclosed system and method.

Specifically, in FIGS. 12A-D, shown are microphotograph images from four cases representing different degrees of lymphocyte infiltration. Each example figure is labeled by TCGA participant barcode and has the following three panels. Left portion provide(s) a representative H&E diagnostic image at low magnification with tumor regions circled in yellow (or in white in non-color version). Middle portion provide(s) a representative TIL map; red represents a positive TIL patch (lighter shade on non-color version); blue represents a tissue region with no TIL patch (darker shaded areas in non-color version); and black represents no tissue. Right portion provides representative diagrams of clusters of TIL patches derived from the affinity propagation clustering of the TIL patches. Line segments connect cluster members with a central representative for each cluster, and colors are arbitrarily assigned to aid visual separation of clusters (in various gradient/shades of grey in non-color version).

TABLE 4 provides TIL map, cluster statistics, and global patterns for the four examples provided in FIGS. 12A-D. Each column represents one way to characterize the TIL map, ranging from simple measures such as TIL count and density to more complex ones characterizing details of cluster properties and image patterns (referring also to TABLE 3) provided hereinbelow.

TABLE 3 hereinbelow provides a summary of criteria used to characterize TIP map structural patterns.

TABLE 3

Summary Table of Criteria Used to Characterize TIL Map Structural Patterns

| Category | Immune Response | Qualitative Pattern | Proportion of Tumor composed of Lymphocytes |
| --- | --- | --- | --- |
| Indeterminate | Insufficient and/or no tumor in the H&E image at low-power | Not applicable | Not applicable |
| None | No response | No pattern | <1% TILs |
| Non-brisk, focal | Very Weak (minimal) | Localized | <5% TILs |
| Non-brisk, multi-focal | Weak (mild) | Loosely scattered foci | >5%-30% TILs |
| Brisk, diffuse | Moderate to Strong | Diffuse and dense infiltrate | >30% TILs in the intra-tumoral component* |
| Brisk, band-like | Not applicable | Infiltrate bordering the tumor at its periphery | <30% TILs in the intra-tumoral component* |

*If the TIL map patterns reveal both diffuse and band-like immune responses, the predominant pattern was characterized and the difference between "Brisk, diffuse" and "Brisk, band-like" was based on whether the relative distribution of TILs in the intra-tumoral component appeared to be greater than or less than 30%, respectively.

TABLE 3 can be used in the assessment of TIL map structural patterns and lists criteria used to characterize TIL MAP structural patterns. In order to perform a comprehensive assessment of the TIL map structural patterns, the collection of 5202 H&E images (see hereinabove, 4759 with DX1 suffix) and corresponding TIL maps were visually inspected to ensure that each H&E image had a correctly matched TIL map, after which, a subset of 500 H&E images and corresponding TIL maps were closely inspected at higher power magnification (100× to 200×) in 30-50 fields to ensure that the lymphocyte-detection algorithm was performing as intended and not mistakenly identifying tumor cells as lymphocytes across the various tumor types as a quality-control measure. The system further employed H&E images and corresponding TIL maps from cases of uveal melanoma as negative controls because melanoma tumor cells and melanotic pigment can be a difficult challenge for the lymphocyte-detection algorithm.

After the negative controls were verified and quality measures were satisfactorily addressed, TIL maps (total N=4455) were assessed in a two part fashion by a qualitative description and a semiquantitative score based on visual inspection with respect to the tumor region only, which is determined by histopathologic evaluation at low-power magnification (40×) of the corresponding H&E diagnostic whole-slide image. The tumor region represents the combined intra-tumoral and peri-tumoral regions and excludes the adjacent non-tumor regions.

The qualitative description characterizes the nature of the immune infiltrate with respect to the gross spatial distribution of the TILs in only the tumor region with terms like "Focal" (localized), "Multi-focal" (loosely scattered), "Diffuse" (spread out over a large area), and "Band-like" (well-defined boundaries bordering the tumor at its periphery). The semiquantitative scoring evaluates the relative strength of the immune response terms like "None," "Non-brisk" (minimal to mild partial immune response), and "Brisk" (moderate to strong immune response).

Taken together, "Non-brisk, focal" is indicative of a "very weak" but minimally present immune response with a low density of TILs in a localized area of the tumor, whereas "Non-brisk, multi-focal" is indicative of a weak partial immune response with loosely scattered TILs in a few areas of the tumor. However, "Brisk, diffuse" represents a moderate to strong immune response with a relatively dense and spread out pattern of TILs across >30% of the tumor even if there are band-like boundaries bordering the tumor at its periphery. The "Brisk, band-like" description was reserved for cases where the TIL map patterns showed relatively organized structures that appear as boundaries bordering the tumor at its periphery and <30% TILs in the intra-tumoral component. "None" was selected in cases where few TILs were present in less than 1% of the area of the tumor and "Indeterminate" was used if there was insufficient or no grossly identifiable tumor in the H&E image at low-power with the corresponding TIL map regardless of pattern and semiquantitative distribution of TILs In accordance with yet another embodiment, the automated Assessment of Local Structures in the TIL Infiltrate and Association with Molecular and Clinical Readouts is described. Local Spatial Structure of the Immune Infiltrate is also described. In particular, a unique feature of imaging data is the ability to go beyond total lymphocytic infiltrate load to the assessment of patterns of lymphocytic infiltration. In order to identify such patterns, first affinity propagation is used during an example implementation used to find spatially connected and coherent regions (clusters) of TIL image patches (for example, APCluster R package).

In particular, examples of four different cases (301-304) showing H&E images, TIL maps, and clusters, are shown in FIGS. 12A-12D for selected cases exemplifying sparse and dense lymphocyte infiltrates. It is noted that for each respective slide (panels A-D in rows 301-304), the resulting cluster pattern was characterized using measures for simple count and extent statistics, but also by clustering indices, which assess more complex characteristics such as cluster shape. Summary measures include the number of clusters $N^{cluster}$, the mean number of TIL patches in the clusters NP, the mean of the within-cluster dispersion WCD, and the mean of cluster spatial extents CE (referring to TABLE 4 and TABLE 2). In terms of TIL patch distances to a given cluster center, the dispersion is related to their variance, while spatial extent is akin to the maximal distance. $N^{cluster}$ ranged from 2 to 46 over the entire cohort (4,480 cases, excluding non-tumor slides), with a median of 12, and the mean cluster membership was 293 TIL patches. Further, calculated were the clustering indices of Ball and Hall (1965), Banfield and Raftery (1993), the C index, and the determinant ratio index, as implemented in the R package clusterCrit (referring to TABLE 2). The Ball-Hall index is the mean of the dispersion through all of the clusters, equivalent to the mean of the squared distances of the points of the cluster with respect to its center. In the data, the Ball-Hall index is correlated ($\rho_{spearman}$=0.95) with the mean cluster extent, CE. The Banfield-Raftery index is the weighted sum of the logarithms of the mean cluster dispersion, which in the data correlates with $N^{cluster}$ ($\rho_{spearman}$=0.95). Similarity is observed among several of the various scores (referring to FIG. 14), including overall trending of some clustering indices to simpler measures such as $N^{cluster}$ and TIL fraction. The C index is derived from pairwise distances and does not scale with any of the simpler measures. Specific values of these scores for the four cases depicted in FIGS. 12A-12D are shown in TABLE 4 (shown below FIGS. 12A-12D).

Clustering indices vary widely over slides, as illustrated in FIG. 13A for the Ball-Hall index. Tumors with relatively high values of this index, such as BRCA and PRAD, are not among those with highest overall infiltrate (referring to FIG. 10A; Panel A). Since the Ball-Hall index scales with approximately cluster extent, this implies that, in some of these tumor types of moderate infiltrate mass, TIL clusters of relatively large spatial extent are formed. In summary, this implies that, in some tumor types, local clustering of TILs may be a more distinctive feature than overall TIL infiltrate, in comparison with other tumor types.

Shown in FIGS. 13A-D, are the Associations of TIL Local Spatial Structure with Cancer Type and Survival. Associations are shown with respective cluster indices, which summarize properties of clusters derived from affinity propagation clusters of the TIL map—properties that provide details on local structure beyond simple densities.

In FIG. 13A, shown are the Ball-Hall cluster indices for all slide images considered in the study. The Ball-Hall index is a particular clustering index, summarizing the mean, through all the clusters, of their mean dispersion and is equivalent to the mean of the squared distances of the points of the cluster with respect to its center. In the data, the Ball-Hall index is correlated ($\rho_{spearman}$=0.95) with the mean cluster extent, CE.

FIG. 13B provides a Table of significant associations between TIL fraction-adjusted cluster indices and overall survival based on Cox regression, accounting for age and gender as additional clinical covariates.

Graphical representation in FIG. 13C, provides overall survival for median-stratified TIL fraction-adjusted Ball-Hall index in breast cancer. Significance test p value is shown in the lower left of the FIG. 13C.

Figure 14:
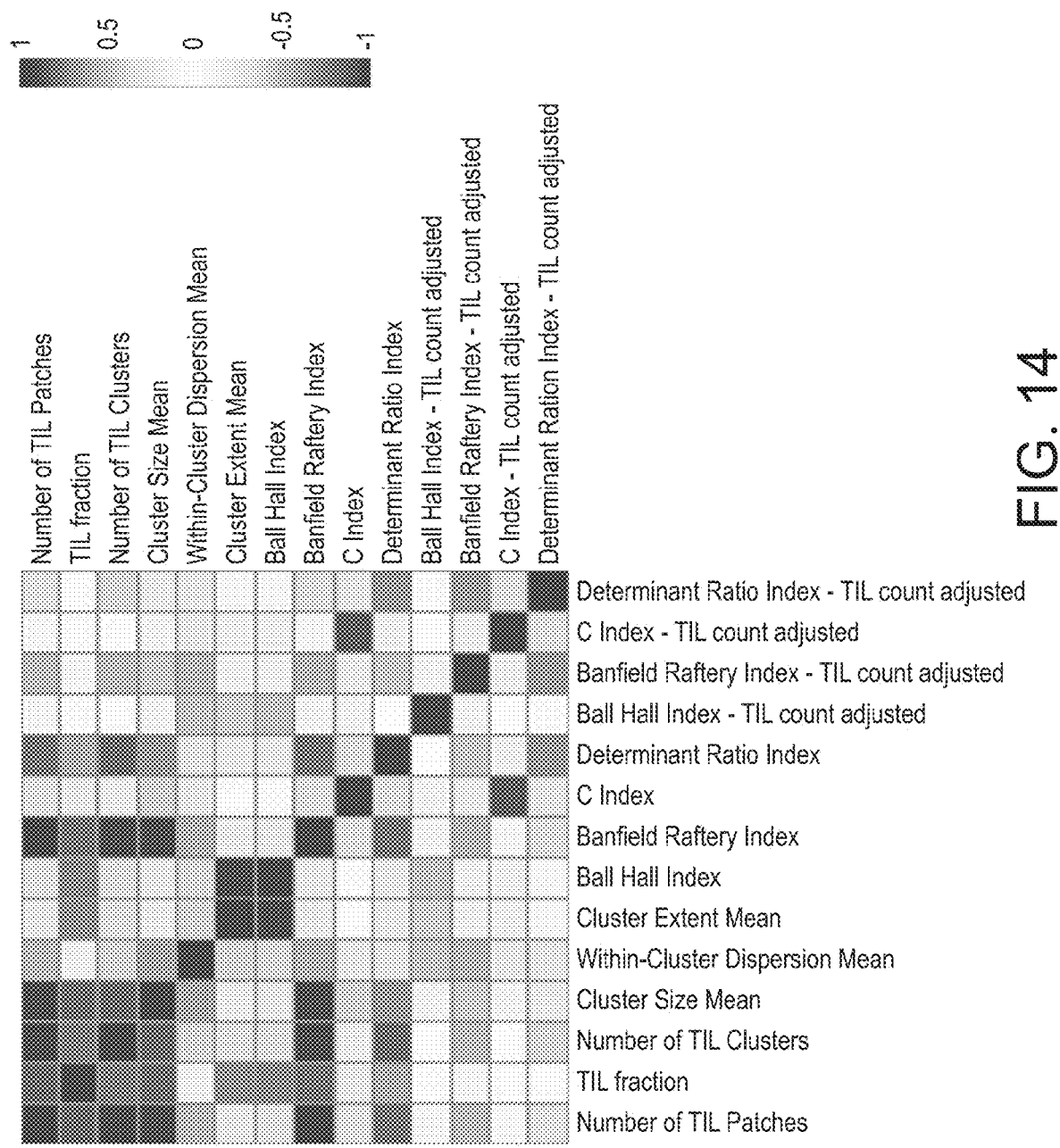
FIG. 14 provides a graphical representation of relation among scores of local spatial structure of the tumor immune with infiltrate Pearson correlation coefficients relating each cluster characterization to all others, in accordance with an embodiment of the disclosed system and method.

In FIG. 13D, shown is a graphical representation similar to FIG. 13C, but for adjusted Banfield-Raftery index in skin cutaneous melanoma. The Banfield-Raftery index is the weighted sum of the logarithms of the mean cluster dispersion and, in the data, often correlates with the number of clusters. Referring also to related FIG. 14, shown is a graphical representation of relation among scores of local spatial structure of the tumor immune with infiltrate Pearson correlation coefficients relating each cluster characterization to all others. The colorbar (or gradient grey scale in black and white versions) shows the correlation coefficient value.

Also analyzed was the extent to which TIL fraction might impact overall survival and the extent to which spatial characteristics of the tumor microenvironment—beyond overall densities—may provide additional predictive power of outcome. Implemented was Cox regression, accounting for age and gender as additional clinical covariates to perform survival analysis. In order to mitigate possible problems in interpretation due to the inherent correlation between some clustering indices and the TIL densities, linear regression was implemented to obtain adjusted cluster indices by computing residuals with respect to TIL density. In particular, $\rho$ values were obtained for four adjusted indices and 13 tumor types, which were then adjusted for multiple testing using the Benjamini-Hochberg procedure. Five associations between cluster index and outcome were significant (at $\rho$<0.05) and are shown in the Table shown in FIG. B. Interestingly, the various indices were significant across different tumor types.

Examples of Kaplan-Meier curves for median-split clustering indices are shown in FIGS. 13C (BRCA) and 13D (SKCM). In SKCM, increased Banfield Raftery-index ("cluster count") associates with superior survival, while in BRCA increased Ball-Hall index ("cluster extent") associates with inferior survival, both adjusted for overall TIL density. Of interest, checkpoint inhibition immunotherapy has been successfully applied to melanoma, while breast cancer tumors have generally been unresponsive to checkpoint blockade therapy. The association of structure with survival, as evidenced by less favorable survival in tumors with elevated adjusted Ball-Hall index ("cluster extent") could be worthy of further investigation as a stratification factor for patient tumors in clinical studies of response.

The Characterization of the Overall TIL Map Structural Patterns and Association with Molecular Estimates was also analyzed. Undertaken was further characterization of TIL spatial structure, looking beyond local spatial structures toward a global structure classification that reflects standard descriptions in current use by practicing pathologists. Incorporated was qualitative and semiquantitative descriptions and scoring of the TIL map structural patterns in the combined intra-tumoral and peri-tumoral regions (collectively referred to as "tumor") that are grossly defined by the corresponding H&E-stained whole-slide images.

As seen in the recommendations from the International TILs Working Group (Salgado et al., 2015), International Immuno-Oncology Biomarkers Working Group (Hendry et al., 2017a, 2017b), and the prognostic descriptions used to characterize TILs in cutaneous melanoma (Crowson et al., 2006), pathologists classify patterns within the TIL maps in both the intratumoral and peritumoral regions. Correspondingly, patterns in the 5,202 TIL maps were visually assigned by a pathologist into one of five categories: "Brisk, diffuse" for diffusely infiltrative TILs scattered throughout at least 30% of the area of the tumor (1,856 cases); "Brisk, band-like" for immune responses forming band-like boundaries bordering the tumor at its periphery (1,185); "Non-brisk, multi-focal" for loosely scattered TILs present in less than 30% but more than 5% of the area of the tumor (1,083); "Non-brisk, focal" for TILs scattered throughout less than 5% but greater than 1% of the area of the tumor (874); and finally "None" in 143 cases where few TILs were present involving 1% or less of the area of the tumor.

In addition, TIL maps with corresponding H&E images with insufficient or no grossly identifiable tumor at low magnification were designated as indeterminate. The examples in FIGS. 12A-12D are categorized as follows: FIG. 12A, TCGA-33-AASL Brisk, diffuse pattern in a case of squamous cell carcinoma of the lung showing a relatively strong immune infiltrate within the tumor; FIG. 12B, TCGA-D3-A2JF Brisk, band-like pattern in a case of cutaneous melanoma showing immune infiltrates forming boundaries bordering the tumor at its periphery and <30% TILs in the intra-tumoral component; FIG. 12C, TCGA-E9-A22H Non-brisk, multi-focal pattern in a case of invasive ductal carcinoma of the breast showing a weak immune response with loosely scattered TILs; FIG. 12D, TCGA-EW-A1OX Non-brisk, focal pattern in a case of invasive ductal carcinoma of the breast showing a very weak immune response in a focal area (categories are also listed in final column of TABLE 4).

FIGS. 14A-B show an association of Spatial Structural Patterns with Tumor Type and Cell Fractions. Each row corresponds to one of four spatial structure patterns, assigned in a manner consistent with the descriptions currently used to characterize the nature of the immune infiltrate in standard histopathological examinations, and each column is a TCGA tumor type. The values shown are the sample count for each tumor type and spatial structure pattern, divided by the counts expected by chance. The ratio of observed to expected co-membership counts is shown on a color scale, where the largest ratios are in red (R labeled boxes), values near unity as yellow (lighter shaded areas (coded Y), and blue represents fewer than expected counts (coded B—darkest shaded areas).

In FIG. 14B, estimates of the proportion of CD4, CD8, NK cells, and B cells were segregated by spatial structure patterns and averaged. Bars show the proportion within each structural pattern. These proportions are estimated using molecular data of the TCGA. FIGS. 15A-C as described further hereinbelow are related.

It is observed that the TIL map global patterns are not distributed in an equal manner among TCGA tumor types. FIG. 14A shows the ratio of observed counts over those expected randomly. BRCA is enriched in the "Non-brisk, focal" phenotype (374 observed; 166 expected; p value $<3\times10^{-16}$, Fisher's exact test, Benjamini-Hochberg adjusted). PAAD is enriched in the "Non-brisk, multi focal" phenotype (70 observed; 36 expected; $p=8\times10^{-8}$), as is PRAD (151; 70; $p<3\times10^{-16}$). The "Brisk, band-like" phenotype is most enriched in SKCM (134; 86; $3\times10^{-7}$) and very rare in PAAD (7; 37; $2\times10^{-9}$) and PRAD, whereas "Brisk, diffuse" is more prevalent in STAD, READ, and CESC ($p=2\times10^{-13}$, $4\times10^{-6}$, and $3\times10^{-10}$, respectively). Some TCGA subtypes also show enrichment in particular patterns (referring to FIG. 15A). For example, EBV-positive GI cancers are enriched in the "Brisk, diffuse" phenotype (14; 5; $6\times10^{-3}$). Differences are also seen among immune subtypes (referring to FIG. 15B) defined in the TCGA pan-immune analysis (Thorsson et al., 2018), where the C4 subtype is enriched in the "Non-brisk, focal" (82; 44; $6\times10^{-8}$). This is noteworthy, as subtype C4 is relatively richer in cells of the monocyte/macrophage lineage, which may play a role in sculpting the TME as evidenced in these patterns. Interestingly, the immune subtype C3, which tends to have good prognosis overall, has relatively few "Brisk band-like" structures (59; 162; $<3\times10^{-16}$), perhaps reflective of the more moderate and tempered immune response or productive infiltration of lymphocytes into tumor regions. C2, which has relatively poor outcome, is somewhat richer in "Brisk" phenotypes, consistent with expectations that the relatively large degree of lymphocytic infiltrates are not adequately controlling tumor growth in this class of tumors.

FIGS. 15A-C(also related to FIGS. 14A-C) provide a graphical representation of enrichment of TIL Structural Patterns, in particular the enrichment of structural patterns among TCGA tumor molecular subtypes in FIG. 15A and among immune subtypes shown in FIG. 15B. The ratio of observed to expected values is shown on a color scale, where the largest ratios are in red, values near unity as yellow and lower than expected in blue. FIG. 15C shows in four (4) graphical representations, the distribution of scores for cellular fraction of TIL from molecular estimates, segregated by TIL structural pattern.

In summary, the global structural patterns show associations with distinct immune responses that can be either particular to subtypes, or shared across multiple tumor types, and may play a role in determining the nature of the immune responses in the corresponding tumor microenvironments. Also examined was whether there was evidence of differences in the types of lymphocytes, such as signatures for CD4 T cells, CD8 T cells, B cells, and NK cells, represented in each phenotype. These cells cannot be distinguished by the H&E image analysis, but estimates of their proportions are available through analysis of the molecular data (Thorsson et al., 2018 and Method Details). Averaging these values within structural patterns, emerging relationships are apparent (referring to FIGS. 14B and 15C), where "Brisk" phenotypes have a higher proportion of CD8 T cells than those seen in the "Non-Brisk" phenotypes (mean 13.2% versus 10.7%, p value $<2.2\times10^{-16}$, Mann-Whitney-Wilcoxon test). Correspondingly, "Non-Brisk" phenotypes tend to have a slightly greater proportion of CD4 T cells (p=0.03). Thus, by combining molecular estimates of cell proportion with structural analysis of imagining data, it is observed that particular T cell subsets may play distinct roles in the formation of global structural patterns.

The scanned archival H&E archives of the TCGA are a rich but quite underutilized resource within this project. In effect, it is a largely ignored source of data that has only been manually and sporadically mined and awaits more systematic characterization using the variety of analytic tools and analyses currently available. These images have generally been used solely to ensure the correct diagnosis, and panels of expert pathologists also used the images to glean other variables such as mitotic activity, tumor grade, and histologic subtypes for some of the TCGA marker papers. The recently published sarcoma TCGA marker paper utilized automated feature extraction of nuclear properties for correlation with copy number load and genomic doubling (Cancer Genome Atlas Research Network, 2017). The cutaneous melanoma TCGA marker paper used a visual inspection of expert pathologists to assess the degree and pattern of lymphocytes in the frozen section images of the tissue going to the molecular platforms to correlate with other genomic and proteomic assessments of lymphocytic infiltrate and also directly with clinical outcome (Cancer Genome Atlas Network, 2015). This was a fully manual process done by expert pathologists, and there was no attempt at automation. The efforts the presently disclosed embodiments of the TIL quantification system and method, represents progress towards systematically employ automated image processing to assess lymphocytic infiltrates across multiple TCGA tumor types for correlation with genomic and epi-genomic assessments of lymphocytic infiltrates, as well as clinical outcome. This novel progress at automation of image process to assess TILs across multiple TCGA tumor types for correlation with genomic and epi-genomic assessments of lymphocytic infiltrates, as well as clinical outcome, does implement the remarkable TCGA resource of associated scanned histologic images and will spur others to similar streamlined approaches.

The disclosed TIL quantification system and method comprises a scalable and cost-effective methodology for computational staining to extract and characterize lymphocytes and lymphocytic infiltrates in intra-tumoral, peri-tumoral, and adjacent stromal regions. In comparing TIL fractions identified via molecular methods to TIL maps derived from digital image analyses of H&E images, good agreement was certainly observed. Several factors may be contributing to any shortcomings. First, perfect agreement is not expected, since the estimates being compared are not of the same quantity or source. Indeed, the molecular estimates are analogous to cell count ratios, and the image fractions correspond to the proportion of spatial areas that contain TILs. Second, the exact spatial relation between the sample from which the molecular data is extracted (between the so-called frozen tissue top-section and bottom-section) and the diagnostic images from the FFPE examples used to generate the diagnostic H&E slides is not known. The TIL maps are derived from high-quality scanned diagnostic FFPE H&E slides from tissue samples in an adjacent or possibly a more distant portion of the tumor relative to where the top and bottom frozen sections are sampled. The frozen section images are not of a quality that permits robust features extraction. Even though some degree of correlation is certainly expected since TIL status is often a property of the tumor as a whole, upon further evaluation, observed were regional differences in a subset of samples within the overall assessment. These differences are largely explained by the effect of spatial TILs in non-tumor regions in the diagnostic H&E images, which appeared quite different than the spatial TILs in the frozen section samples used for molecular TIL estimates.

Integrated analysis of TIL maps and molecular data reveals patterns and associations that can improve the understanding of the tumor microenvironment, and illustrated hereinabove are some emerging relationships in this analysis. Both local patterns and overall structural patterns are differentially represented among tumor types, immune subtypes, and tumor molecular subtypes, the latter of which are typically driven by particular molecular alterations in the tumor cell compartment. This implies that the nature of spatial lymphocytic infiltrate state may be reflective of particular aberration states of tumor cells. In some tumor types (such as PAAD and PRAD), local clustering of TILs may be a more distinctive feature than overall TIL infiltrate, as compared with other tumor types.

Structural patterns are further seen to be associated with survival, implying that the nature and effectiveness of immune response is encoded in patterns that may be assessable at the time of tumor diagnosis. For example, in breast cancer, less favorable survival in tumors with elevated adjusted Ball-Hall index ("cluster extent") might be worth further investigation in terms of stratification of patient tumors in clinical studies of response. Overall structural patterns show associations with immune responses that are shared across multiple tumor types and may thus play a role in the determining the nature of those responses. For example, tumors with C2 immune subtypes, which tend to have relatively poor outcome, are somewhat richer in "Brisk" phenotypes, consistent with expectations that the relatively large degree of lymphocytic infiltrates are not adequately controlling tumor growth in these tissues. The immune subtype C3, which tends to have good prognosis overall, has fewer "Brisk band-like" structures, perhaps reflective of the more moderate and tempered immune response, or productive infiltration of lymphocytes into tumor regions. In contrast, tumors with the C4 immune subtype, which tends to be rich in cells of the monocyte/macrophage lineage, tend to have more "Non-brisk, focal" structures that may play a role in sculpting the TME as evidenced in these patterns. Finally, these patterns are enriched in particular T cell subpopulations as derived from molecular measures. For example, "Brisk" phenotypes have a higher proportion of CD8 T cells than those seen in the "Non-Brisk" phenotypes.

A number of factors can contribute to cancer patient outcome. In the evaluation of various implementations of the disclosed system and method, it was attempted to control for age and sex, but other factors such as tumor grade could affect the presence or function of tumor-infiltrating lymphocytes. Grade is more challenging to control for across tumor types, as some are not graded such as melanoma, while others such as breast and prostate cancer have very different grading systems that are challenging to compare rigorously. Tumor grade and potentially other factors could influence lymphocytic infiltrates in both degree and pattern.

These analyses and early results demonstrate the vast potential of combining analysis of spatial structure with advanced genomics and molecular assessment, as the TIL information is being provided in the context of tumor molecular data wide in detail and in scope. The TCGA molecular datasets and the characterizations performed on them through the work of the PanCancer Atlas consortium, including those on the tumor-immune interface and the tumor microenvironment, provide an extraordinarily rich source of correlative molecular information for the disclosed generated TIL patterns.

H&E imaging is performed routinely in labs throughout the world as a component of tumor diagnostics. Methods for extracting information on TILs from H&E scanned images are potentially of enormous research validity and possible clinical applicability—hundreds of thousands of whole-slide images exist in public repositories, in hospital system databases, and many more will be generated for years to come. In a clinical setting, rapid and automated identification of the degree and nature of TIL infiltrate will be instrumental in determining whether options for immunotherapy should be explored or whether more detailed and costly immune diagnostics should be introduced. Indeed, the disclosed system and method might also complement immunophenotyping data, and the patterns of immune infiltration assessed by pathologists are already widely employed in the standard clinical reports of primary melanomas as a prognostic factor. Applying methods like those presented herein could also allow for very incisive research at very reasonable price points and levels of convenience. These kinds of analyses can only improve with more detailed molecular-marker-based assays such as immunohistochemistry, which are not currently applied in most standard clinical settings due to lack of clinical necessity. Since the TCGA cohorts often predate the broad clinical application of effective immunotherapy such as checkpoint inhibitors and contain little data regarding outcomes with such therapy, association of the disclosed TIL estimates generated herein, and derived infiltration patterns, await even more appropriate datasets to test associations.

The CNN-derived TIL mapping system and method provides a reproducible and robust tool for the assessment of these lymphocytic infiltrates. The ability to assess this tumor feature is rapidly becoming vital to both clinical diagnosis and translational research for onco-immunologic cancer care. These results show that this approach correlates with molecular assessments of TILs generated by the molecular platforms of the TCGA and can also correlate with clinical outcome for certain tumor types. More importantly, these evaluations of implementations of the disclosed system and method, shows the value of feature extraction from the information-rich resource of the scanned H&E image archive of the TCGA. This resource has not been exploited to the degree of the other TCGA molecular and clinical outcome resource and clearly not to the degree it can support. This present disclosure and evaluation demonstrates value that can be added by careful examination of this rich resource, and it is believed that others will explore the many facets of these respective imaging data.

A list of the various TCGA Tumor Types used in this exemplary evaluation is provided hereinbelow as:
1. BLCA Bladder urothelial carcinoma
2. BRCA Breast invasive carcinoma
3. CESC Cervical squamous cell carcinoma and endocervical adenocarcinoma
4. COAD Colon adenocarcinoma
5. LUAD Lung adenocarcinoma
6. LUSC Lung squamous cell carcinoma
7. PAAD Pancreatic adenocarcinoma
8. PRAD Prostate adenocarcinoma
9. READ Rectum adenocarcinoma
10. SKCM Skin Cutaneous Melanoma
11. STAD Stomach adenocarcinoma
12. UCEC Uterine Corpus Endometrial Carcinoma
13. UVM Uveal Melanoma Image and Molecular Data Acquisition for the implementation of the disclosed system and method included whole-slide tissue images obtained from the public TCGA Data Portal (images are currently available from the Genomic Data Commons (GDC) Legacy Archive, following the deprecation of the TCGA Data Portal). The example evaluation study used the diagnostic images, with some images from frozen tissue specimens used in the analysis of discrepancies with molecular estimates. The images were downloaded in the native image format, Aperio SVS files, in which they had been scanned. An SVS file stores an image in multiple resolutions, including the highest resolution the image data was captured; for example in an image that is acquired at a 40× magnification, each pixel is ~0.25×0.25 microns. An open source library called OpenSlide (http://openslide.org/formats/aperio/) was used to extract the highest resolution image data for the example evaluation study. In such study, 5455 diagnostic slides were analyzed the 13 TCGA tumor types in the study. Clinical and molecular data were obtained from processed and quality controlled files of the PanCancer Atlas consortium, available at (https://gdc.cancer.gov/about-data/publications/pancanatlas).

In another example implementation, molecular data estimates of immune response were evaluated. In particular, estimates of tumor and immune characteristics derived and made available for example, in Thorsson (Thorsson et al., 2018) were used. The estimate of TIL fraction by genomics measurements is obtained, by multiplying overall leukocyte fraction derived from DNA methylation with an aggregated proportion of immune-cell fractions within the immune compartment estimated using for example, CIBERSORT (Newman et al., 2015). The lymphocyte fraction is an aggregation of CIBERSORT estimates of naive and memory B cells, naive, resting and activated memory CD4 T cells, follicular helper T cells, T regulatory cells, gamma-delta T cells, CD8 T cells, activated and resting NK cells and plasma cells. In order to compare these data with TIL estimates from images, participant and slide barcodes were restricted to those satisfying the inclusion criteria of the TCGA PanCancer Atlas and Immune Response Working Group. Of the 4705 cases with characterized TIL map clusters and patterns (see below), 4612 were thus available for molecular data integration and comparison (referring to TABLE 2; FIG. 1E and TABLE 3).

In yet another example implementation, Local Spatial Structure of Immune Infiltrate was evaluated. The system implemented the APCluster R package (Bodenhofer et al., 2011) to apply the affinity propagation algorithm to obtain local TIL cluster patterns. The affinity propagation approach simultaneously considers all data points as potential exemplars (i.e., the centers of clusters) from among possible data points. Treating each data point as a node in a network, the system recursively transmits real-valued messages along edges of the network until it finds a good set of exemplars and corresponding clusters. The system defined the similarities between data points (TIL patches) as the negative square Euclidean distance between them. Aside from the similarity matrix itself, a significant input parameter is the so-called "input preference" which can be interpreted as the tendency of a data sample to become an exemplar. The function apcluster in the package contains an argument q that allows setting the 'input preference' parameter to a certain quantile of the input similarities: resulting in the median for $q=0.5$ and in the minimum for $q=0$. In order to select this parameter, the system generated synthetic data points in a plane comprising two distinct Gaussian clouds of points. Using the synthetic data, it was observed that $q=0$ was able to cluster these points into two clusters, and this value was used by the system for identifying TIL clusters. Of the 5202 TIL maps, 5144 clustering results were generated (referring also to FIG. 1E and TABLE 3), with the remainder failing to complete clustering runs in time or failing due to memory errors, mostly in slides with numerous TILs.

Cluster characterization was made using simple measures of counts and membership and cluster indices from the R package clusterCrit. The Ball-Hall, Banfield-Raftery, C Index, and Determinant Ration indices were also implemented. In the above, $WGSS^k$ is a within-cluster dispersion which is the sum of the squared distances between the observations and the barycenter of the cluster (see for example: https://CRAN.R-project.org/package=clusterCrit) for details. In order to compute the adjusted indices, linear regression was used to model the relationship between the clustering index and the % TIL density. The regression residual was used as the adjusted index. Cluster characteristics were generated for all 5144 slides with cluster results (4705 with DX1 suffix)(referring to FIG. 1E and TABLE 3) and adjusted indices for 4509 cases.

In yet another example implementation and respective evaluation of results, evaluation of CNN training and testing is described hereinbelow. The system trains the CAE on the unlabeled dataset, minimizing the pixel-wise root mean squared error between the input images and the reconstructed images. No regularization loss is deployed. The system implements stochastic gradient descent with batch size 32, learning rate 0.03 and momentum 0.9, and train the network until convergence (6 epochs).

Furthermore, for the lymphocyte CNN (constructed from the CAE) training, the system implements stochastic gradient descent with batch size 100, learning rate 0.001, and momentum 0.985. The CNN was trained until convergence (64 epochs) and the system divided the learning rate by 10 at the 20th, 32th, and 52th epoch. The system implements sigmoid as the nonlinearity function in the last layer and log-likelihood as the loss function. No regularization loss is deployed. Next, applied were three types of data augmentation. First, the input images are randomly cropped from a larger image. Second, the colors of the input images are randomly perturbed. Third, the system randomly rotate and mirror the input images. Hence, the system trained the CAE and CNN on a single Tesla K40 GPU. During testing phase, the system augmented the test patch 24 times and averaged the prediction results. The CAE and CNN used in the example implementation, the Theano library (http://deep-learning.net/software/theano/).

Next, the system implements CNN-VGG and a Comparison of Experiment results was performed. The VGG 16-layer network was fine-tuned, which was pre-trained on ImageNet. Fine-tuning the VGG16 network has been shown to be robust for pathology image classification (Xu et.al. 2015; Hou et al., 2016b). Next, the system used stochastic gradient descent with batch size 32, learning rate 0.0001, and momentum 0.985. The lymphocyte CNN was trained until convergence (32 epochs). The same loss function and data augmentation method was used for the proposed CNN. In order to match the input size of the VGG16 network, the system re-sized the input patches from 100 ×100 pixels to 224 ×224 pixels. Similar to the proposed CNN, during testing phase, the system augmented the test patch 24 times and averaged the prediction results.

A total of 4612 participants were included in evaluation studies. The evaluation contained both males and females, with inclusions of genders dependent on tumor types. There were 2655 females and 1957 males. TCGA's goal was to characterize adult human tumors; therefore, the vast majority of participants were over the age of 18. However, one participant under the age of 18 had tissue submitted prior to clinical data. Age was missing for 40 participants. The range of ages was 15-90 (maximum set to 90 for protection of human subjects) with a median age of diagnosis of 63 years of age. Institutional review boards at each tissue source site reviewed protocols and consent documentation and approved submission of cases to TCGA. Detailed clinical, pathologic and molecular characterization of these participants, as well as inclusion criteria and quality control procedures have been previously published for each of the individual TGCA cancer types.

Sample Inclusion Criteria is also described for the evaluation studies. Surgical resection of biopsy bio-specimens were collected from patients that had not received prior treatment for their disease (ablation, chemotherapy, or radiotherapy). Institutional review boards at each tissue source site reviewed protocols and consent documentation and approved submission of cases to TCGA. Cases were staged according to the American Joint Committee on Cancer (AJCC). Each frozen primary tumor specimen had a companion normal tissue specimen (blood or blood components, including DNA extracted at the tissue source site). Adjacent tissue was submitted for some cases. Specimens were shipped overnight using a cryoport that maintained an average temperature of less than −180° C.

Pathology quality control was performed on each tumor and normal tissue (if available) specimen from either a frozen section slide prepared by the BCR or from a frozen section slide prepared by the Tissue Source Site (TSS). Hematoxylin and eosin (H&E) stained sections from each sample were subjected to independent pathology review to confirm that the tumor specimen was histologically consistent with the allowable hepatocellular carcinomas and the adjacent tissue specimen contained no tumor cells. Adjacent tissue with cirrhotic changes was not acceptable as a germ-line control, but was characterized if accompanied by DNA from a patient-matched blood specimen. The percent tumor nuclei, percent necrosis, and other pathology annotations were also assessed. Tumor samples with R 60% tumor nuclei and % 20% or less necrosis were submitted for nucleic acid extraction.

The CAEs in all three classification experiments described hereinabove are trained on the unlabeled dataset with the same architecture illustrated in FIG. 2B and TABLE 1. It is noted that the system applied batch normalization before the leaky ReLU activation functions in all layers. The average nucleus size in the dataset for nucleus segmentation experiments described hereinabove is approximately 20 ×20 pixels. Therefore, pooling layers can discard important spatial information which is important for pixel-wise segmentation. The U-net addresses this issue by adding skip connections.

However, in practice that eliminating pooling layers completely yields better performance. The computation complexity is very high for a network without any pooling layers. Thus, compared to TABLE 1, smaller input dimensions (40×40) and fewer (80 to 200) feature maps in the CAE were implemented. Other settings of the CAE for segmentation remain unchanged.

An example CNN Architecture evaluation involved constructing supervised CNNs based on trained CAEs. For classification tasks, the supervised CNN contain Parts 1-6 of the CAE (referring to FIG. 2B). The system initialized the parameters in these layers to be the same as the parameters in the CAE. Attached were four 1 ×1 convolutional layers after the foreground encoding layer and two 3 ×3 convolutional layers after the background encoding layer. Each added layer included 320 convolutional filters. Next, applied were global average pooling on the two branches. The pooled features are then concatenated together, followed by a final classification layer with sigmoid activation function.

In addition, for the segmentation task, the supervised CNN only contained Parts 1, 3 of the CAE (referring to FIG. 2B). Attached were six 3 ×3 convolutional layers followed by a segmentation layer. The segmentation layer is the same to the patch-CNN's segmentation layer which is a fully-connected layer with sigmoid activation function followed by reshaping. For all tasks, the system randomly initialized the parameters of these additional layers. The system trained the parameters of the added layers until convergence before fine-tuning the whole network.

The system trained the CAE on the unlabeled dataset, minimizing the pixel-wise root mean squared error between the input images and the reconstructed images. Implemented was stochastic gradient descent with batch size 32, learning rate 0.03 and momentum 0.9. The loss converges after 6 epochs. Randomly selected examples of the nucleus detection feature map are shown as well as the reconstructed foreground and background images in FIG. 4A.

For the CNN (constructed from the CAE) training, implemented was stochastic gradient descent with batch size, learning rate, and momentum was selected for each task independently. For all tasks, the system divided the learning rate by 10 when the error plateaued. In addition, sigmoid was used as the nonlinearity function in the last layer and log-likelihood as the loss function. Applied were three types of data augmentation. First, the input images are randomly cropped from a larger image. Second, the colors of the input images are randomly perturbed. Third, the system randomly rotate and mirror the input images. During testing, the predictions of 25 image crops were averaged. Implemented was the CAE and CNN using Theano. Hence, the CAE and CNN was trained on a single Tesla K40 GPU.

Additional methods and evaluations are described hereinbelow (abbreviated as CSP-CNN) and other tested methods described below:

CSP-CNN—CNN initialized by the crosswise sparse CAE shown in FIG. 2B. The exact CNN construction is described hereinabove in connection with FIG. 2B. The sparsity rate was set to 1.6%, such that the number of activated foreground feature map locations roughly equals to the average number of nuclei per image in the unsupervised training set.

SUP-CNN—A fully supervised CNN. Its architecture is similar to the CSP-CNN described hereinabove except that: 1). There is no background representation branch (no Part 4, 8 shown in FIG. 2B; 2). There is no nucleus detection branch (no Part 2, 5 shown in FIG. 2B). The SUP-CNN has a very standard architecture, but at the same time is similar to the CSP-CNN.

U-NET—Implemented was the U-net architecture and implementation for nucleus segmentation. Tested were five U-nets with the same architecture but different number of feature maps per layer and select the best performing network. All five U-nets perform similarly.

DEN-CNN—CNN initialized by a conventional Convolutional Autoencoder (CAE) without the sparsity constraint. Its architecture is similar to the CSP-CNN except that it there is no nucleus detection branch. In particular, there is no Part 2 and Part 5 as shown in FIG. 2B and Part 6 is an identity mapping layer SP-CNN—CNN initialized by a sparse CAE without the crosswise constraint. Its architecture is similar to the CSP-CNN except that it has no nucleus detection branch and uses the conventional sparsity constraint defined by Equation (1) hereinabove. In particular, there is no Part 2 and Part 5 as shown in FIG. 2B. Part 6 is a thresholding layer: and its input defined as D', its output D=ReLU(D'−t), where t is obtained in and the same way as defined by Equation (7) hereinabove. The sparsity rate is set to 1.6% which equals to the rate implemented in CSP-CNN.

VGG16—The VGG 16-layer network was fine-tuned, which is pretrained on ImageNet. Fine-tuning the VGG16 network has been shown to be robust for pathology image classification.

Shown in TABLE 7 hereinbelow is a table of Classification results measured by AUROC on the classifying regions modules, described hereinbelow. The CSP-CNN outperforms the other methods significantly. Comparing the results of SP-CNN and the CSP-CNN, the example crosswise constraint boosts performance significantly. Even with only 5% labeled training data, the CSP-CNN (5% data) outperforms other methods on the first two datasets. The CSP-CNN (5% data) fails on the third dataset because when only using 5% of the training data, 5 out of 15 classes have less than 2 positive training instances which are too few for CNN training, which the CAE is capable of unsupervised nucleus detection. This result further supports the claim that the crosswise sparsity is essential to high performance.

TABLE 7

| Methods | Datasets | | |
|---|---|---|---|
| | Lym-region | Individual Lym | Nuclear Attr &Shape |
| SUP-CNN | 0.6985 | 0.4936 | 0.8487 |
| DEN-CNN | 0.8764 | 0.5576 | 0.8656 |
| SP-CNN | 0.9188 | 0.6262 | 0.8737 |
| CSP-CNN | 0.9526 | 0.7856 | 0.8788 |
| CSP-CNN (5% data) | 0.9215 | 0.7135 | 0.7128 |
| Unsupervised Features [37] | — | 0.7132 | — |
| Semi-supervised CNN [20] | — | — | 0.8570 |
| VGG16 [29] | 0.9176 | 0.6925 | 0.8480 |

Classifying Lymphocyte-rich Regions—The evaluation implemented 20,876 images as the training set and the remaining 2,480 images as a testing set. The Area Under ROC Curve (AUROC) was used as the evaluation metric. The results are shown in Table 7 hereinabove. The CSP-CNN achieves the best result on this dataset. The CSP-CNN reduces the error of the best performing baseline SP-CNN by 42%. Furthermore, with only 5% of the training data, the CSP-CNN (5% data) outperforms SP-CNN. The only difference between CSP-CNN and SP-CNN is the crosswise constraint, with which the CAE is capable of unsupervised nucleus detection. This supports the claim that the crosswise sparsity is essential to high performance.

Classifying Individual Lymphocytes—This evaluation compared the disclosed method with an existing unsupervised nucleus detection and feature extraction method. The training and test images were split 4 times and the results averaged. As the baseline method, a recently published unsupervised nucleus detection and feature extraction method was fine-tuned, based on level sets. In addition, applied was a multi-layer neural network on top of the extracted features. It is noted that the feature extraction step and the classification step are tuned separately in the baseline method, whereas the CSP-CNN method can be trained end-to-end. The results are shown in TABLE 7. It is concluded that the CSP-CNN reduced the error of the SP-CNN by 25%.

Nuclear Shape and Attribute Classification—Adopted was the same 5-fold training and testing data separation protocol and report the results in TABLE 7. On this dataset the improvement of the disclosed example method over the state-of-the-art is less significant than the improvement on other datasets because the images of nuclei are results of a fixed nucleus detection method which were not fine-tuned with the proposed method Nucleus Segmentation—implemented was a sliding window approach to train and test the CNNs. A CNN outputs a feature map of the same size as its input. During the evaluation, the standard metric used in the MICCAI challenged was followed: the DICE-average (average of two different versions of the DICE coefficient). The results are shown in TABLE 8 hereinbelow. The proposed method achieves a significantly higher score than that of the challenge winner and U-net. Because the size of nuclei are only around 20 ×20 pixels, eliminated were the network's pooling layers to preserve spatial information. It is concluded that this is an important reason the disclosed method outperforms U-net. Randomly selected segmentation examples are shown in FIG. 6A.

Shown in TABLE 8 hereinbelow are Nucleus segmentation results on the MICCAI 2015 nucleus segmentation challenge dataset. The CSP-CNN outperforms the highest challenge score which is a DICE-average of 0.80, even with only 5% of the sliding windows during training. On this dataset pooling layers are not used in the networks, because it was determined that pooling layers discard important spatial information, since the size of nuclei are only around 20 ×20 pixels.

TABLE 8

| Methods | DICE-average |
|---|---|
| SUP-CNN | 0.8216 |
| DEN-CNN | 0.8235 |
| SP-CNN | 0.8338 |
| CSP-CNN | 0.8362 |
| CSP-CNN (5% data) | 0.8205 |
| Challenger winner [6] | 0.80 |
| U-net [26] | 0.7942 |

Figure 17:
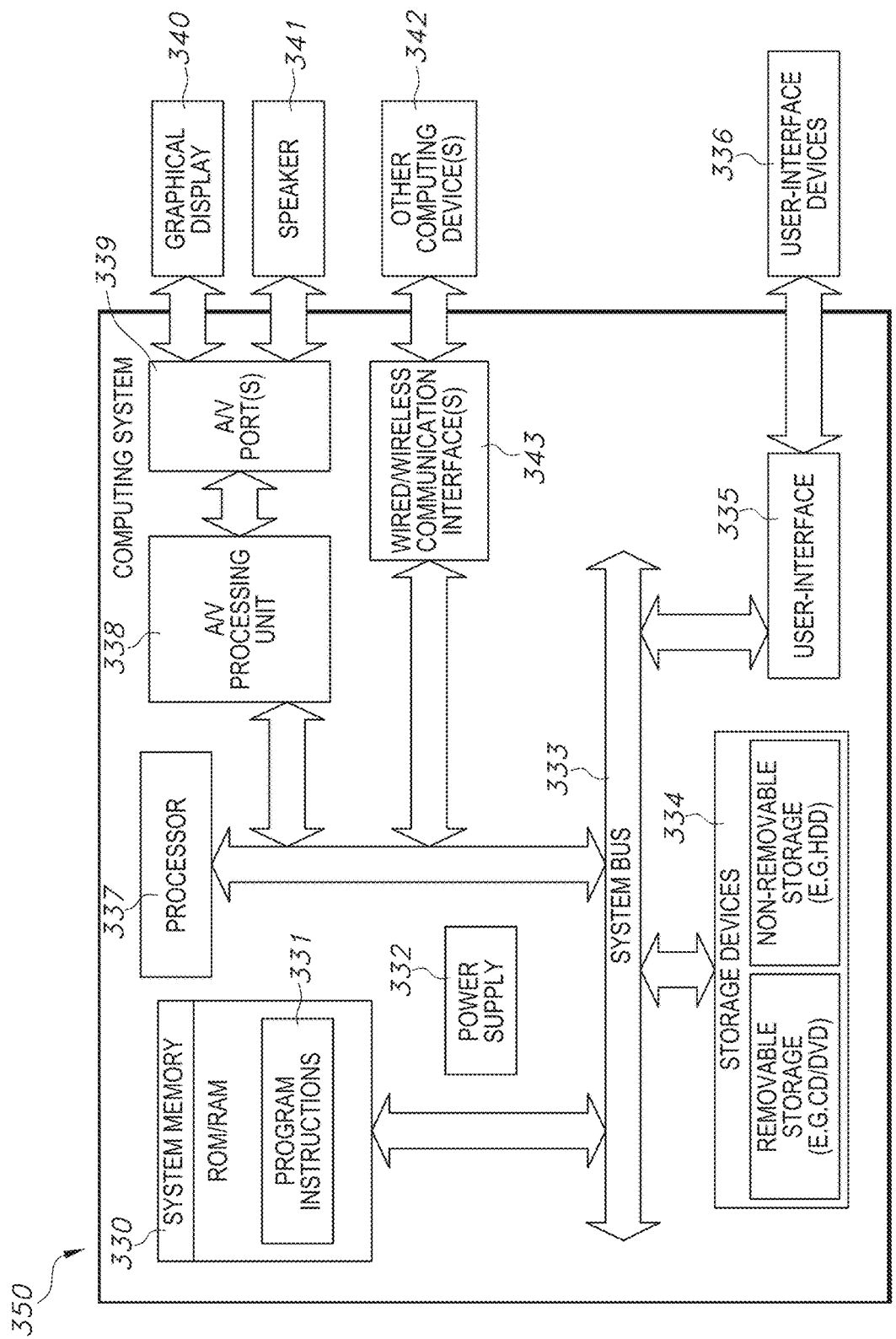
FIG. 17 illustrates a system block diagram in accordance with an embodiment of the quality assessment of segmentation system, including an example computing system.

Shown in FIG. 17 is computing system 350 which may include at least one processor 337 and system memory 330. In an example embodiment, computing system 350 may include a system bus 333 that communicatively connects processor 337 and system memory 330, as well as other components of computing system 350. Depending on the desired configuration, processor 337 can be any type of processor including, but not limited to, a microprocessor (µP), a microcontroller (µC), a digital signal processor (DSP), or any combination thereof. Furthermore, system memory 330 can be of any type of memory now known or later developed including but not limited to volatile memory (such as RAM), non-volatile memory (such as ROM, flash memory, etc.) or any combination thereof.

An example computing system 350 may include various other components as well. For example, computing system 350 includes an A/V processing unit 338 for controlling graphical display 340 and speaker 341 (via A/V port 339), one or more communication interfaces 343 for connecting to other computing systems 342, and a power supply 332. Graphical display 340 may be arranged to provide a visual depiction of various input regions provided by user-interface module 335. For example, user-interface module 335 may be configured to provide a user-interface and graphical display 340 may be configured to provide a visual depiction of the user-interface.

Figure 18:
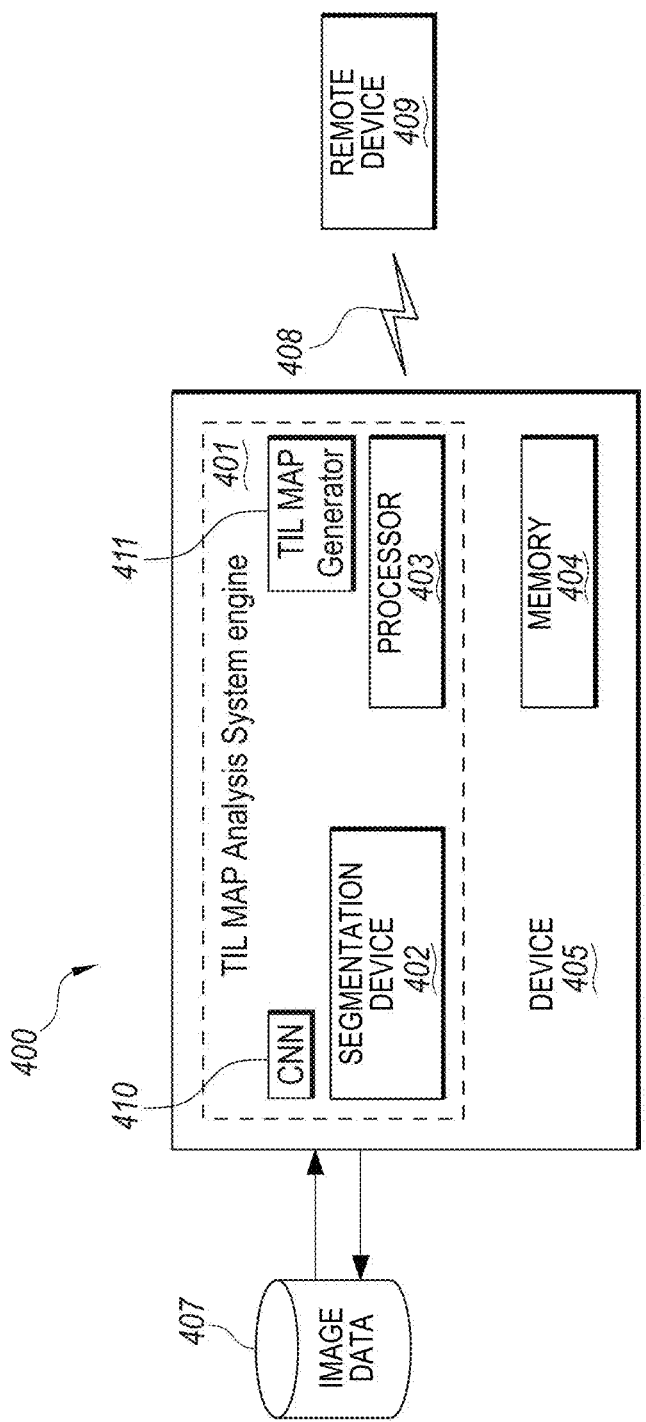
FIG. 18 illustrates a system block diagram including an example computer network infrastructure in accordance with an embodiment of the TIL Map analysis system engine.

FIG. 18 is a simplified block diagram illustrating example components of an example computing system, according to an exemplary embodiment. One or both of the devices 405 and the remote device 409 of FIG. 18, may take the form for example, of computing system 350 shown in FIG. 17. In particular, FIG. 18 illustrates a simplified block diagram illustrating an example computer network infrastructure, according to an exemplary embodiment. In system 400, in certain embodiments device 405, communicates using a communication link 408 (e.g., a wired or wireless connection) to a remote device 409. The device 405 may be any type of device that can receive data and display information corresponding to or associated with the data. For example, the device 405 may be a user computing device, a display or a TIL MAP Analysis system engine that communicates with the TIL Map Analysis system engine 401.

Thus, the device 405 may include a TIL MAP Analysis engine and/or system 401 comprising a processor 403, a CNN 410, a TIL Map generator 411, segmentation device 402, and/or a display that interfaces with stored 2D and/or 3D image datasets 407, including digitized pathology tissue slides that are computationally stained with H&E. The display may be, for example, an optical see-through display, an optical see-around display, or a video see-through display. The processor 403 may receive data from the remote device 409, and configure the data for display on the display device. The processor 403 may be any type of processor, such as a micro-processor or a digital signal processor, for example.

The device 405 may further include on-board data storage, such as memory 404 coupled to the processor 403. The memory 404 may store software that can be accessed and executed by the processor 403, for example.

The remote device 409 may be any type of computing system or transmitter including a laptop computer, a mobile telephone, or tablet computing system, etc., that is configured to transmit data to the device 405. The remote device 409 and the device 405 may contain hardware to enable the communication link 408, such as processors, transmitters, receivers, antennas, etc.

In FIG. 18, the communication link 408 is illustrated as a wireless connection; however, wired connections may also be used. For example, the communication link 408 may be a wired serial bus such as a universal serial bus or a parallel bus, among other connections. The communication link 408 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), and/or Zigbee, among other possibilities. Either of such a wired and/or wireless connection may be a proprietary connection as well. The remote device 408 may be accessible via the Internet and may include a computing cluster associated with a particular web service (e.g., social-networking, photo sharing, address book, etc.).

Figure 16:
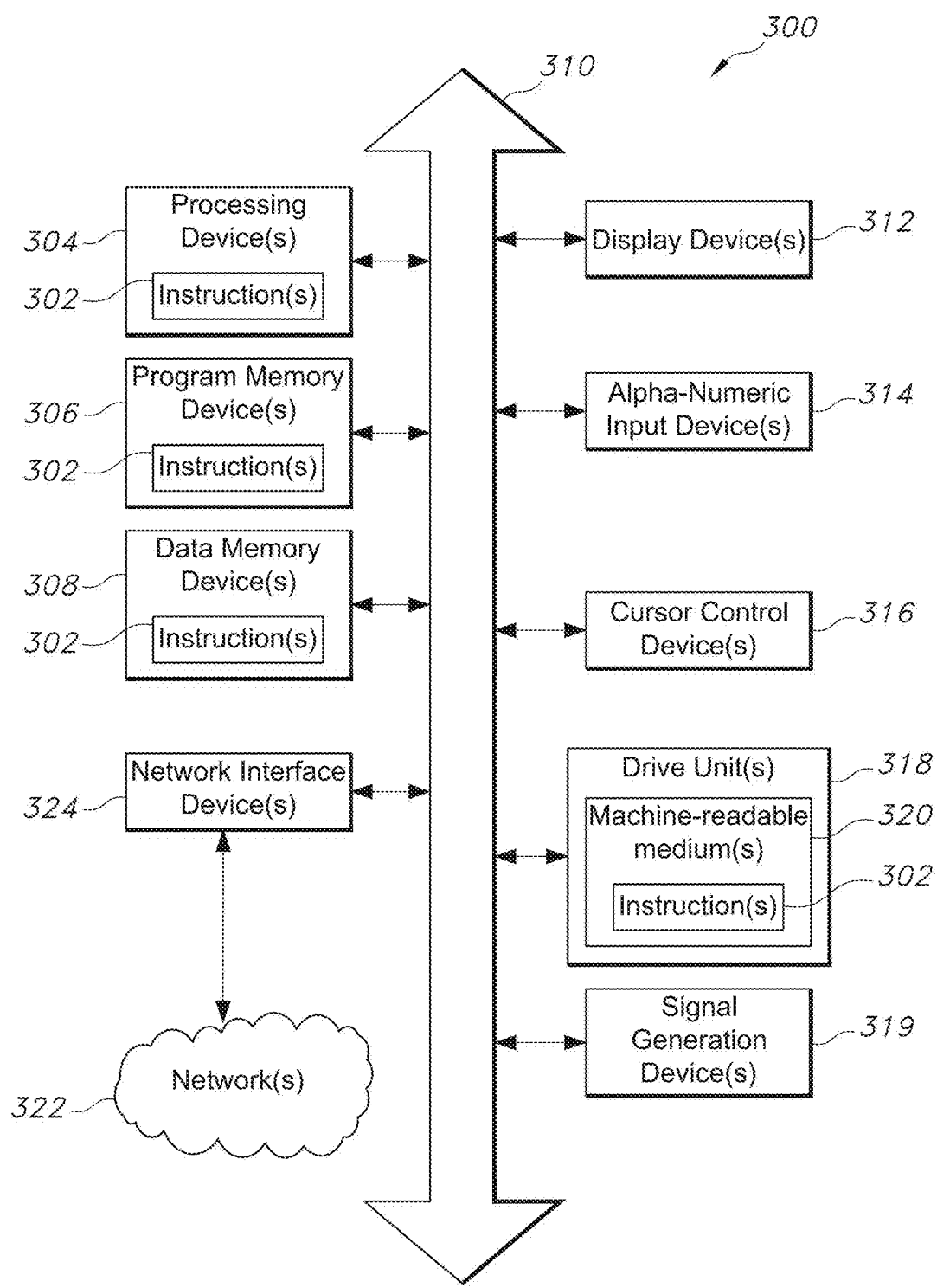
FIG. 16 is a block diagram showing a portion of an exemplary machine in the form of a computing system that performs methods according to one or more embodiments.

FIG. 16 is a block diagram of an illustrative embodiment of a general computing system 300. The computing system 300 can include a set of instructions that can be executed to cause the computing system 300 to perform any one or more of the methods or computer based functions disclosed herein. The computing system 300, or any portion thereof, may operate as a standalone device or may be connected, e.g., using a network 322 or other connection, to other computing systems or peripheral devices.

The computing system 300 may also be implemented as or incorporated into various devices, such as a personal computer (PC), a tablet PC, a personal digital assistant (PDA), a mobile device, a palmtop computer, a laptop computer, a desktop computer, a communications device, a control system, a web appliance, or any other machine capable of executing a set of instructions (sequentially or otherwise) that specify actions to be taken by that machine. Further, while a single computing system 300 is illustrated, the term "system" shall also be taken to include any collection of systems or sub-systems that individually or jointly execute a set, or multiple sets, of instructions to perform one or more computer functions.

As illustrated in FIG. 16, the computing system 300 may include a processor 304, e.g., a central processing unit (CPU), a graphics-processing unit (GPU), or both. Moreover, the computing system 300 may include a main memory and/or program memory 306 and a static memory and/or data memory 308 that can communicate with each other via a bus 310. As shown, the computing system 300 may further include a video display unit 312, such as a liquid crystal display (LCD), an organic light emitting diode (OLED), a flat panel display, a solid state display, or a cathode ray tube (CRT). Additionally, the computing system 300 may include an input device 314, such as a keyboard, and a cursor control device 316, such as a mouse. The computing system 300 can also include a disk drive unit 318, a signal generation device 319, such as a speaker or remote control, and a network interface device 324.

In a particular embodiment or aspect, as depicted in FIG. 16, the disk drive unit 318 may include a machine-readable or computer-readable medium 320 in which one or more sets of instructions 302, e.g., software, can be embedded, encoded or stored. Further, the instructions 302 may embody one or more of the methods or logic as described herein. In a particular embodiment or aspect, the instructions 302 may reside completely, or at least partially, within the main memory 306, the static memory 308, and/or within the processor 304 during execution by the computing system 300. The main memory 306 and the processor 304 also may include computer-readable media.

Figure 19:
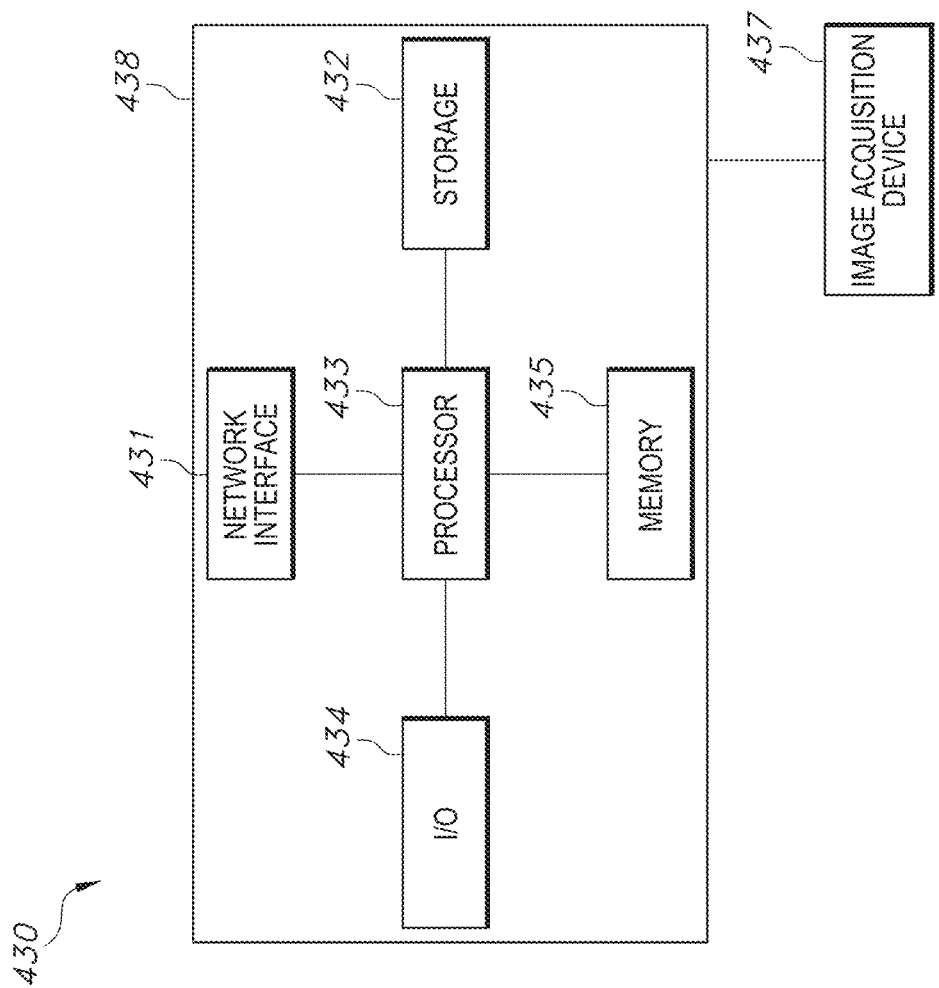
FIG. 19 illustrates a system block diagram of an exemplary computing system, in accordance with an embodiment of the TIL Map analysis system.

The above-described methods for the disclosed quality assessment of segmentation system and method may be implemented on a computer, using well-known computer processors, memory units, storage devices, computer software, and other components. A high level block diagram of such a computer is illustrated in FIG. 19. Computer or computing device 430 contains a processor 433 which controls the overall operation of the computing device 438 by executing computer program instructions which define such operation. The computer program instructions may be stored in a storage device 432 (e.g., magnetic disk) and loaded into memory 435 when execution of the computer program instructions is desired. Thus, the method steps implemented by at least the embodiments described with respect to FIGS. 1A-3D, can be defined by the computer program instructions stored in the memory 435 and/or storage 432 and controlled by the processor 433 executing the computer program instructions. For example, the computer program instructions can be implemented as computer executable code programmed by one skilled in the art to perform an algorithm defined by the method steps of FIGS. 1A-3D. Accordingly, by executing the computer program instructions, the processor 433 executes an algorithm defined by the method steps of FIGS. 1A-3D. An image acquisition device 437, such as for example, x-ray imaging device, other scanning device, Global Positioning System (GPS) or similar type of satellite images receiving device, can be connected to the computer or computing device 430 to input images to the computer or computing device 430. It is possible to implement the image acquisition device 437 and the computer or computing device 430 as one device. It is also possible that the image acquisition device 437 and the computing device 430 communicate wirelessly through a network. The computer 430 also includes one or more network interfaces 431 for communicating with other devices via a network. The computing device 430 also includes other input/output devices 434 that enable user interaction with the computing device 430 (e.g., display, keyboard, mouse, speakers, buttons, etc.). One skilled in the art will recognize that an implementation of an actual computer could contain other components as well, and that FIG. 19 is a high level representation of some of the components of such a computer for illustrative purposes. Other system configurations are contemplated for performing the TIL Map predictive analysis system and method.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computing systems. One or more embodiments or aspects described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computing system processing can be constructed to implement one or more of the methods or functionality as described herein.

It is also contemplated that a computer-readable medium includes instructions 302 or receives and executes instructions 302 responsive to a propagated signal, so that a device connected to a network 322 can communicate voice, video or data over the network 322. Further, the instructions 302 may be transmitted or received over the network 322 via the network interface device 324.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing or encoding a set of instructions for execution by a processor or that cause a computing system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture and store carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, a system and method associated with clinically processing and analyzing tumor-infiltrating lymphocytes (TILs) based on prediction, spatial analysis, molecular correlation, and reconstruction of TIL information associated with copious digitized pathology tissue images. Even more particularly, the present invention relates to a novel system and method that trains a classification model in order to predict the respective labeling of TILs associated with computationally stained and digitized whole slide images of Hematoxylin and Eosin (H&E) stained pathology specimens obtained from biopsied tissue, and spatially characterizing TIL Maps that are generated by the system and method. Such disclosed system and method may be implemented to further refine respective tumoral classification and prognosis of tumoral tissue samples.

Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" or "embodiment" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the relevant art will appreciate that aspects of the invention can be practiced with other computer system configurations, including Internet appliances, hand-held devices, cellular or mobile phones, multi-processor systems, microprocessor-based or programmable consumer electronics, network PCs, client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable and/or mobile computer and/or a fixed-location computer. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single mobile computing device, among several computers of several users, and between a mobile computer and a fixed-location computer. Data structures and transmission of data particular to aspects of the invention are also encompassed within the scope of the invention.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A system associated with quantifying a density level of tumor-infiltrating lymphocytes, based on prediction of reconstructed TIL information associated with tumoral tissue image data during pathology analysis of the tissue image data, the system comprising:
a TIL Map engine including a processing device that performs the following operations:
receiving digitized diagnostic and stained whole-slide image data related to tissue of a particular type of tumoral data
defining regions of interest that represents a portion of, or a full image of the whole-slide image data;
encoding the image data into segmented data portions based on convolutional autoencoding of objects associated with the collection of image data;
determining the density of tumor-infiltrating lymphocytes of bounded segmented data portions for respective classification of the regions of interest;
assigning a classification label to the regions of interest;
determining whether an assigned classification label is above a pre-determined threshold probability value of lymphocyte infiltrated;
adjusting the threshold probability value in order to re-assign the classification label to the regions of interest based on a varied sensitivity level of density of lymphocyte infiltrated;
generating a trained classification model based on the re-assigned classification labels to the regions of interest associated with segmented data portions using the adjusted threshold probability value;
receiving unlabeled image data set to iteratively classify the segmented data portions based on a lymphocyte density level associated with portions of the unlabeled image data set, using the trained classification model;

generating tumor-infiltrating lymphocyte representations based on prediction of TIL information associated with classified segmented data portions; and generating a refined TIL representation based on prediction of the TIL representations using the adjusted threshold probability value associated with the classified segmented data portions.

2. The system as recited in claim 1, wherein assigning the classification label to the regions of interest further comprises analysis of one or more of: different tissue types, textures, lymphocyte infiltration patterns individual lymphocytes, aggregated lymphocytes, intensity values, texture information, nuclei features, and gradient statistics associated with the segmented data portions.

3. The system as recited in claim 2, wherein generating the refined TIL representation further comprises spatial analysis of the TIL information.

4. The system as recited in claim 3, wherein generating the refined TIL representation further comprises molecular correlation analysis associated with the classified segmented data portions.

5. The system as recited in claim 1, which further comprises the trained classification model is based on a lymphocyte CNN.

6. The system as recited in claim 5, which further comprises adjusting the predetermined threshold value to achieve a further refined TIL prediction level.

7. The system as recited in claim 6, which further comprises the predetermined threshold value being adjusted in the range of a 0.0 and 1.0, using lymphocyte prediction scores.

8. The system as recited in claim 6, which further comprises a lymphocyte CNN and necrosis CNN being used to assign prediction values for each segmented data region as one of: TIL positive, TIL negative and the likelihood of TIL value.

9. The system as recited in claim 1, which further comprises the trained classification model is based on a necrosis CNN.

10. The system as recited in claim 9, which further comprises adjusting the predetermined threshold value to achieve a further refined TIL prediction level.

11. The system as recited in claim 10, which further comprises the predetermined threshold value being adjusted in the range of a 0.0 and 1.0, using necrosis prediction scores.

12. The system as recited in claim 10, which further comprises a lymphocyte CNN and necrosis CNN being used to assign prediction values for each segmented data region as one of: TIL positive, TIL negative and the likelihood of TIL value.

13. The system as recited in claim 1, wherein a stain comprises hematoxylin and eosin (H&E) or Immunohostochemical stain.

14. The system of claim 1, wherein generating a refined TIL representation further comprises a single CNN predicting the TIL representations to generate a final TIL representation.

15. A method associated with quantifying a density level of tumor-infiltrating lymphocytes, based on prediction of reconstructed TIL information associated with tumoral tissue image data during pathology analysis of the tissue image data, the method comprising:

a TIL Map engine including a processing device that performs the following operations:

receiving digitized diagnostic and stained whole-slide image data related to tissue of a particular type of tumoral data defining regions of interest that represents a portion of, or a full image of the whole-slide image data;

encoding the image data into segmented data portions based on convolutional autoencoding of objects associated with the collection of image data;

determining the density of tumor-infiltrating lymphocytes of bounded segmented data portions for respective classification of the regions of interest;

assigning a classification label to the regions of interest;

determining whether an assigned classification label is above a pre-determined threshold probability value of lymphocyte infiltrated;

adjusting the threshold probability value in order to re-assign the classification label to the regions of interest based on a varied sensitivity level of density of lymphocyte infiltrated;

generating a trained classification model based on the re-assigned classification labels to the regions of interest associated with segmented data portions using the adjusted threshold probability value;

receiving unlabeled image data set to iteratively classify the segmented data portions based on a lymphocyte density level associated with portions of the unlabeled image data set, using the trained classification model;

generating tumor-infiltrating lymphocyte representations based on prediction of TIL information associated with classified segmented data portions; and generating a refined TIL representation based on prediction of the TIL representations using the adjusted threshold probability value associated with the classified segmented data portions.

16. The method as recited in claim 15, wherein assigning the classification label to the regions of interest further comprises analysis of one or more of: different tissue types, textures, lymphocyte infiltration patterns individual lymphocytes, aggregated lymphocytes, intensity values, texture information, nuclei features, and gradient statistics associated with the segmented data portions.

17. The method as recited in claim 16, wherein generating the refined TIL representation further comprises spatial analysis of the TIL information.

18. The method as recited in claim 17, wherein generating the refined TIL representation further comprises molecular correlation analysis associated with the classified segmented data portions.

19. The method as recited in claim 15, which further comprises the trained classification model is based on a lymphocyte CNN.

20. The method as recited in claim 19, which further comprises adjusting the predetermined threshold value to achieve a further refined TIL prediction level.

21. The method as recited in claim 20, which further comprises the predetermined threshold value being adjusted in the range of a 0.0 and 1.0, using lymphocyte prediction scores.

22. The method as recited in claim 20, which further comprises a lymphocyte CNN and necrosis CNN being used to assign prediction values for each segmented data region as one of: TIL positive, TIL negative and the likelihood of TIL value.

23. The method as recited in claim 15, which further comprises the trained classification model is based on a necrosis CNN.

24. The method as recited in claim 23, which further comprises adjusting the predetermined threshold value to achieve a further refined TIL prediction level.

25. The method as recited in claim 24, which further comprises the predetermined threshold value being adjusted in the range of a 0.0 and 1.0, using necrosis prediction scores.

26. The method as recited in claim 24, which further comprises a lymphocyte CNN and necrosis CNN being used to assign prediction values for each segmented data region as one of: TIL positive, TIL negative and the likelihood of TIL value.

27. The method as recited in claim 15, wherein a stain comprises hematoxylin and eosin (H&E) or Immunohostochemical stain.

28. The method of claim 15, wherein generating a refined TIL representation further comprises a single CNN predicting the TIL representations to generate a final TIL representation.

29. A computer-readable device storing instructions that, when executed by a processing device, perform operations comprising:
    receiving a collection of digitized diagnostic and stained whole-slide image data related to tissue of a particular type of tumoral data;
    defining regions of interest that represents a portion of, or a full image of the whole-slide image data;
    encoding the image data into segmented data portions based on convolutional autoencoding of objects associated with the collection of image data;
    determining the density of tumor-infiltrating lymphocytes of bounded segmented data portions for respective classification of the regions of interest;
    assigning a classification label to the regions of interest;
    determining whether an assigned classification label is above a pre-determined threshold probability value of lymphocyte infiltrated;
    adjusting the threshold probability value in order to re-assign the classification label to the regions of interest based on a varied sensitivity level of density of lymphocyte infiltrated;
    generating a trained classification model based on the re-assigned classification labels to the regions of interest associated with segmented data portions using the adjusted threshold probability value;
    receiving unlabeled image data set to iteratively classify the segmented data portions based on a lymphocyte density level associated with portions of the unlabeled image data set, using the trained classification model;
    generating tumor-infiltrating lymphocyte representations based on prediction of TIL information associated with classified segmented data portions; and
    generating a refined TIL representation based on prediction of the TIL representations using the adjusted threshold probability value associated with the classified segmented data portions.

30. The computer readable device as recited in claim 29, wherein a stain comprises hematoxylin and eosin (H&E) or Immunohostochemical stain.

31. The computer readable device as recited in claim 29, wherein generating a refined TIL representation further comprises a single CNN predicting the TIL representations to generate a final TIL representation.

32. The computer readable device as recited in claim 29, which further comprises the trained classification model is based on one or more of: a lymphocyte CNN and a necrosis CNN.

* * * * *

UNITED STATES PATENT AND TRADEMARK OFFICE
CERTIFICATE OF CORRECTION

Page 1 of 2

PATENT NO. : 11,164,312 B2
APPLICATION NO. : 16/762326
DATED : November 2, 2021
INVENTOR(S) : Saltz et al.

It is certified that error appears in the above-identified patent and that said Letters Patent is hereby corrected as shown below:

In the Specification

Column 9, Line 29:
Now reads ", in _accordance"
Should read --, in accordance--

Column 33, Line 19:
Now reads "caMicorscope"
Should read --CaMicroscope--

Column 38, Line 33:
Now reads "for a given a set"
Should read --for a given set--

Column 38, Line 57:
Now reads "the lym-CNN is requires further retraining"
Should read --the lym-CNN requires further retraining--

Column 40, Line 52:
Now reads "each marked up region into set of smaller image"
Should read --each marked up region into a set of smaller image--

Column 44, Line 41:
Now reads "that data to retain the CNNs"
Should read --that data to refrain the CNNs--

Column 45, Line 56:
Now reads "two-color heatmapC."
Should read --two-color heatmap--

Signed and Sealed this
Ninth Day of August, 2022

Katherine Kelly Vidal
*Director of the United States Patent and Trademark Office*

CERTIFICATE OF CORRECTION (continued)
U.S. Pat. No. 11,164,312 B2

Column 50, Line 35:
Now reads "term "mitosis-karyorrhexis index" (MM)"
Should read --term "mitosis-karyorrhexis index" (MKI)--

Column 50, Line 64:
Now reads "tumors diagnosed at age > 12 months"
Should read --tumors diagnosed at age $\geq$ 12 months--

Column 52, Line 27:
Now reads "workstation include"
Should read --workstation including--

Column 53, Line 45:
Now reads "image sample"
Should read --image samples--

Column 68, Line 10:
Now reads "% 20%"
Should read --20%--

Column 69, Line 34:
Now reads "except that if there is"
Should read --except that there is--

Column 70, Lines 54-55:
Now reads "challenged"
Should read --challenge--

In the Claims

Column 80, Line 42:
Now reads "infiltration patterns individual lymphocytes"
Should read --infiltration patterns, individual lymphocytes--